United States Patent
Kaneko et al.

(10) Patent No.: US 7,664,523 B2
(45) Date of Patent: Feb. 16, 2010

(54) BASE STATION AND MOBILE APPARATUS

(75) Inventors: Koji Kaneko, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 11/629,911

(22) PCT Filed: Jul. 22, 2004

(86) PCT No.: PCT/JP2004/010421

§ 371 (c)(1),
(2), (4) Date: Dec. 18, 2006

(87) PCT Pub. No.: WO2006/008820

PCT Pub. Date: Jan. 26, 2006

(65) Prior Publication Data

US 2008/0014978 A1     Jan. 17, 2008

(51) Int. Cl.
    *H04Q 7/20*    (2006.01)
(52) U.S. Cl. .................. 455/522; 455/69; 455/127.1; 455/500; 455/517; 455/466; 370/315; 370/318; 370/328; 370/329; 370/343
(58) Field of Classification Search ............ 455/522, 455/69, 127.1, 500, 517, 68, 426.1, 426.2, 455/550.1, 403, 422.1, 466; 370/315, 318, 370/328, 329, 343
See application file for complete search history.

(56) References Cited

U.S. PATENT DOCUMENTS 6,654,613 B1    11/2003    Maeng et al.
7,020,483 B2 *  3/2006     Oestreich .................. 455/522
7,110,785 B1 *  9/2006     Paranchych et al. ......... 370/333
2002/0013156 A1  1/2002    Yamamoto et al.
2004/0229639 A1* 11/2004   Meyers et al. .............. 455/522

FOREIGN PATENT DOCUMENTS

| EP | 1 039 657 A1 | 9/2000 |
|----|--------------|--------|
| EP | 1 133 079 A1 | 9/2001 |
| JP | 11-41203 A   | 2/1999 |
| JP | 2000-91985 A | 3/2000 |

(Continued)

OTHER PUBLICATIONS

3GPP TS 25.214 "Physical Layer Procedures", V5.7.0, Dec. 2003.

(Continued)

*Primary Examiner*—Keith T Ferguson
(74) *Attorney, Agent, or Firm*—Birch, Stewart, Kolasch & Birch, LLP

(57) ABSTRACT

When a judging unit judges that there is no mobile-apparatus transmission data, a first generating unit decreases a reference value for generating a transmission-power control command, by a value equivalent to an amount of an outer-loop adjustment. A second generating unit compares generated reference value and a line quality that is measured by a measuring unit, when the former is larger than the latter, generates a transmission-power control command for reducing a transmission power of the mobile apparatus, and when the former is smaller than the latter, generates a transmission-power control command for increasing the transmission power of the mobile apparatus.

53 Claims, 37 Drawing Sheets

FOREIGN PATENT DOCUMENTS

| | | |
|---|---|---|
| JP | 2000-315977 A | 11/2000 |
| JP | 2001-69075 A | 3/2001 |
| JP | 2002-537677 A | 11/2002 |
| JP | 2004-80531 A | 3/2004 |
| WO | WO-00/48336 A1 | 8/2000 |

OTHER PUBLICATIONS

3GPP TS 25.433, "UTRAN Lub Interface NBAP Signalling", V.5.7.0, Dec. 2003.

3GPP TS 25.427, "UTRAN Lub/Lur Interface User Plane Protocol for DCH Datastreams", V.5.3.0, Dec. 2003.

* cited by examiner

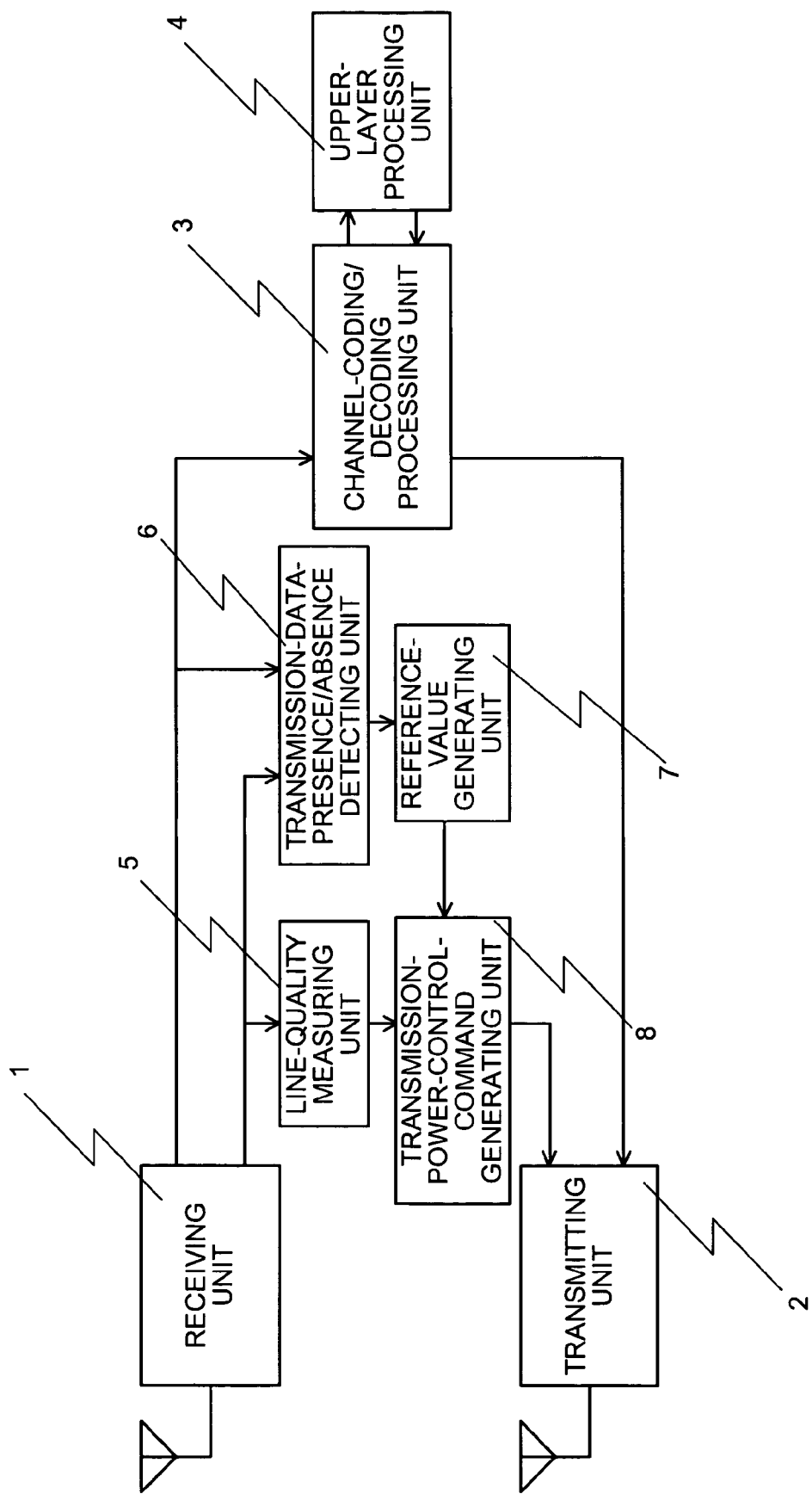

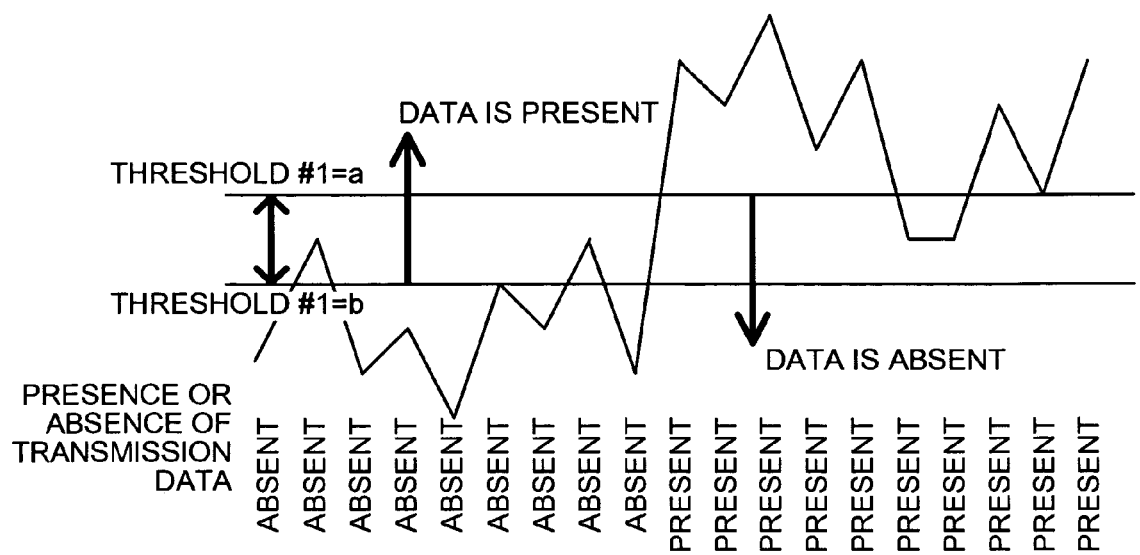
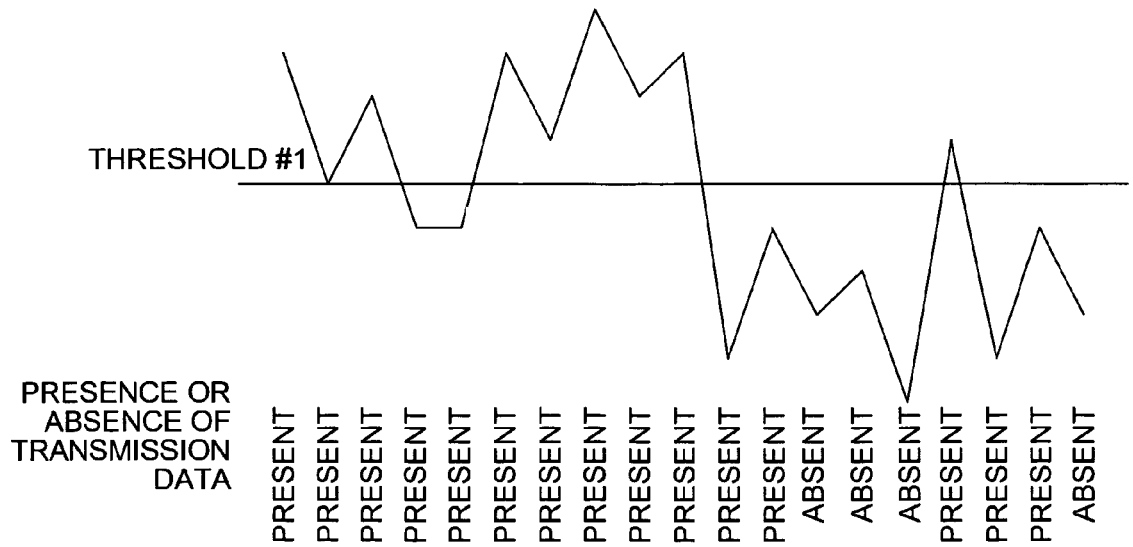

BASE STATION AND MOBILE APPARATUS

TECHNICAL FIELD

The present invention relates to a base station and a mobile apparatus that adopt Code Division Multiple Access (CDMA) as a communication system, and, more particularly to a base station that realizes transmission power control at the time when there is no transmission data from a mobile apparatus and a mobile apparatus opposed to the base station.

BACKGROUND ART

As an example of a conventional technology, Wideband Code Division Multiple Access (WCDMA) of the 3rd Generation Partnership Project (3GPP) Frequency Division Duplex (FDD)) standard is explained.

According to V3.12.0 applicable to Release 99 of a Nonpatent Literature 1 described below, the conventional CDMA radio communication system is optimized for a channel that requires real-time communication such as a sound channel. Concerning data communication, a High Speed Physical Downlink Shared Channel (HS-PDSCH) is provided in V5.5.0 applicable to Release 5 to realize improvement of throughput. For Radio Resource Control (RRC) between a base station control apparatus and a mobile apparatus, a channel of Release 99 called an Associated Dedicated Physical Channel (A-DPCH) is used.

Transmission power control for the channel of Release 99 is explained. A transmission slot in a base station includes a data section for transmitting sound and packets, a transmission power control (TPC) that is a type of a control signal of the layer 1 and used for transmitting a transmission-power control command, a Transport Format Combination Indicator (TFCI) that is a type of a control signal of the layer 1 and is used for channel coding/decoding, and a Pilot that is data of a known sequence and is used for synchronization and demodulation on a reception side. A transmission slot in a mobile apparatus includes a TPC, a TFCI, and a Pilot. A channel that transmits control information of the layer 1 such as the TPC, the TFCI, and the Pilot is referred to as a Dedicated Physical Control Channel (DPCCH).

As indicated by an example described in Annex.B B.2 of the Nonpatent Literature 1, the mobile apparatus estimates a quality of a Pilot signal transmitted by the base station. If the quality is lower than a reference value, the mobile apparatus transmits a transmission-power control command for instructing an increase of the next transmission power to the base station. If the quality is equal to or higher than the reference value, the mobile apparatus transmits a transmission-power control command for instructing a decrease of the next transmission power to the base station. The base station measures a Signal to Interference Ratio (SIR) of the Pilot signal transmitted by the mobile apparatus. If the SIR is lower than the reference value, the base station transmits a transmission-power control command for instructing an increase of the next transmission power to the mobile apparatus. If the SIR is equal to or higher than the reference value, the base station transmits a transmission-power control command for instructing a decrease of the next transmission power to the mobile apparatus.

According to a Nonpatent Literature 2 described below, the reference value is called a "UL SIR Target" and is designated by information of a control protocol called a Node B Application Part (NBAP) by the base station control apparatus. According to a Non-patent Literature 3 described below, it is possible to change the reference value according to an "OUTER LOOP POWER CONTROL message" in a protocol called "fp:frame protocol".

It is known that, as described in a Patent Document 1 described below, the channel of Release 99 is set to low transmission power to reduce unnecessary waves at the beginning of setting of new communication. When the transmission power becomes stable, the channel is controlled to perform transmission with transmission power selected based on a line quality condition set in advance. For example, a line quality is defined as Frame Error Rate (FER)=0.01 for a sound line and FER=0.0001 for 64 kbps data. The line quality is controlled to set the FER to a target value to guarantee a quality for end users. To attain an identical line quality, as an index such as a Signal to Interference Ratio (SIR), a Signal to Noise Ratio (SNR), a Signal to Interference plus Noise Ratio (SINR), or reception field intensity, different values are required according to propagation environments.

The conventional transmission power control at the time when there is no data to be transmitted will be explained. In the 3GPP-FDD standard, even when there is no data to be transmitted in the data section (amplitude=0), transmission processing is performed in the DPCCH. However, there is no particular description about transmission power of the DPCCH.

For example, as the conventional technology at the time when there is no transmission data, there is a technology described in a Patent Document 2 described below. In the Patent Document 2, when transmission data is absent, a burst frame consisting of only burst data including a pilot symbol and a symbol for transmission power control is generated and a transmission interval is set to N times (N is a natural number) as large as one slot. Consequently, the DPCCH is not transmitted for every slot but is transmitted once in N slots. When a transmission amplifier of the mobile apparatus is turned off in slots in which the DPCCH is not transmitted, power consumption can be reduced.

It is also mentioned that data subjected to repetition processing is transmitted with transmission power lower than that before the processing by providing repetition processing means for continuously arranging pilot symbols and symbols for transmission power control, respectively. A repetition technology for changing a format of transmission and repeatedly transmitting the same data is used to reduce the transmission power by x dB.

Patent Document 1: Japanese Patent Application Laid-open No. 2000-91985

Patent Document 2: Japanese Patent Application Laid-open No. H11-41203

Nonpatent Literature 1: TS25.214 "Physical layer procedures (FDD)"

Nonpatent Literature 2: TS2.5.433 "UTRAN Iub Interface NBAP signaling" 9.1.36, 9.1.42

Nonpatent Literature 3: TS25.427 "UTRAN Iub/Iur interface user plane protocol for DCH data streams" 6.3.3

DISCLOSURE OF INVENTION

Problem to be Solved by the Invention

However, in the conventional transmission power control (3GPP-FDD), there is no description concerning a transmission power value of the DPCCH at the time when there is no transmission data.

In the Patent Document 2, it is possible to reduce the number of times of transmission and decrease power consumption by setting a transmission interval of the DPCCH N times as large as one slot. However, if a power supply of the transmission power amplifier is turned on and off in the mobile apparatus to decrease transmission power of the mobile apparatus, there are problems in that unnecessary waves adversely affect a hearing aid and a resonance action affects a cardiac pacemaker.

When transmission timing of the DPCCH is set at random, the problems of the unnecessary waves are eased. However, complicated control such as a method of synchronization of the mobile apparatus and the base station is required. In a Technical Specification Group (TSG) of Radio Access Networks (RAN) of the 3GPP, a topic of gating processing for the DPCCH was brought up for discussion. However, the topic was withdrawn as of February 2004.

In High Speed Downlink Packet Access (HSDPA), although it is possible to multiplex a plurality of channels in High Speed Downlink Packet Access (HSFPA), the A-DPCH is always required. The channels of Release 99 always perform transmission power control even when user data of a packet is used in the HSDPA. Thus, there are problems in that power consumption of the mobile apparatus increases and the number of users who can simultaneously use the channels is limited.

The present invention has been devised in view of the circumstances and it is an object of the present invention to provide a transmission power control method capable of reducing power consumption without changing a transmission slot format and without turning on and off a power supply of a transmission power amplifier.

Means for Solving Problem

A base station according to one aspect of the present invention adopts CDMA as a communication system and realizes transmission power control at the time when there is no mobile-apparatus transmission data. The base station includes a line-quality measuring unit that measures a line quality using a known sequence included in a reception signal; a transmission-data-presence/absence judging unit that judges presence or absence of mobile-apparatus transmission data based on reception power of a mobile-apparatus transmission data part after despread; a reference-value generating unit that decreases, when a result of the judgment indicates absence of the mobile-apparatus transmission data, a reference value for generating a transmission-power control command by a value equivalent to an outer-loop adjustment amount variable according to a predetermined condition; and a transmission-power-control-command generating unit that compares the reference value generated by the reference-value generating unit and the line quality and, when the former is larger, generates a transmission-power control command for reducing transmission power of the mobile apparatus and, when the former is smaller, generates a transmission-power control command for increasing transmission power of the mobile apparatus.

According to the present invention, a base station includes a function of measuring a line quality of a transmission signal of a mobile apparatus, a function of detecting presence or absence of transmission data from the mobile apparatus, a function of adjusting a reference value for generating a transmission-power control command using a predetermined outer-loop adjustment amount when there is no transmission data from the mobile apparatus, and a function of generating a transmission-power control command based on the line quality and the reference value after adjustment.

EFFECT OF THE INVENTION

In the present invention, according to the functions, there is an effect that it is possible to perform transmission power control for reducing power consumption of the apparatus as a whole without changing a transmission slot format and without turning on and off a power supply of a transmission power amplifier as in the past.

BRIEF DESCRIPTION OF DRAWINGS

FIG. 1 is a diagram of an example of a structure of a CDMA base station apparatus according to a first embodiment of the present invention;

FIG. 2 is a graph of an example of processing of a transmission-data-presence/absence detecting unit;

FIG. 3 is a graph of an example of processing of the transmission-data-presence/absence detecting unit;

EXPLANATIONS OF LETTERS OR NUMERALS

Figure 4:
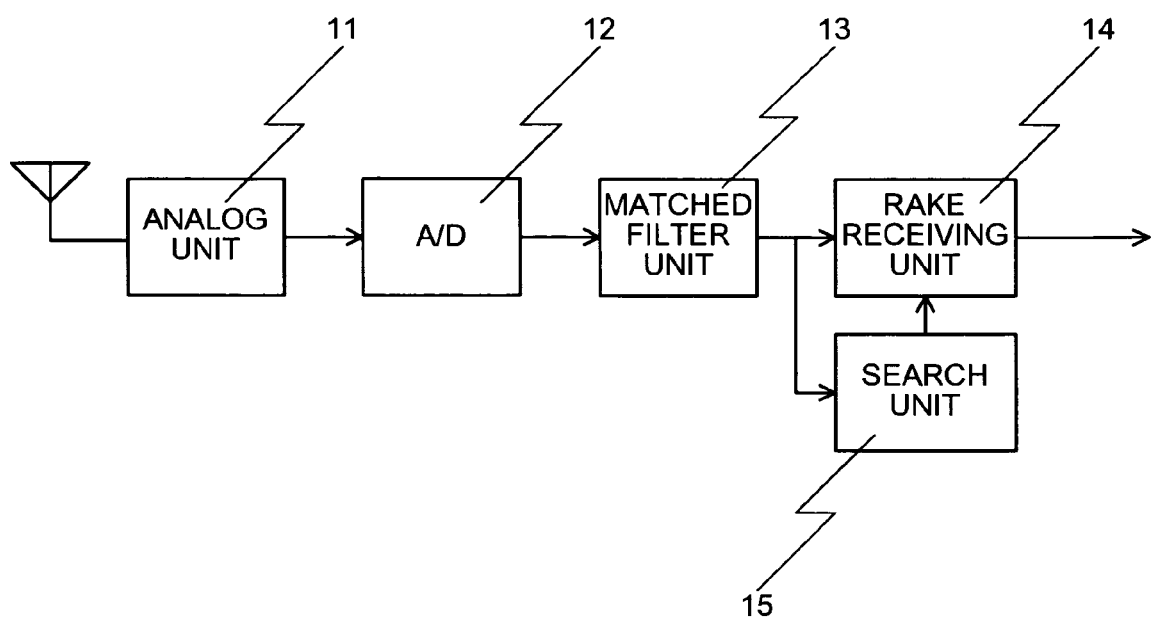
FIG. 4 is a diagram of a structure of a general CDMA modulation circuit.

1 Receiving unit
2 Transmitting unit
3 Channel-coding/decoding processing unit
4 Upper-layer processing unit
5 Line-quality measuring unit
6 Transmission-data-presence/absence detecting unit
7, 7a, 7b Reference-value generating units
8 Transmission-power-control-command generating unit
11 Analog unit
12 A/D
13 Matched filter unit
14 RAKE receiving unit
15 Search unit
21 Transmission-data-presence/absence message extracting unit
22 Transmission-data-presence/absence message detecting unit
23 Transmission-data-presence/absence detection-response generating unit
24, 24a, 24b Synchronization detecting units
31 Adding unit
32 Memory
33 Forgetting-factor multiplying unit
34 Judging unit
41, 41a Moving-speed detecting units
42 Local-station transmission-power-control-command extracting unit
43 Transmission-power control unit
44 Local-station transmission-data-presence/absence detecting unit
45, 45a Transmission-timing control units
46 Reference-value combining unit
47 Error-rate measuring unit
48 Reference-value generating unit
51 Receiving unit
52 Transmitting unit
53, 53a, 53b, 53c, 53d Channel-coding/decoding processing units
54 Upper-layer processing unit
55 Transmission-data-presence/absence detecting unit
56 Transmission-power-control-command extracting unit
57, 57a Transmission-power control units
58 Line-quality measuring unit
59 Line-quality judging unit
60 Error-rate measuring unit
61 error-rate judging unit
62, 62a Transmission-timing control units
63 Line-quality measuring unit
64 layer 1-signaling-information generating unit
65 Line-quality measuring unit
66 Transmission-power-control-command generating unit

BEST MODE(S) FOR CARRYING OUT THE INVENTION

Exemplary embodiments of a radio communication apparatus according to the present invention are explained in detail below with reference to the accompanying drawings. The present invention is not limited by the embodiments.

First Embodiment

FIG. 1 is a diagram of an example of a structure of a CDMA base station apparatus according to a first embodiment of the present invention. The CDMA base station apparatus includes a receiving unit 1, a transmitting unit 2, a channel-coding/decoding processing unit 3, an upper-layer processing unit 4, a line-quality measuring unit 5, a transmission-data-presence/absence detecting unit 6, a reference-value generating unit 7, and a transmission-power-control-command generating unit 8. In this CDMA base station apparatus, the channel-coding/decoding processing unit 3 applies channel coding such as error correction coding to data outputted from the upper-layer processing unit 4. The transmitting unit 2 transmits a signal after spread. The receiving unit 1 receives a signal transmitted from an opposed station and outputs a signal after despread. The channel-coding/decoding processing unit 3 performs channel coding such as error correction decoding and transfers data after decoding to the upper-layer processing unit 4.

Detailed processing of the respective units in the CDMA base station apparatus is explained. Processing of the line-quality measuring unit 5, the transmission-data-presence/absence detecting unit 6, the reference-value generating unit 7, and the transmission-power-control-command generating unit 8, which are characteristics of the present embodiment, is explained.

The CDMA base station apparatus includes the line-quality measuring unit 5, which measures a reception quality using a DPCCH. For example, a method of calculating, using a pilot signal that is a known sequence in the DPCCH, an SINR as indicated by Equation (1) below with dispersion from an ideal phase point set as an interference component and with amplitude set as a signal component is known.

$$SINR = \frac{\sum_{N} |r|^2}{\sum_{N} \left| r - \frac{\sum_{N} |r|^2 \cdot P}{N} \right|^2} \quad (1)$$

Note that r is a reception pilot signal after despread. Since the reception pilot signal is transmitted on condition that multi level modulation is performed, r is a vector value. P is a known pilot phase and N is the number of pilot symbols in calculating an average over a period for transmitting a transmission power command (a basic unit in transmitting the transmission power command with multi level modulation is defined as one symbol). At a level at which thermal noise can be neglected, it is possible to calculate an SIR with the calculation. In a communication system in which it is known that a single user uses the occupied frequency band, it is possible to represent a quality of a reception signal with reception field intensity and an SNR. In a system in which it is known that interference does not change suddenly, concerning the interference, it is effective to calculate an average of a value larger than N samples.

When there is no transmission data in the mobile apparatus, since amplitude of a data component is 0, the transmission-data-presence/absence detecting unit 6 judges presence or absence of mobile-apparatus transmission data from two inputs of mobile-apparatus transmission data after despread and a known sequence signal of a layer 1 or layer 1 signaling-information. Specifically, as indicated by Inequality (2), presence or absence of mobile-apparatus transmission data is judged according to whether a ratio of the mobile-apparatus transmission data after despread and a pilot signal exceeds a specific threshold #1.

Mobile-apparatus transmission-data reception power/
  Pilot-signal reception power<Threshold #1      (2)

When the transmission-data reception power and the pilot-signal reception power are integrated over a specific period and presence or absence of mobile-apparatus transmission data is judged according to whether a ratio of results of the integration exceeds a specific threshold #2 as indicated by Inequality (3), there is an effect that reliability is improved and is less easily affected by instantaneous fluctuation in a radio channel.

Σ(Mobile-apparatus transmission-data reception
  power/Pilot-signal reception power)<Threshold
  #2                                              (3)

In the same manner as the integration, it is also possible to judge presence or absence of transmission data according to processing for judging whether the ratio exceeds the threshold a specific number of times continuously or processing for judging whether the ratio exceeds the threshold at a specific rate or more.

In the transmission-data-presence/absence detecting unit 6, it is desirable to perform processing described below. For example, a required Quality of Service (QoS) changes depending on content of data received.

Therefore, when the QoS is "an allowable delay time=large", "communication data=packet", or "an allowable delay time=large" and "communication data=packet", the thresholds (#1 and #2) are determined to make it possible to detect absence of transmission data (a first method). This method is effective for traffic such as Internet access. It is possible to reduce transmission power of the mobile apparatus when there is no traffic for a long time. Since the communication data is a packet, it is possible to retransmit the communication data. When transmission-data presence/absence judgment is wrong, an influence of the transmission-data presence/absence judgment is small (fail soft). Moreover, since it is possible to judge presence or absence of transmission data using the large allowable delay time (see Inequality (4)), it is possible to reduce judgment errors.

Time until it is recognized that data is present at the
  time of resumption of transmission
  data<Allowable delay time                       (4)

As a method different from the above (a second method), when the QoS is "an allowable error rate=large", "the thresholds (#1 and #2)=small" or "the number of times the ratio exceeds the thresholds=small" and, when the QoS is "an allowable error rate=relatively small", "the thresholds is set to large" or "the number of times the ratio exceeds the thresholds=large". The error rate is prevented from increasing because of misjudgment that transmission data is absent, that is, reduction in transmission power of the opposed station due to wrong judgment.

As a method different from the above (a third method), in the case of communication-data (multi-channel) obtained by multiplexing communication(channels) that realizes a plurality of QoSs, when a radio communication system in which transmission power cannot be controlled for each of the QoSs is adopted, a most strict QoS of the channels is set as a QoS of the multi-channel. In other words, a QoS of a channel with a shortest allowable delay time, a QoS of a channel with a smallest allowable error rate, or a QoS of a channel other than a packet at the time when a packet channel and other channels are multiplexed is set as a QoS of the multi-channel.

As a method different from the above (a fourth method), for example, it is effective to give hysteresis to judgment on presence or absence of transmission data. FIG. 2 is a graph of the fourth method in the transmission-data-presence/absence detecting unit 6. In the figure, hysteresis is applied to judgment on presence or absence of transmission data according to Inequality (2). The graph represents "Mobile-apparatus transmission-data reception power/Pilot-signal reception power" with a polygonal line. For example, it is judged that transmission data is absent when the ratio is smaller than the threshold #1=a and it is judged that transmission data is present when the ratio is larger than the threshold #1=b. This makes it possible to obtain a stable judgment result even if "Mobile-apparatus transmission-data reception power/Pilot-signal reception power" fluctuates instantaneously. In particular, this method is effective because presence or absence of transmission data does not fluctuate frequently when traffic occurs in a burst-like manner as in a packet.

As a method different from the above (a fifth method), in the communication system in which fail soft is important, a method of judging that transmission data is present when judgment is uncertain is effective. Usually, even when it is misjudged that transmission data is absent, the mobile apparatus is controlled to decrease transmission data. Thus, this is a method for preventing the control. For example, it is judged that transmission data is absent when Inequality (2) is satisfied three times in a row and it is judged that transmission data is present when Inequality (2) is not satisfied at least once. FIG. 3 is a graph of the fifth method in the transmission-data-presence/absence detecting unit 6. It is seen that it tends to be judged that transmission data is present.

Processing of the reference-value generating unit 7 is explained. First, to generate a transmission-power control command, the reference-value generating unit 7 generates an initial value of a radio line quality corresponding to a required quality of data, which is transmitted by the opposed station, as a reference value.

When a result of the judgment by the transmission-data-presence/absence detecting unit 6 indicates that transmission data is absent, the reference-value generating unit 7 decreases the reference value by a predetermined value set according to a radio channel state or the like. This value is defined as an outer-loop adjustment amount #1. The outer-loop adjustment amount #1 is set stepwise according to, for example, the radio channel state. A pilot signal, transmission power of which is decreased by adjustment of the outer-loop adjustment amount #1, is set to a value that is too low for electric power for demodulation but is sufficient as electric power for securing a path position.

Reception power of the pilot signal required for demodulation is larger than reception power of the pilot signal required for securing a path position. This relation is explained qualitatively. FIG. 4 is a diagram of a structure of a general CDMA demodulation circuit. A detailed structure of a section corresponding to the receiving unit in FIG. 1 is shown in the figure. A signal received by an analog unit 11 is subjected to A/D conversion by an A/D 12 and transferred to a matched filter unit 13. An output signal of the matched filter unit 13 is inputted to a search unit 15 and used for path detection in the search unit 15. The search unit 15 performs cyclic integration to improve an SN. A path position depends on a distance between the mobile apparatus and the base station. A sudden change in the path position indicates that moving speed of the mobile apparatus is extremely high. For example, when the path position has fluctuated by 0.5 chip at a chip rate of 2.84 Mcps, this means that the mobile apparatus has moved by a distance obtained by $$3 \times 10^8 \times (1/3.84 \times 10^6) \times 0.5 = 39.0625 \text{ m} \tag{5}$$

Therefore, when the path position moves by 0.5 chip in 100 milliseconds, moving speed is equivalent to 1400 kilometers per hour. It is seen that integration is possible for a long time and no problem occurs even if a path cannot be detected instantaneously.

Finally, a RAKE receiving unit 14 performs demodulation processing with phase information of the fluctuating pilot signal at the time of sudden phase fluctuation. Thus, when pilot information at that instance is uncertain, reception performance is directly affected (a period for transmitting the pilot signal is 666 microseconds in the 3GPP-FDD standard, which is extremely short compared with 100 milliseconds). Likelihood of the pilot information is proportional to reception power of the pilot signal. From the above, it is seen that reception power required for securing a path position with path detection, in which integration is possible, is lower than pilot reception power requiring instantaneous phase information.

When a result of the judgment by the transmission-data-presence/absence detecting unit 6 changes from "transmission data is absent" to "transmission data is present", the reference-value generating unit 7 increases the reference value by a value equivalent to the outer-loop adjustment amount #1. A value of the pilot signal, transmission power of which is decreased by the adjustment of the outer-loop adjustment amount #1, is too low for demodulation. Thus, the pilot signal is outputted with the reference value increased by the value equivalent to the outer-loop adjustment amount #1 (=a reference value for transmission-power control command generation). This allows the mobile apparatus to promptly recover transmission power optimum for demodulation at the time when transmission is resumed.

Subsequently, the transmission-power-control-command generating unit 8 compares the reference value received from the reference-value generating unit 7 and the line quality notified from the line-quality measuring unit 5. When the former is larger, the transmission-power-control-command generating unit 8 generates a transmission-power control command for decreasing transmission power of the opposed station. When the former is smaller, the transmission-power-control-command generating unit 8 generates a transmission-power control command for increasing transmission power of the opposed station. The transmitting unit 2 transmits the transmission-power control command to the opposed station together with transmission data.

As described above, according to the present embodiment, the base station apparatus includes a function of measuring a line quality of a transmission signal of the opposed station, a function of detecting presence or absence of transmission data from the opposed station, a function of adjusting a reference value for generating a transmission-power control command using a predetermined outer-loop adjustment amount when transmission data from the opposed station is absent, and a function of generating a transmission-power control command based on the line quality and the reference value after the adjustment. This makes it possible to perform transmission power control for reducing power consumption of the apparatus as a whole without changing a transmission slot format and without turning on and off the power supply of the transmission power amplifier.

Second Embodiment

Figure 5:
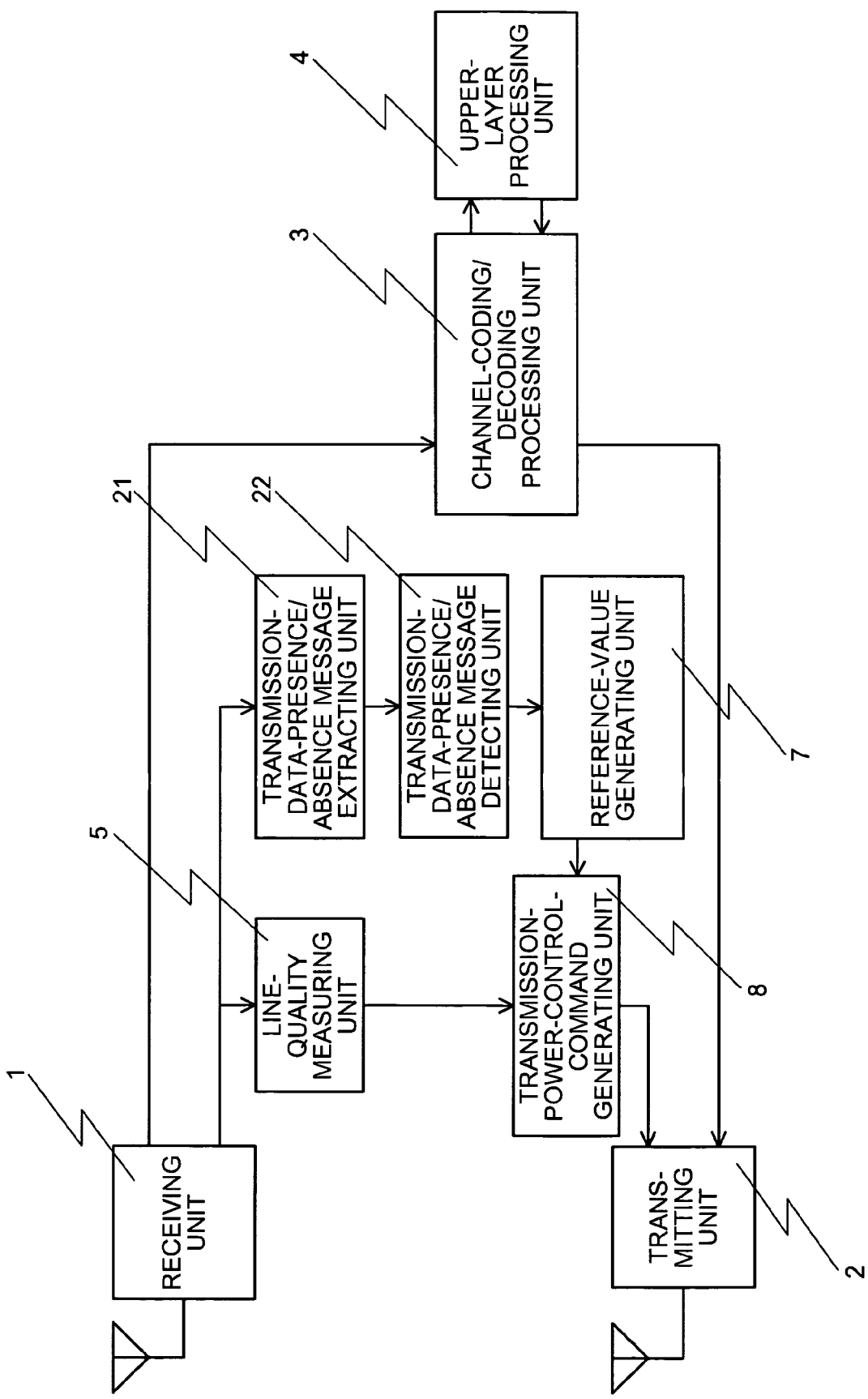
FIG. 5 is a diagram of an example of a structure of a CDMA base station apparatus according to a second embodiment of the present invention.

FIG. 5 is a diagram of an example of a structure of a CDMA base station apparatus according to a second embodiment of the present invention. The CDMA base station apparatus includes a transmission-data-presence/absence message extracting unit 21 and a transmission-data-presence/absence message detecting unit 22 instead of the transmission-data-presence/absence detecting unit 6. Components identical with those in FIG. 1 according to the first embodiment are denoted by the identical reference numerals and signs and explanations of the components are omitted. Processing that is different from the processing according to the first embodiment is explained.

Figure 6:
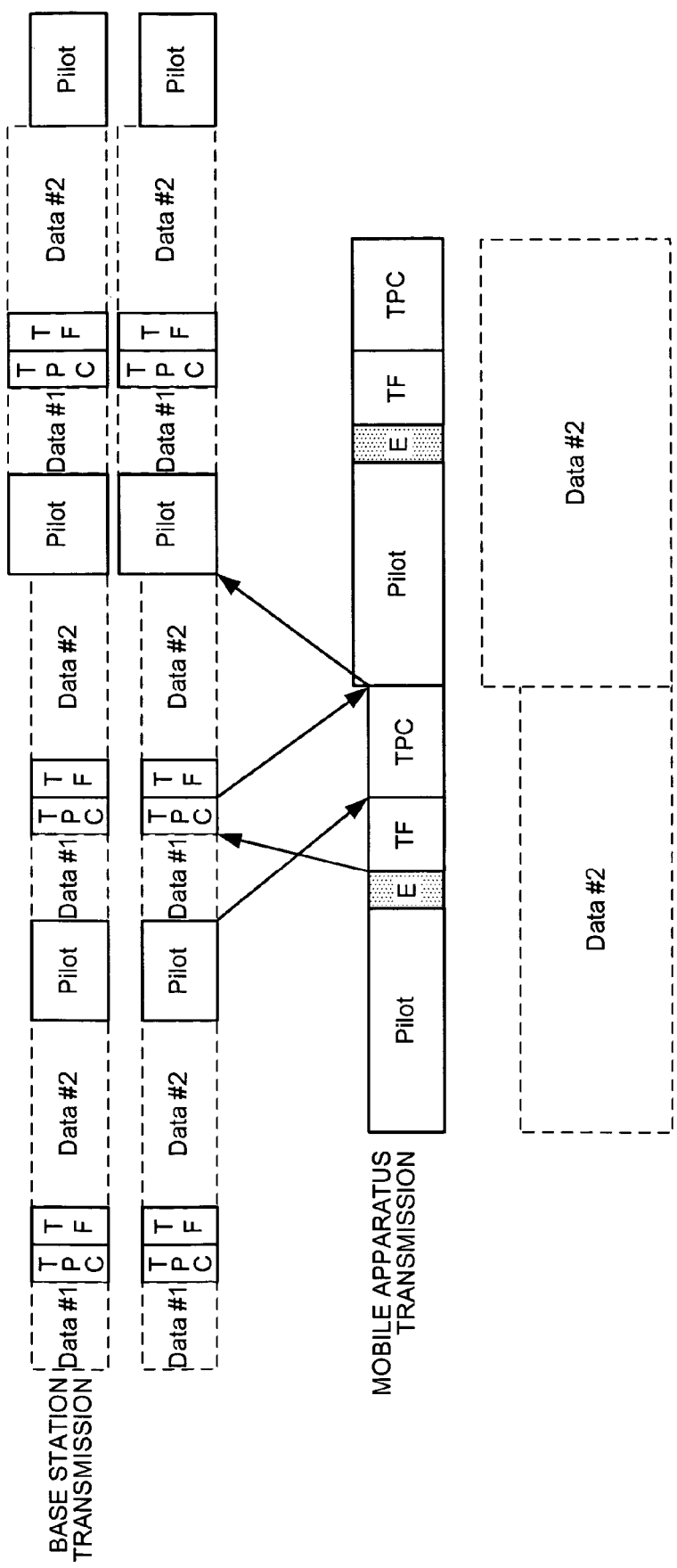
FIG. 6 is a diagram of an example of a transmission frame format.

The transmission-data-presence/absence message extracting unit 21 extracts presence or absence of transmission data from signaling information of the layer 1. FIG. 6 is a diagram of an example of a transmission frame format. Data #1 and Date #2 are data sections for transmitting sound and packets. A TPC is a type of a control signal of the layer 1 and transmits a transmission-power control command. A Transport Format (TF) is a type of a control signal of the layer 1, which is called TFCI in the 3GPP-FDD standard, and is used for channel coding and decoding. A pilot is a type of a control signal of the layer 1 and is data of a known sequence. The pilot is used for synchronization processing and decoding on a reception side. The transmission-data-presence/absence message extracting unit 21 extracts a bit represented as E (hereinafter, "E bit"), which is received together with the control signals of the layer 1 in FIG. 6, and outputs the data to the transmission-data-presence/absence message detecting unit 22. The E bit may indicate presence or absence of transmission data or may be a notice of data to be transmitted soon. When the E bit is a notice of data to be transmitted soon, it is desirable to output the data after a fixed time taking into account required throughput of user data.

When data is subjected to error correction coding by a unit of channel coding (in the 3GPP-WCDMA-FDD, a unit called a Transmission Time Interval (TTI) or a frame), the transmission-data-presence/absence message detecting unit 22 performs error correction decoding and outputs a result of the error correction decoding to the reference-value generating unit 7. For example, when the E bit in FIG. 6 is 1, the transmission-data-presence/absence message detecting unit 22 judges that transmission data is present and, when the E bit is 0, the transmission-data-presence/absence message detecting unit 22 judges that transmission data is absent. The transmission-data-presence/absence message detecting unit 22 outputs a result of the judgment to the reference-value generating unit 7.

Hysteresis for transmission-data presence/absence judgment according to the present embodiment is effective when the E bit is not coded. For example, when it is judged three times in a row that transmission data is absent, the transmission-data-presence/absence message detecting unit 22 judges that transmission data is absent, and when it is judged once that transmission data is present, the transmission-data-presence/absence message detecting unit 22 judges that transmission data is present.

The QoS is also effective when the E bit is not coded. For example, when the QoS is "an allowable error rate=large", "an allowable delay time=large", or "communication data=packet", the transmission-data-presence/absence message detecting unit 22 sets "the number of times transmission data is absent in a row to small". When the QoS is "an allowable error rate=relatively small", "an allowable delay time=small", or "communication data=other than packet", the transmission-data-presence/absence message detecting unit 22 sets "the number of times transmission data is absent in a row to large". The transmission-data-presence/absence message detecting unit 22 copes with a situation in which an error rate increases because it is misjudged that transmission data is absent and transmission power of the opposed station is reduced.

In the case of communication data (multi-channel) obtained by multiplexing communication (channels) that realizes a plurality of QoSs, when a radio communication system in which transmission power cannot be controlled for each of the QoSs is adopted, a most strict QoS of the channels is set as a QoS of the multi-channel. In other words, a QoS of a channel with a shortest allowable delay time, a QoS of a channel with a smallest allowable error rate, or a QoS of a channel other than a packet at the time when a packet channel and other channels are multiplexed is set as a QoS of the multi-channel.

Figure 7:
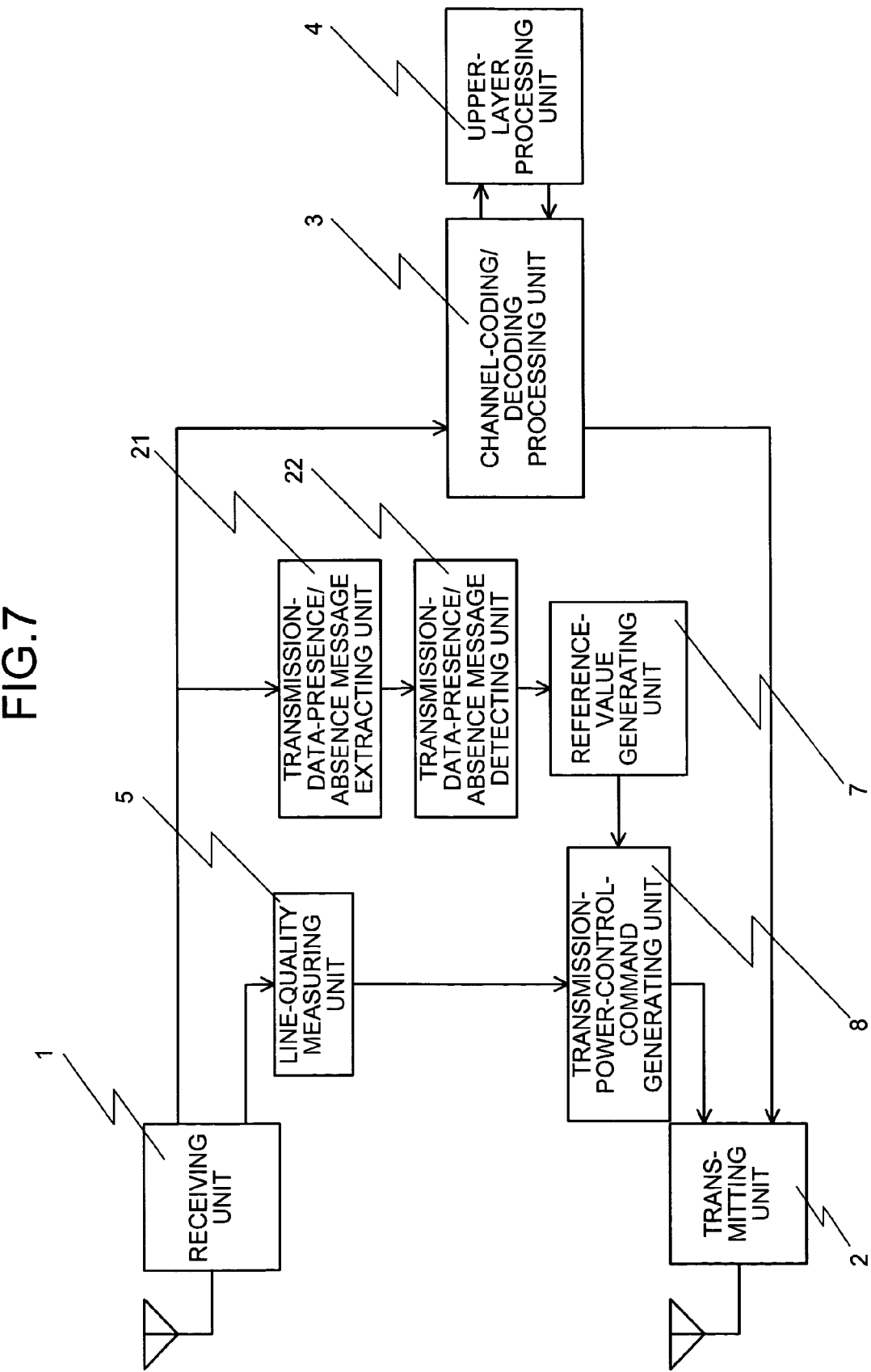
FIG. 7 is a diagram of an example of a structure of the CDMA base station apparatus according to the second embodiment to the present invention.

FIG. 7 is a diagram of a structure of the CDMA base station apparatus in which transmission-data presence/absence message E is included in data rather than the control signals of the layer 1. Characteristic operations (processing of the transmission-data-presence/absence message extracting unit 21 and the transmission-data presence/absence message detecting unit 22) are the same as those described above.

As described above, according to the present embodiment, as in the first embodiment, the base station apparatus includes a function of measuring a line quality of a transmission signal of the opposed station, a function of detecting presence or absence of transmission data from the opposed station, a function of adjusting a reference value for generating a transmission-power control command when transmission data from the opposed station is absent, and a function of generating a transmission-power control command based on the line quality and the reference value after the adjustment. This makes it possible to perform transmission power control for reducing power consumption without changing a transmission slot format and without turning on and off the power supply of the transmission power amplifier.

Third Embodiment

Figure 8:
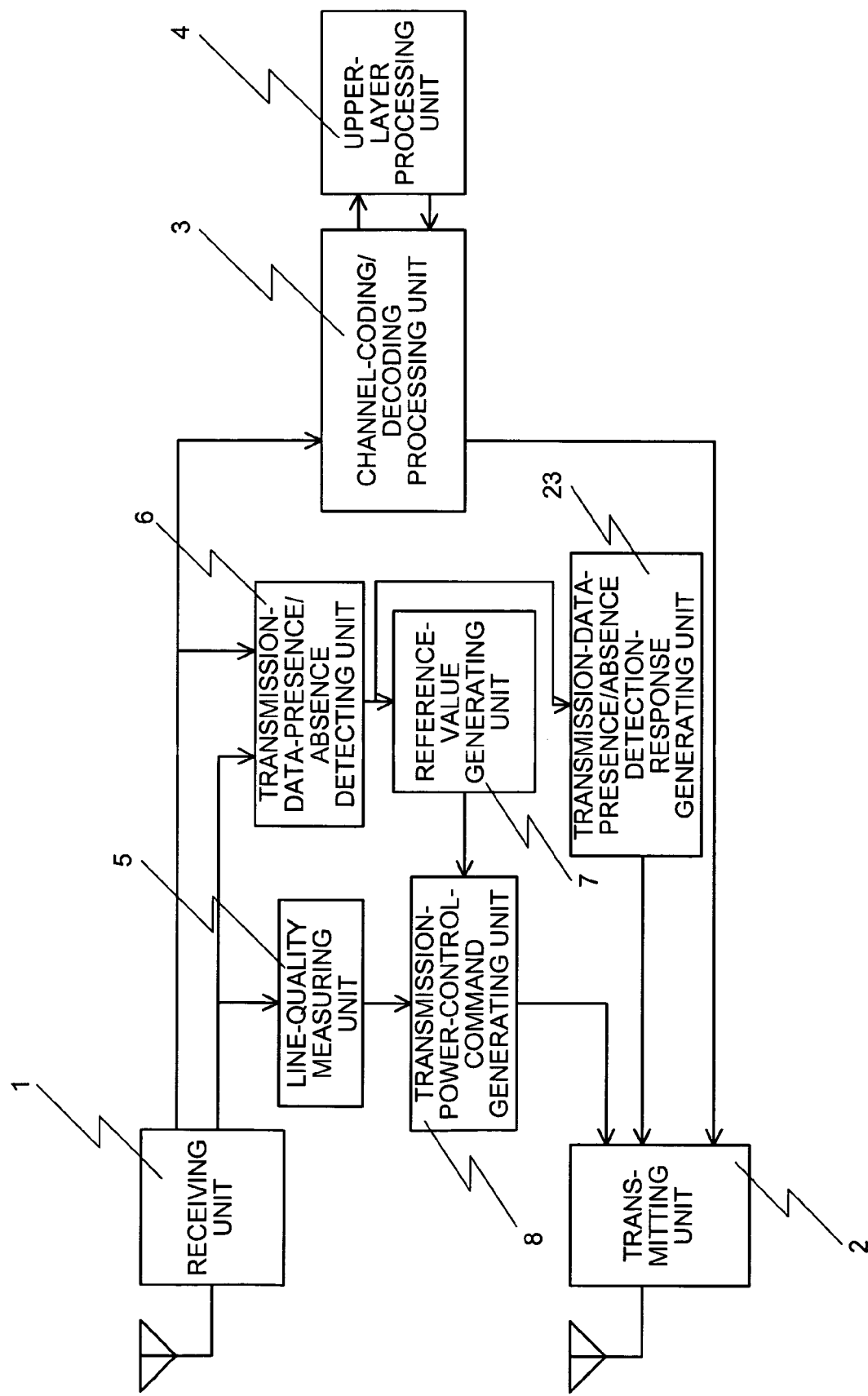
FIG. 8 is a diagram of an example of a structure of a CDMA base station apparatus according to a third embodiment of the present invention.

FIG. 8 is a diagram of an example of a structure of a CDMA base station apparatus according to a third embodiment of the present invention. The CDMA base station apparatus includes a transmission-data-presence/absence detection-response generating unit 23 in addition to the components according to the first embodiment. Components identical with those in FIG. 1 according to the first embodiment are denoted by the identical reference numerals and signs and explanations of the components are omitted. Processing that is different from the processing according to the first embodiment is explained.

Figure 9:
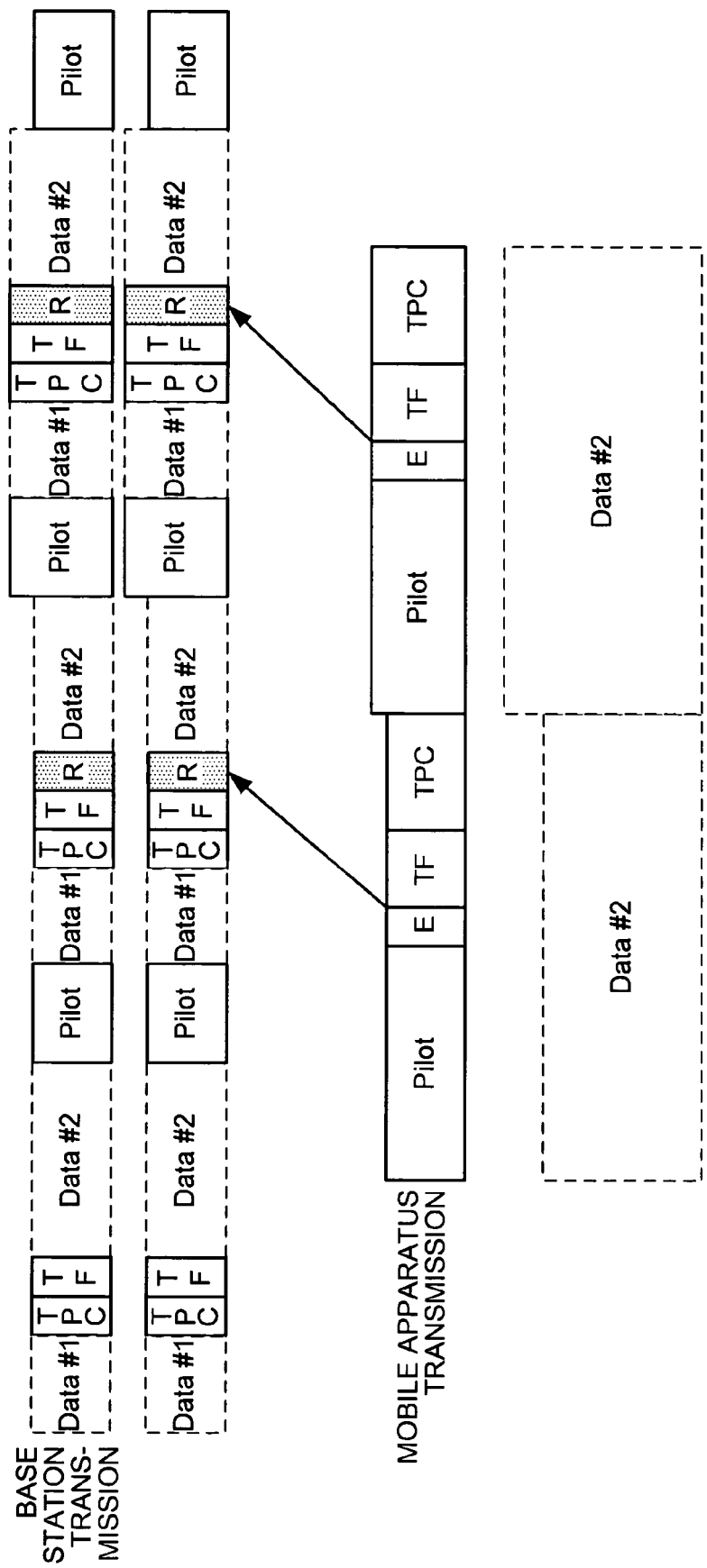
FIG. 9 is a diagram of an example of a format of information to be returned as a response.

The transmission-data-presence/absence detection-response generating unit 23, which has received a judgment result of presence or absence of transmission data, returns, for example, when the judgment result is presence of transmission data, a response to the effect that it is judged transmission data is present. On the other hand, when the judgment result is absence of transmission data, the transmission-data-presence/absence detection-response generating unit 23 returns a response to the effect that it is judged that transmission data is absent. FIG. 9 is a diagram of an example of a format of information to be returned as a response. Presence or absence of transmission data by judgment of a reception slot is transmitted in a section represented as R (hereinafter, "R bit) shown in FIG. 9. For example, when data is present, the R bit is set as "11" and, in other cases, the R bit is set as "00".

This allows the mobile apparatus to confirm that the base station has judged that transmission data is present and start data transmission. Therefore, it is possible to perform efficient transmission in which a waste such as loss of a data head does not occur at the time of resumption of transmission of the mobile apparatus.

According to the present embodiment, the processing by the transmission-data-presence/absence detection-response generating unit 23 is applied to the constitution according to the first embodiment. However, the present invention is not limited to this. It is also possible to apply the processing to the constitution according to the second embodiment.

Fourth Embodiment

Figure 10:
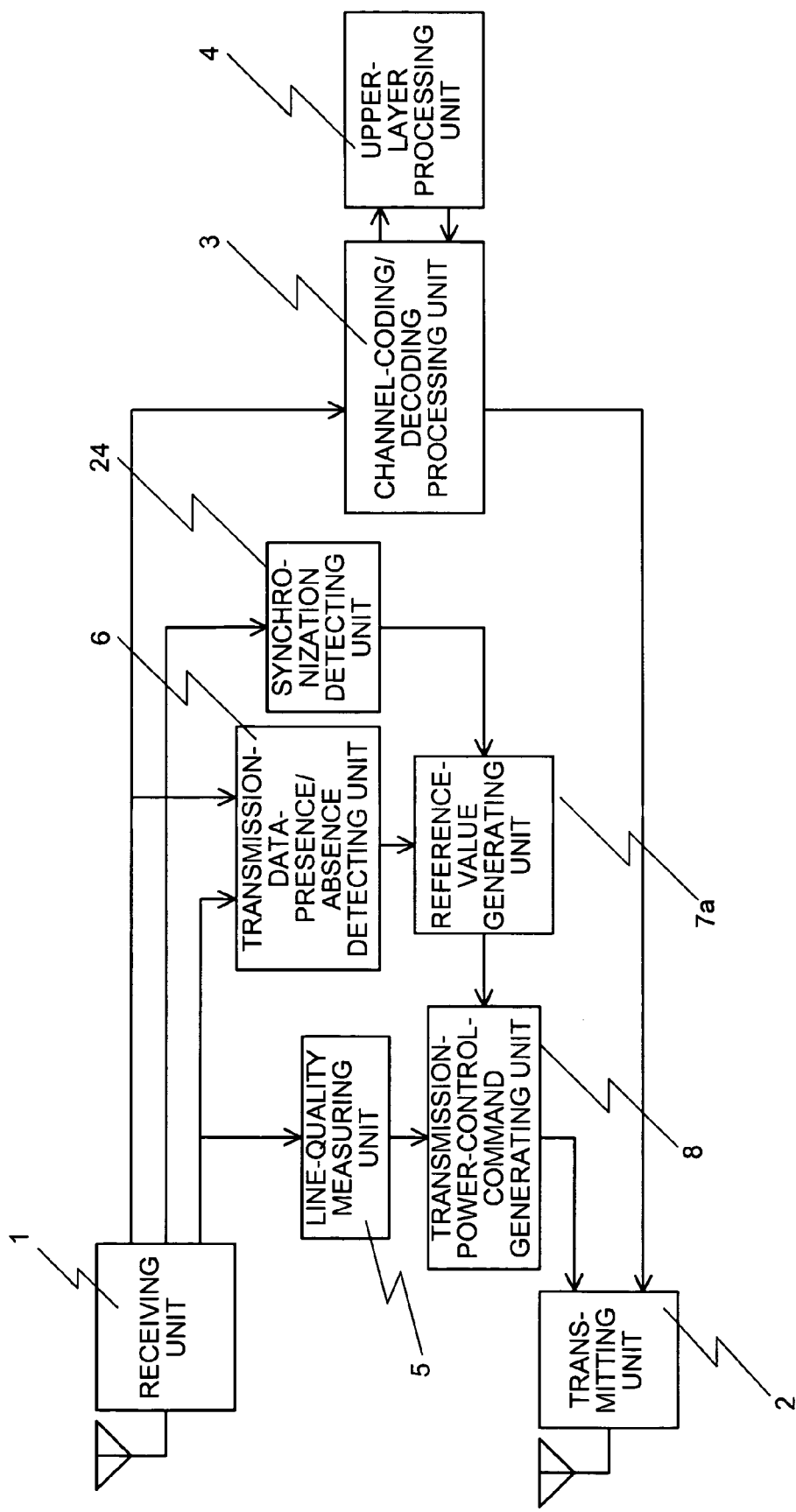
FIG. 10 is a diagram of an example of a structure of a CDMA base station apparatus according to a fourth embodiment of the present invention.

FIG. 10 is a diagram of an example of a structure of a CDMA base station apparatus according to a fourth embodiment of the present invention. The CDMA base station apparatus includes a synchronization detecting unit 24 in addition to the components according to the first embodiment. A reference-value generating unit 7a generates a reference value for transmission-power control command generation based on a result of judgment on presence or absence of transmission data and an output of the synchronization detecting unit 24. Components identical with those in FIG. 1 according to the first embodiment are denoted by the identical reference numerals and signs and explanations of the components are omitted. Processing that is different from the processing according to the first embodiment is explained.

Figure 11:
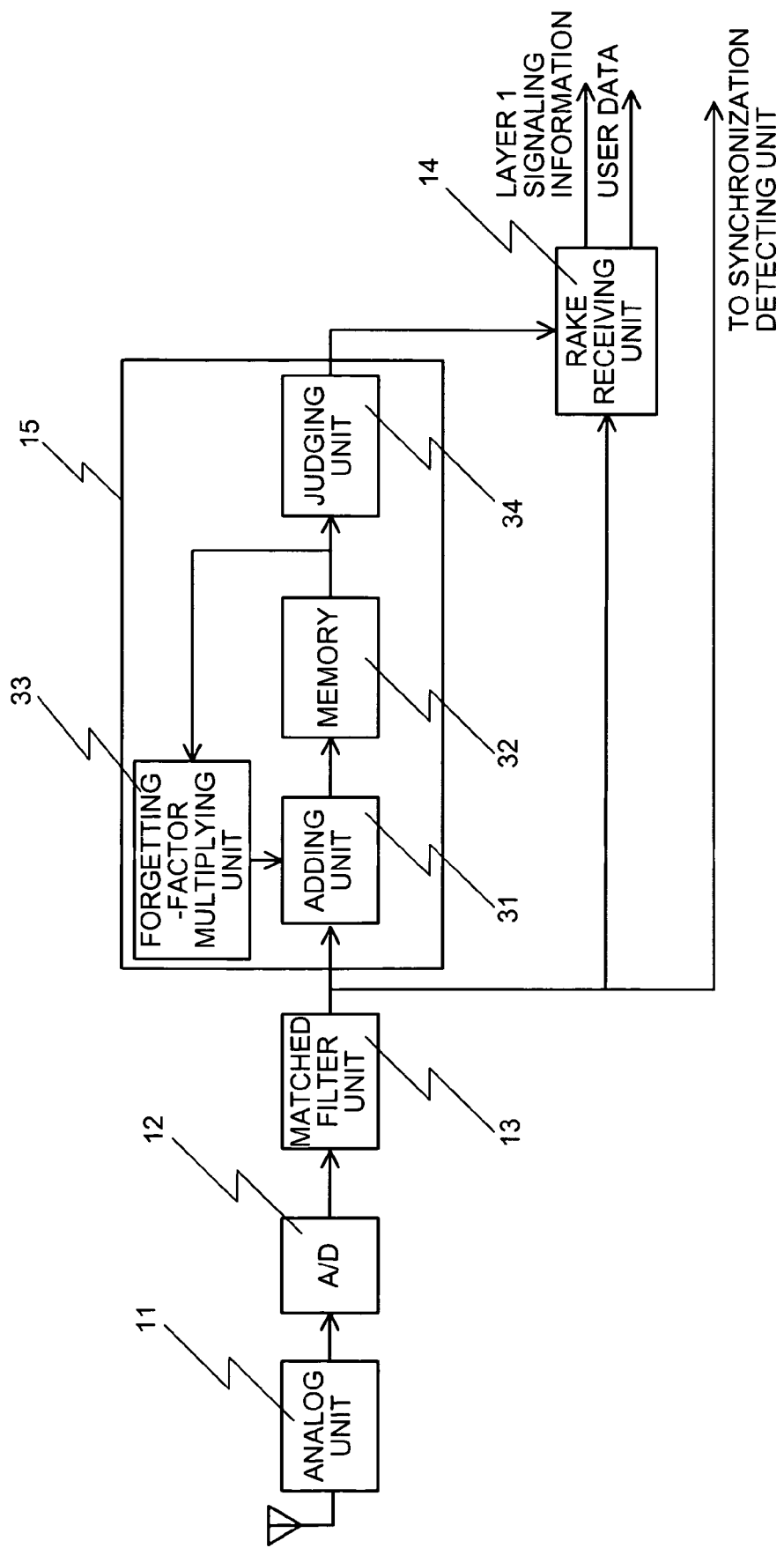
FIG. 11 is a diagram of an example of a detailed structure of a receiving unit.

First, treatment of an output of the matched filter of the receiving unit 1 is explained. FIG. 11 is a diagram of an example of a detailed structure of the receiving unit 1. Schematic operations of the receiving unit 1 are identical with those explained with reference to FIG. 4. Operations of the receiving unit 1 are explained in detail below. The matched filter unit 13 outputs correlation information to the search unit 15 and the synchronization detecting unit 24. First, the search unit 15 stores a delay profile of a first cycle in a memory 32. Subsequently, a forgetting-factor multiplying unit 33 multiplies the delay profile by a forgetting factor. An adding unit 31 adds a result of the multiplication to a delay profile of a second cycle. These operations are repeatedly executed on delay profiles of a third cycle, a fourth cycle, and the like (cyclic addition). A judging unit 34 performs comparison of magnitudes of a result of the cyclic addition and a threshold defined in association with an SIR, an SINR, or an SN of a reception signal assumed to detect a path. When a plurality of paths are detected, this means that respective paths by a multi-path radio channel have arrived at the receiving unit 1. The RAKE receiving unit 14 adds up output signals of the matched filter unit 13 corresponding to arrival times of the paths detected with phases of the output signals matched. As a result of the addition, the RAKE receiving unit 14 outputs a known sequence such as the DPCCH or layer 1 signaling information to the line-quality measuring unit 5 and the transmission-data-presence/absence detecting unit 6. The Rake receiving unit 14 also outputs user data to the channel-coding/decoding processing unit 3 and the transmission-data-presence/absence detecting unit 6.

Figure 12:
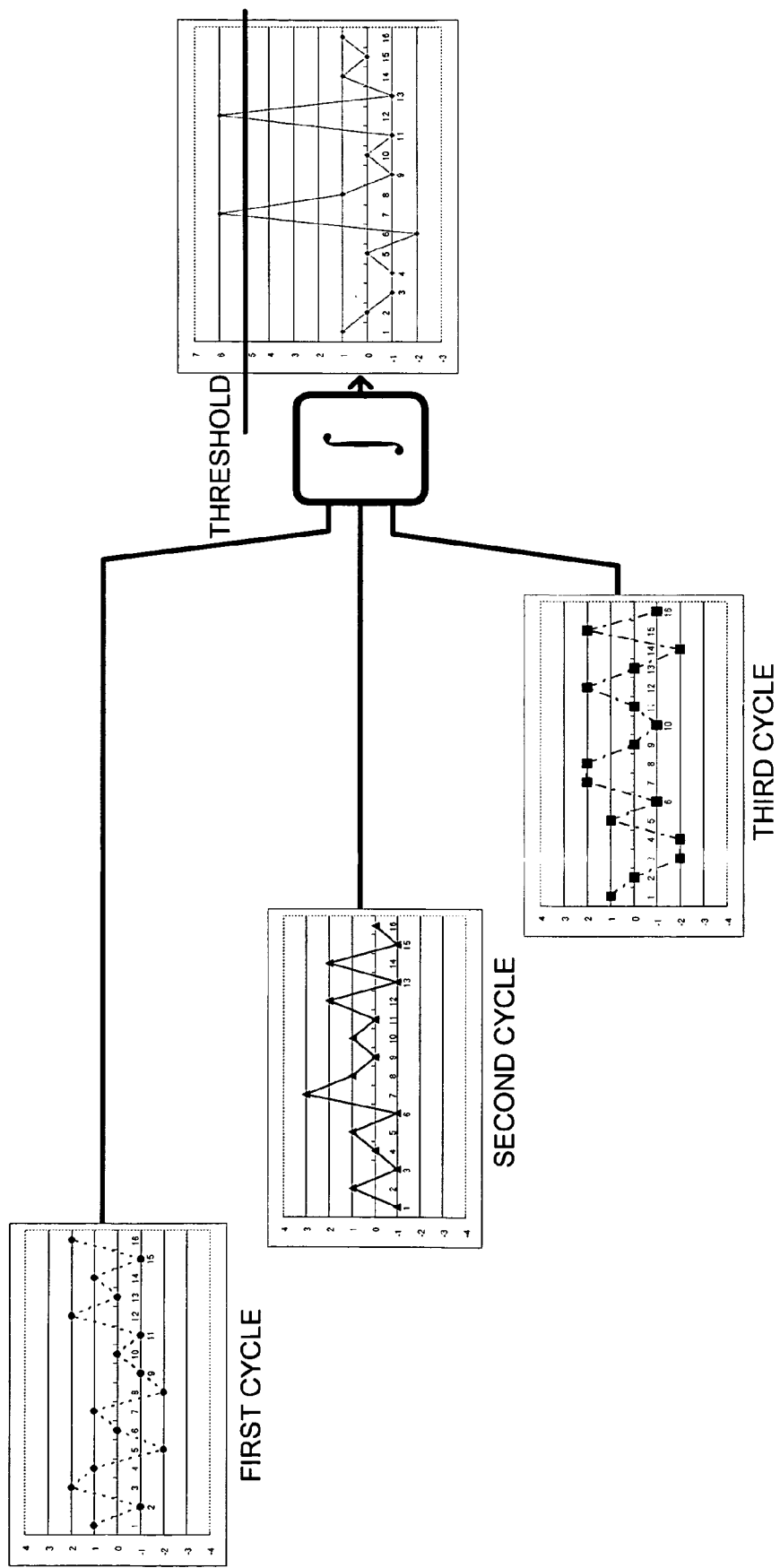
FIG. 12 is a diagram for explaining an output of a matched filter at the time when a forgetting factor is 0 and cyclic addition and threshold comparison in a search unit.

FIG. 12 is a diagram for explaining an output of the matched filter unit 13 at the time when a forgetting factor is 0 (not forget) and cyclic addition and threshold comparison in the search unit 15. Waveforms of first to third cycles indicate examples of outputs of the matched filter unit 13 subjected to Binary Phased Shift Keying (BPSK) modulation. It is seen that, although it is difficult to estimate an arrival time difference of arrival waves by a multi-path only with the outputs of the matched filter unit 13, a correlation value increases by integrating the outputs and two paths are seen. When a value obtained by the cyclic addition is equal to or higher than a specific threshold, it is judged that paths are present.

The search unit in performing the forgetting factor multiplication is explained with reference to FIGS. 11 and 12. However, the present invention is not limited to this. For example, a moving average of specific numbers of times may be calculated in the cyclic addition. In a communication system in which a radio channel changes, a phase rotates when signals are added up for a long time. Thus, the signals may be squared for each specific time and cyclically added up. In these cases, a threshold is set according to values of a reception SIR, SINR, and SN, although different depending on the processing.

Operations of the synchronization detecting unit 24 are explained. For example, the synchronization detecting unit 24 performs synchronization detection processing (processing for detecting whether synchronization of the local station is secured) using correlation information of a matched filter output (a first example). Note that a definition of "synchronization" in the synchronization detecting unit 24 does not have to be identical with a definition of synchronization in the radio communication system.

Figure 13:
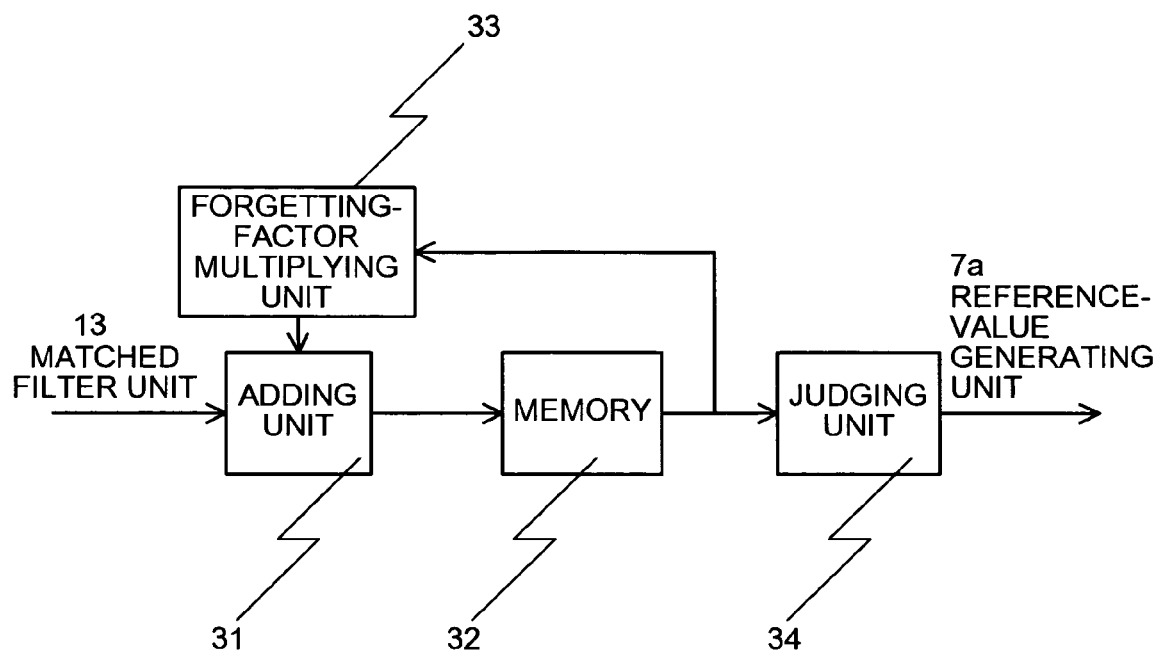
FIG. 13 is a diagram of a structure of a synchronization detecting unit.

FIG. 13 is a diagram of a structure of the synchronization detecting unit 24. The structure of the synchronization detecting unit 24 is the same as that of the search unit 15. However, a path detection level required for RAKE reception and a path detection level required for the synchronization detecting unit 24 are generally different. For example, for path detection of the synchronization detecting unit 24 in which a rough path position only has to be grasped, it is possible to set a threshold relatively low compared with path detection of the search unit 15 in which a demodulation characteristic such as an error rate of information is deteriorated if the path detection is instantaneously wrong. Like the decrease of a threshold of path detection, it is also effective to set a forgetting factor of the synchronization detecting unit 24 smaller (less easily forget) than that of the search unit 15.

In the explanation of the first example of the synchronization detection processing, the structures of the search unit 15 and the synchronization detecting unit 24 are identical. However, when the search unit 15 performs the cyclic addition shown in FIG. 12 to detect paths, to perform integration for a longer time, the synchronization detecting unit 24 may square signals for each cycle and, then, add up the signals. In the search unit 15, a method of cyclically adding up signals using user data (squaring signals for each cycle and adding up the signals because it is unknown whether the user data is 0 or 1). However, in the synchronization detecting unit 24, since it is an object to secure synchronization when user data is absent, it is possible to more accurately detect synchronization without noise when the user data is not used.

The synchronization detecting unit 24 may perform synchronization detection processing in processing that is different from the first example of the synchronization detection processing (a second example).

Figure 14:
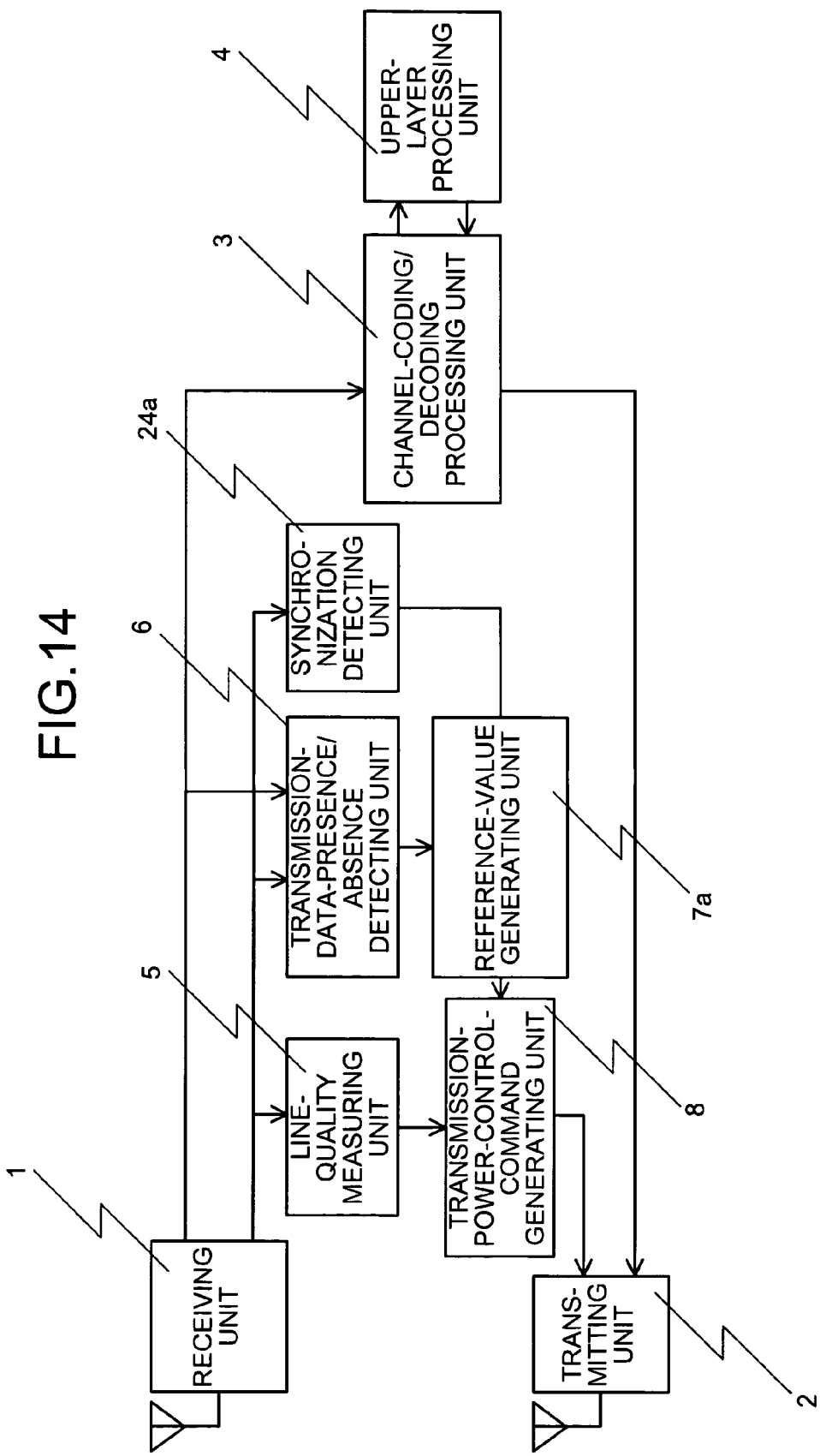
FIG. 14 is a diagram of an example of a structure of the CDMA base station according to the fourth embodiment of the present invention.

FIG. 14 is a diagram of an example of a structure according to the fourth embodiment of the CDMA base station apparatus according to the present invention. For example, a known sequence of the layer 1 (equivalent to a synchronous word or preamble) or layer 1 signaling information (equivalent to a TFCI or a TPC in the WCDMA-FDD of the 3GPP) is inputted to the synchronization detecting unit 24a.

The synchronization detecting unit 24a counts, for example, the number of bits of an error of the known sequence of the layer 1 in which arrangement of data of 0 and 1 is known in advance and compares the number of bits with a threshold. As in the first example, the method of cyclically adding up signals while multiplying the signals by a forgetting factor or the method of calculating a moving average of the signals is effective. A method of counting a percentage of layer 1 signaling information being outside an assumed range and judging synchronization is also effective. For example, according to "TS25.212V3.12.4.3.3" of the WCDMA-FDD of the 3GPP, the TFCI before being coded can take 0 to 1023 in 10 bits. However, only 0, 1, 2, and 3 are defined in communication set, if TFCIs other than 0, 1, 2, and 3 are within a fixed percentage, it is judged that synchronization is secured.

In the TPC, data meaning "increase" is "00" and data meaning "decrease" is "11". "01" and "10" are impossible data. If the impossible data are within a fixed percentage, it is judged that synchronization is secured.

Subsequently, when an output of the synchronization detection unit 24 or 24a constituted as described above indicates "synchronization" and transmission data from the mobile apparatus is absent, the reference-value generating unit 7a gradually decreases the reference value for generating a transmission-power control command. On the other hand, when the output indicates "out of synchronization" and there is no transmission data from the mobile apparatus, the reference-value generating unit 7a gradually increases the reference value. When a forgetting factor for cyclic addition is larger (forgetting is fast), the reference-value generating unit 7a increases speed of reducing the reference value. When a forgetting factor for cyclic addition is small (forgetting is slow), the reference-value generating unit 7a decreases speed of reducing the reference value.

Figure 15:
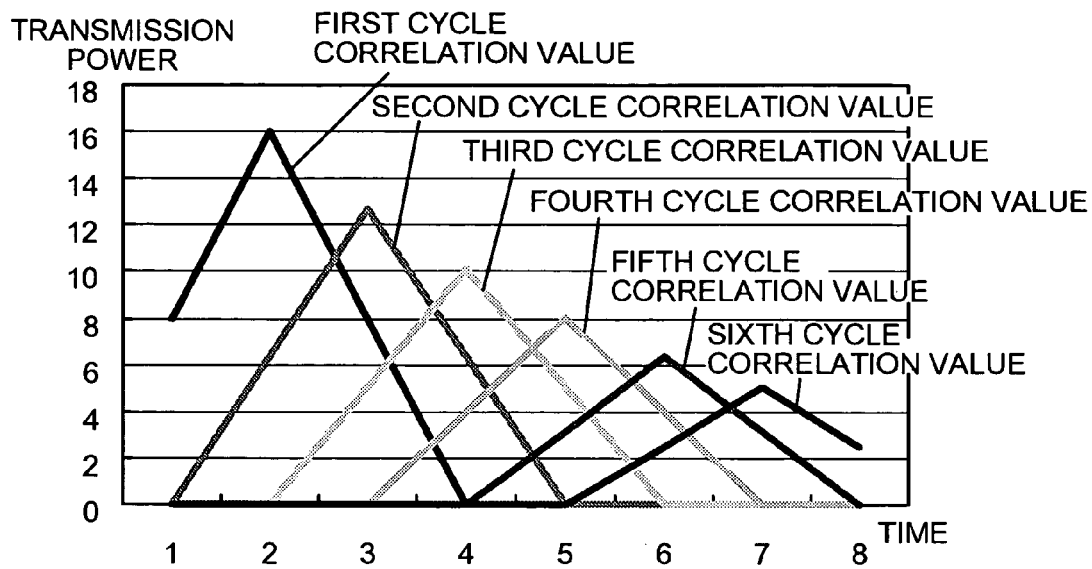
FIG. 15 is a graph of outputs of a matched filter unit of binary phase shift keying (BPSK)

Operations of the reference-value generating unit 7a are specifically explained. FIG. 15 is a graph of outputs of the matched filter unit 13 of the BPSK. Assuming that the synchronization detecting unit 24 or 24a is in a state of "synchronization", a reference value is decreased by 1 decibel for each cycle and transmission power of the mobile apparatus decreases by 1 decibel at a time following the decrease of the reference value. It is seen that, since the mobile apparatus is located far away, a path detection position becomes one sample time longer for each cycle.

Figure 16:
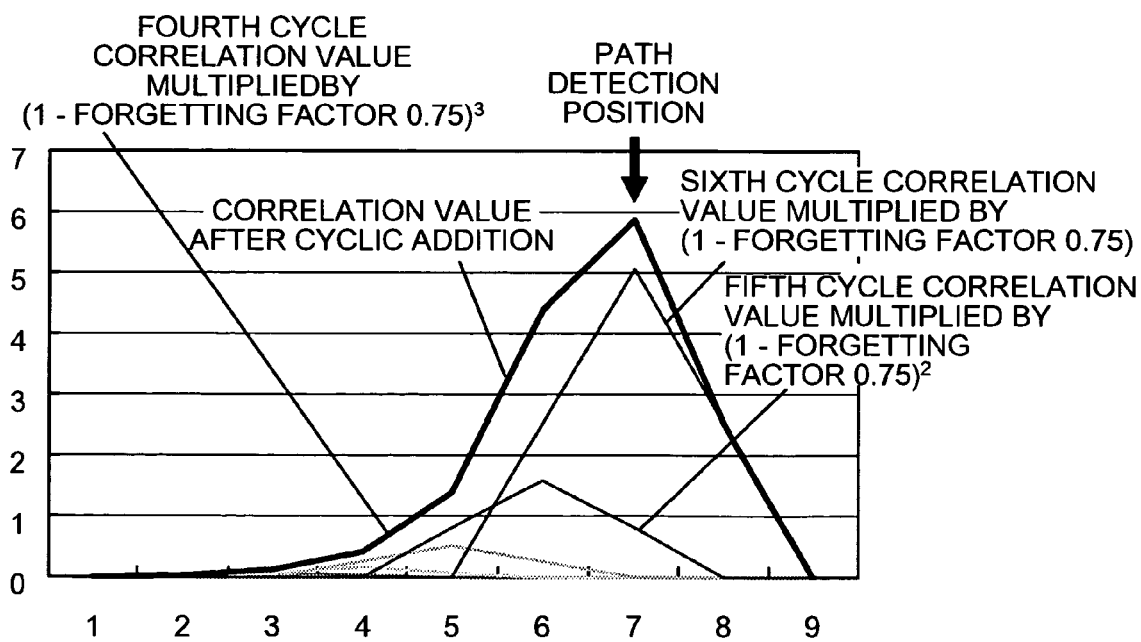
FIG. 16 is a graph of a result of cyclically adding up signals in FIG. 15 while multiplying the signals by the forgetting factor in the synchronization detecting unit.
Figure 17:
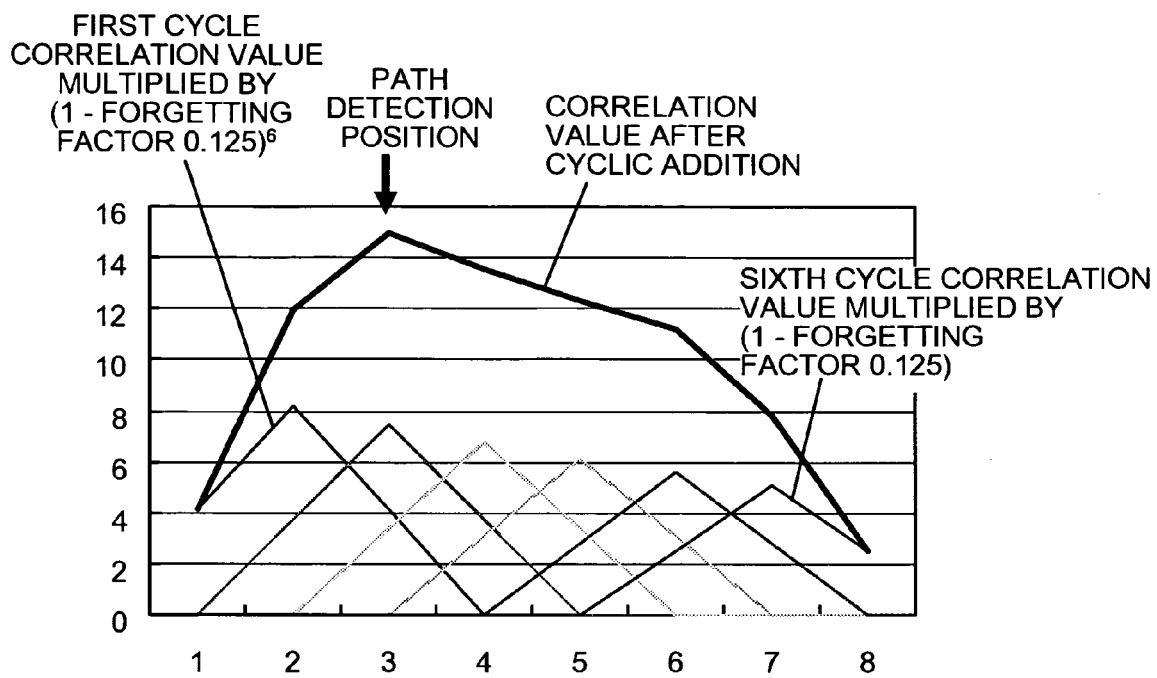
FIG. 17 is a graph of a result of cyclically adding up the signals in FIG. 15 while multiplying the signals by the forgetting factor in the synchronization detecting unit.

FIGS. 16 and 17 are graphs of results obtained by cyclically adding up signals in FIG. 15 while multiplying the signals by a forgetting factor in the synchronization detecting unit 24 or 24a. In the figures, a forgetting factor at the time when the synchronization detecting unit 24 or 24a performs cyclic addition is also at an identical cycle. In an example shown in FIG. 16, the forgetting factor indicates high forgetting speed of 0.75 (a multiplier 0.25). In an example shown in FIG. 17, the forgetting factor indicates low forgetting speed of 0.125 (a multiplier 0.875). It is desired to realize reduction of transmission power of the mobile apparatus by setting the forgetting factor as small as possible. However, it is seen that, when the reference value is changed too fast, it is impossible to accurately detect paths if the forgetting factor is set too small.

Figure 18:
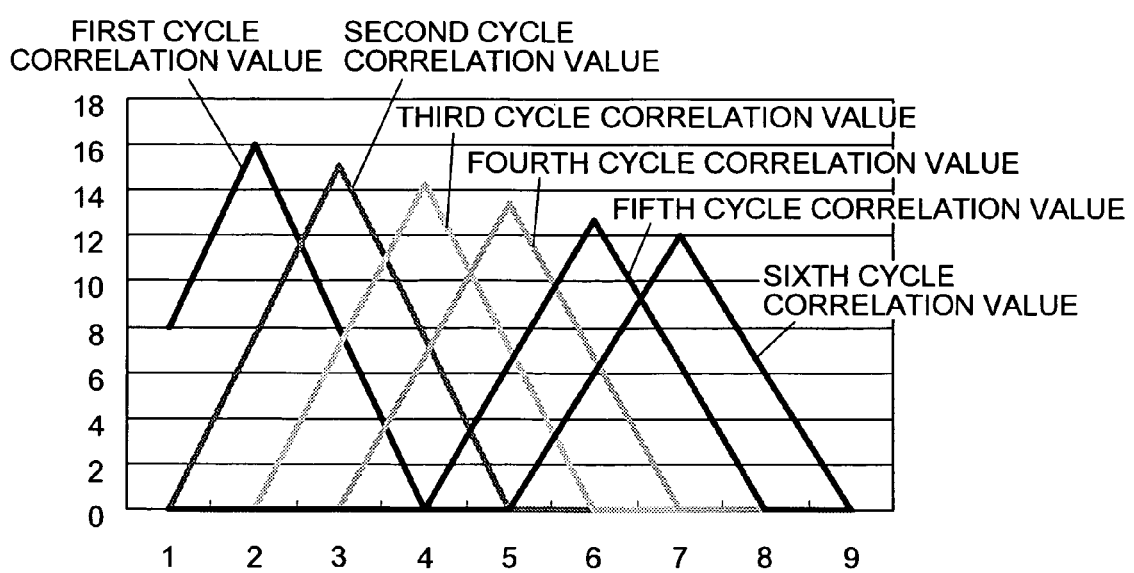
FIG. 18 is a graph of outputs of a matched filter unit that is an object of comparison with FIG. 15.

FIG. 18 is a graph of outputs of the matched filter unit 13 that is an object of comparison with FIG. 15. Assuming that the synchronization detecting unit 24 and 24a is in a state of "synchronization", a reference value is decreased by 0.25 decibel for each cycle and transmission power of the mobile apparatus decreases by 0.25 decibel at a time following the decrease of the reference value. It is seen that, since the mobile apparatus is located far away, a path detection position becomes one sample time longer for each cycle.

Figure 19:
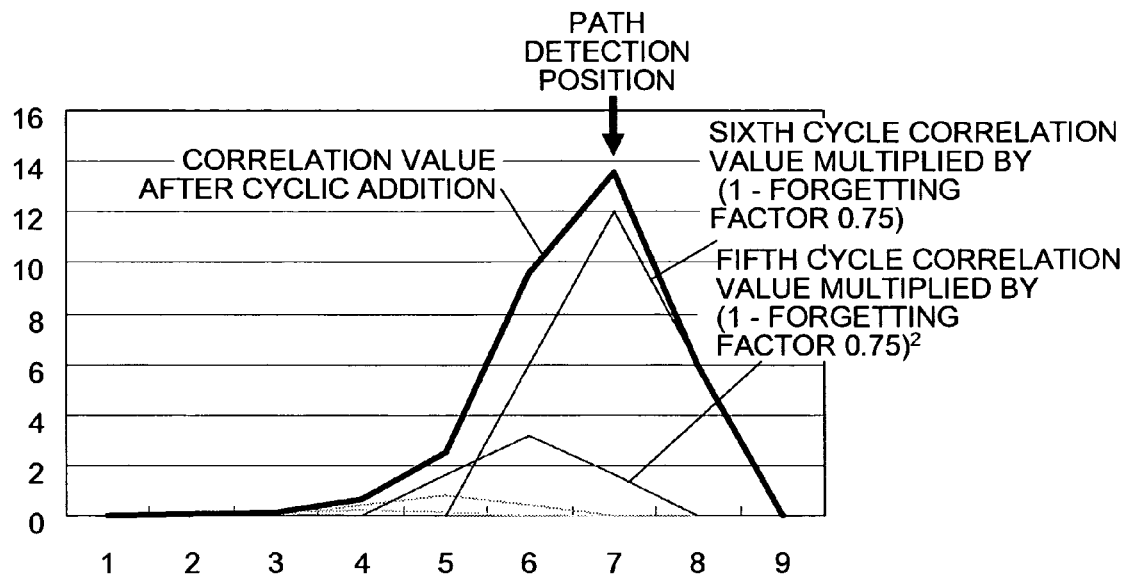
FIG. 19 is a graph of a result obtained by cyclically adding up signals in FIG. 18 while multiplying the signals by the forgetting factor in the synchronization detecting unit.
Figure 20:
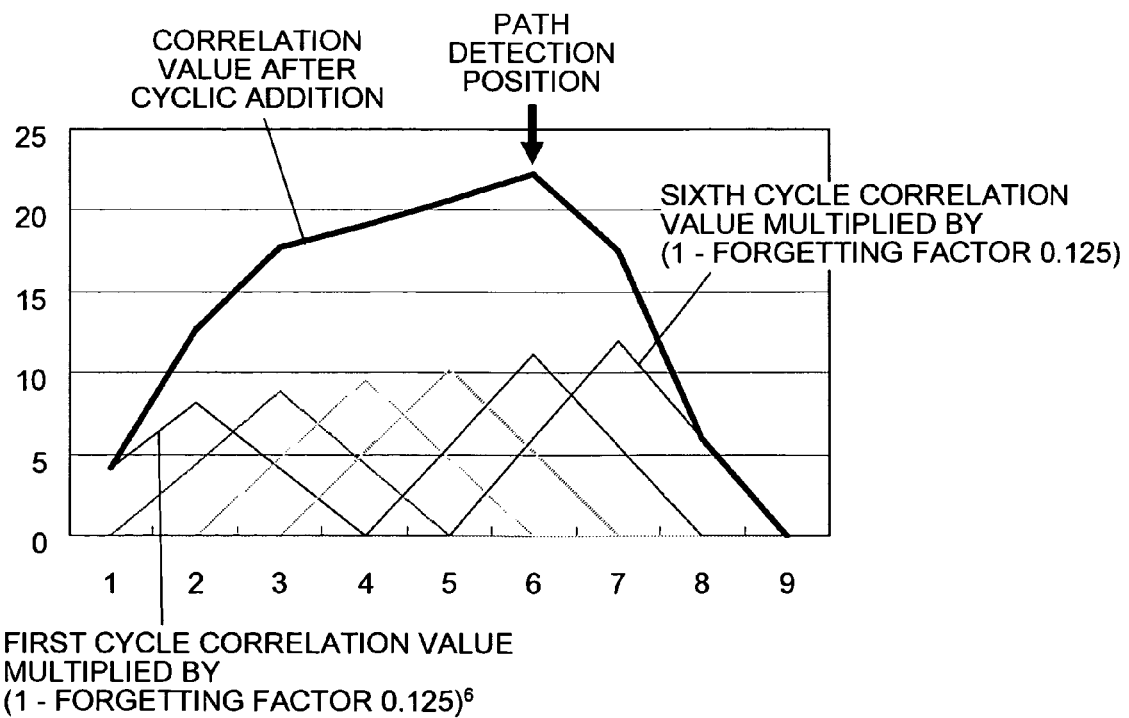
FIG. 20 is a diagram of a result obtained by cyclically adding up the signals in FIG. 18 while multiplying the signals by the forgetting factor.

FIGS. 19 and 20 are graphs of results obtained by cyclically adding up signals in FIG. 18 while multiplying the signals by a forgetting factor in the synchronization detecting unit 24 or 24a. As described above, in the figures, a forgetting factor at the time when the synchronization detecting unit 24 or 24a performs cyclic addition is also an identical cycle. In an example shown in FIG. 19, the forgetting factor is 0.75 (a multiplier 0.25). In an example shown in FIG. 20, the forgetting factor is 0.125 (a multiplier 0.875). Unlike the examples shown in FIG. 17, it is seen that, even if the forgetting factor is set to as small as 0.125, since an amount of change of the reference value is small, it is possible to detect paths as near timing and follow the paths.

As described above, according to the present embodiment, when transmission data from the mobile apparatus is absent, the reference value is adjusted based on a synchronization detection result by the processing of the synchronization detecting unit. This makes it possible to set an optimum reference value for generating a transmission-power control command.

Fifth Embodiment

Figure 21:
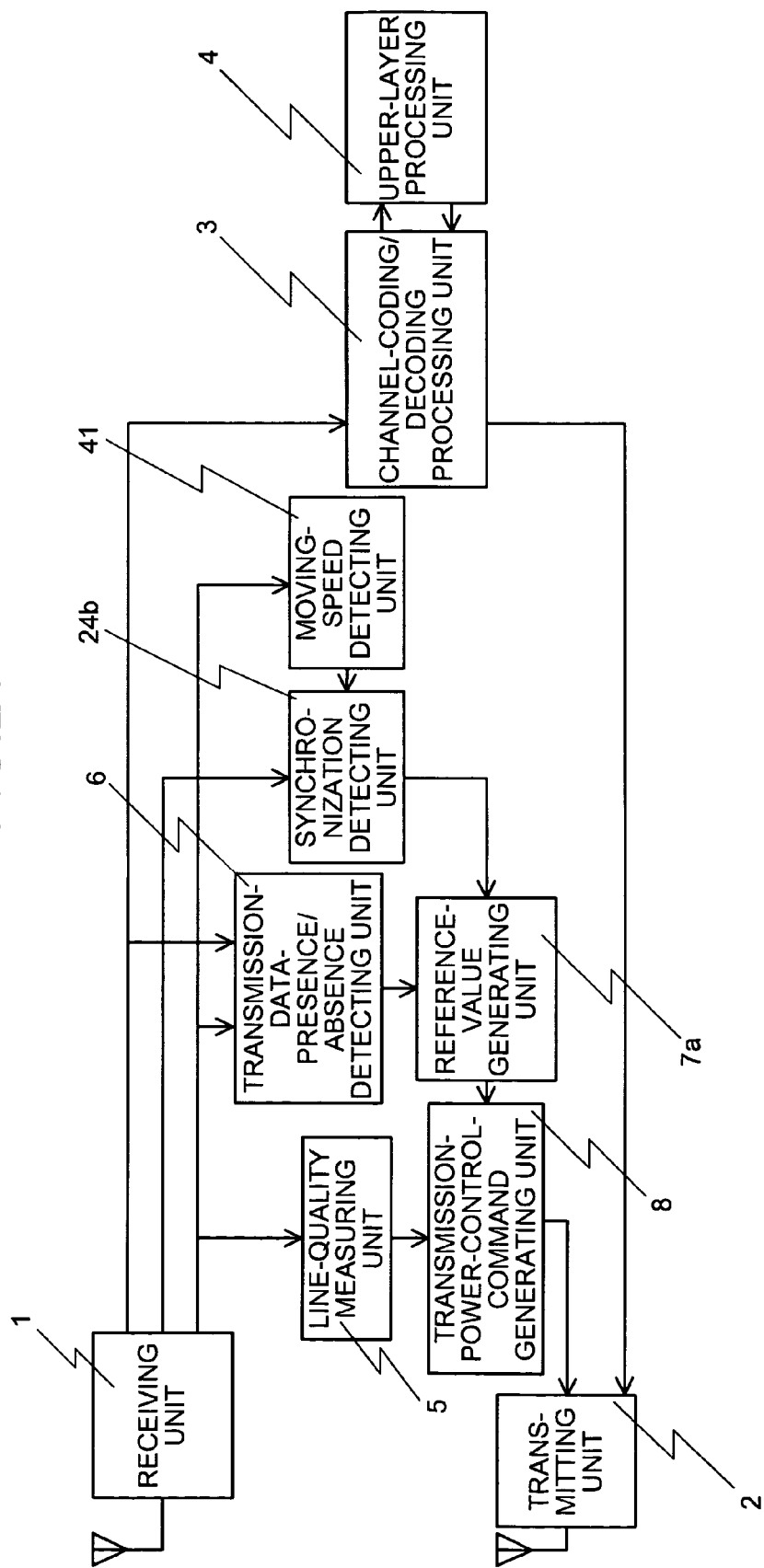
FIG. 21 is a diagram of an example of a structure of a CDMA base station apparatus according to a fifth embodiment of the present invention.

FIG. 21 is a diagram of an example of a structure of a CDMA base station apparatus according to a fifth embodiment of the present invention. The CDMA base station apparatus includes a moving-speed detecting unit 41 in addition to the components according to the fourth embodiment. A synchronization detecting unit 24b performs synchronization detection processing based on an output of the receiving unit 1 and an output of the moving-speed detecting unit 41. Specifically, the fifth embodiment is different from the fourth embodiment in processing of the moving-speed detecting unit 41 for detecting moving speed from known sequence information of the layer 1 or signaling information of the layer 1 and processing of the synchronization detecting unit 24b for adjusting synchronization detection judgment according to an output result of the moving-speed detecting unit 41. Components identical with those in FIGS. 10 and 14 according to the fourth embodiment are denoted by the identical reference numerals and signs and explanations of the components are omitted. Processing that is different from the processing according to the fourth embodiment is explained.

First, operations of the moving-speed detecting unit 41 are explained in detail. For example, the moving-speed detecting unit 41 calculates a frequency offset from a known sequence and judges that "the frequency offset is large=moving speed is high" (a first example). When the mobile apparatus is approaching at Δv, since a wavelength is reduced because of the approach, in the base station, a reception frequency is offset by a Doppler frequency as indicated by Equation (6).

$$f = \frac{c}{\lambda\left(1 - \frac{\Delta v}{c}\right)} \approx \frac{c}{\lambda}\left(1 + \frac{\Delta v}{c}\right) \tag{6}$$

Figure 22:
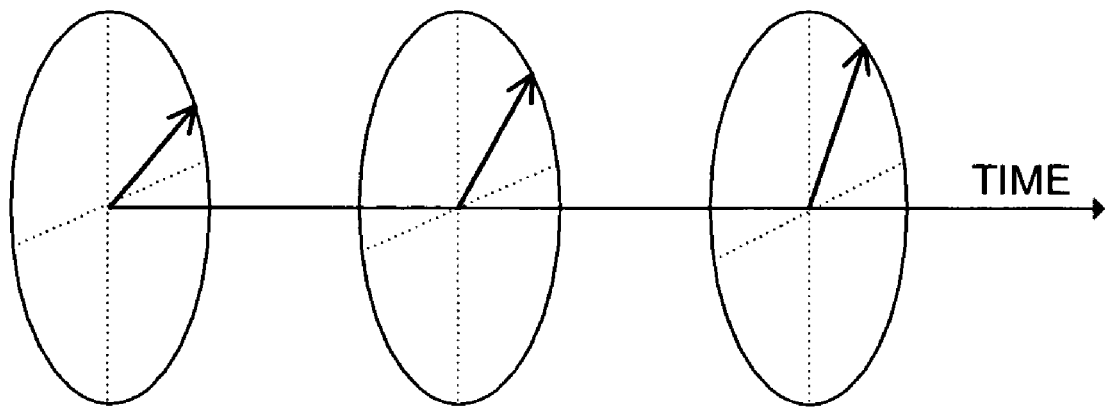
FIG. 22 is a diagram of calculation processing for a phase rotation amount per hour.
Figure 23:
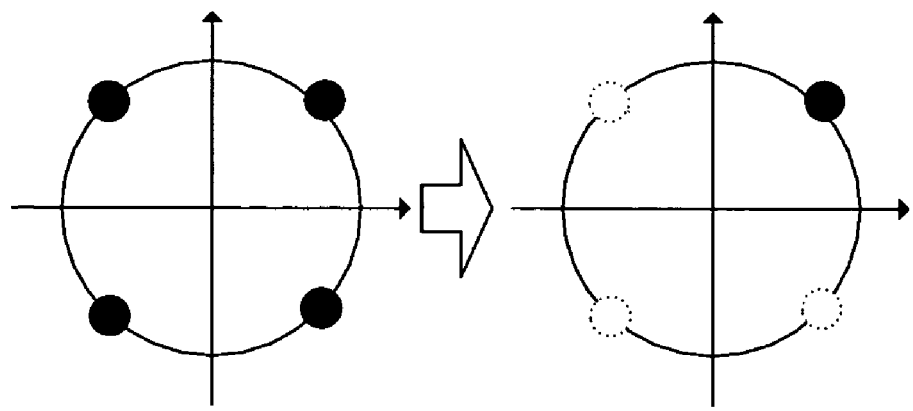
FIG. 23 is a diagram of a phase rotation amount per hour calculated using user data.

In the receiving unit 1, the frequency offset is seen as rotation of a phase plane of data of the known sequence of the layer 1 after despread. FIG. 22 is a diagram of calculation processing for a phase rotation amount per hour. For example, when phase information of the known sequence of the layer 1 is accumulated continuously several times according to FIG. 22, it is possible to calculate a phase rotation amount per hour and estimate moving speed. However, it is also effective to perform the moving speed estimation processing with user data using a characteristic of a modulation system without using the known sequence. For example, when QPSK modulation is performed, data after despread are in specific four places. If code bits are changed to positive, it is possible to represent the data as shown in FIG. 23. FIG. 23 is a diagram of a phase rotation amount per hour calculated using user data. Therefore, as in the case of the known sequence of the layer 1, if the user data are accumulated continuously several times, it is possible to calculate a phase rotation amount per hour and estimate moving speed.

Figure 24:
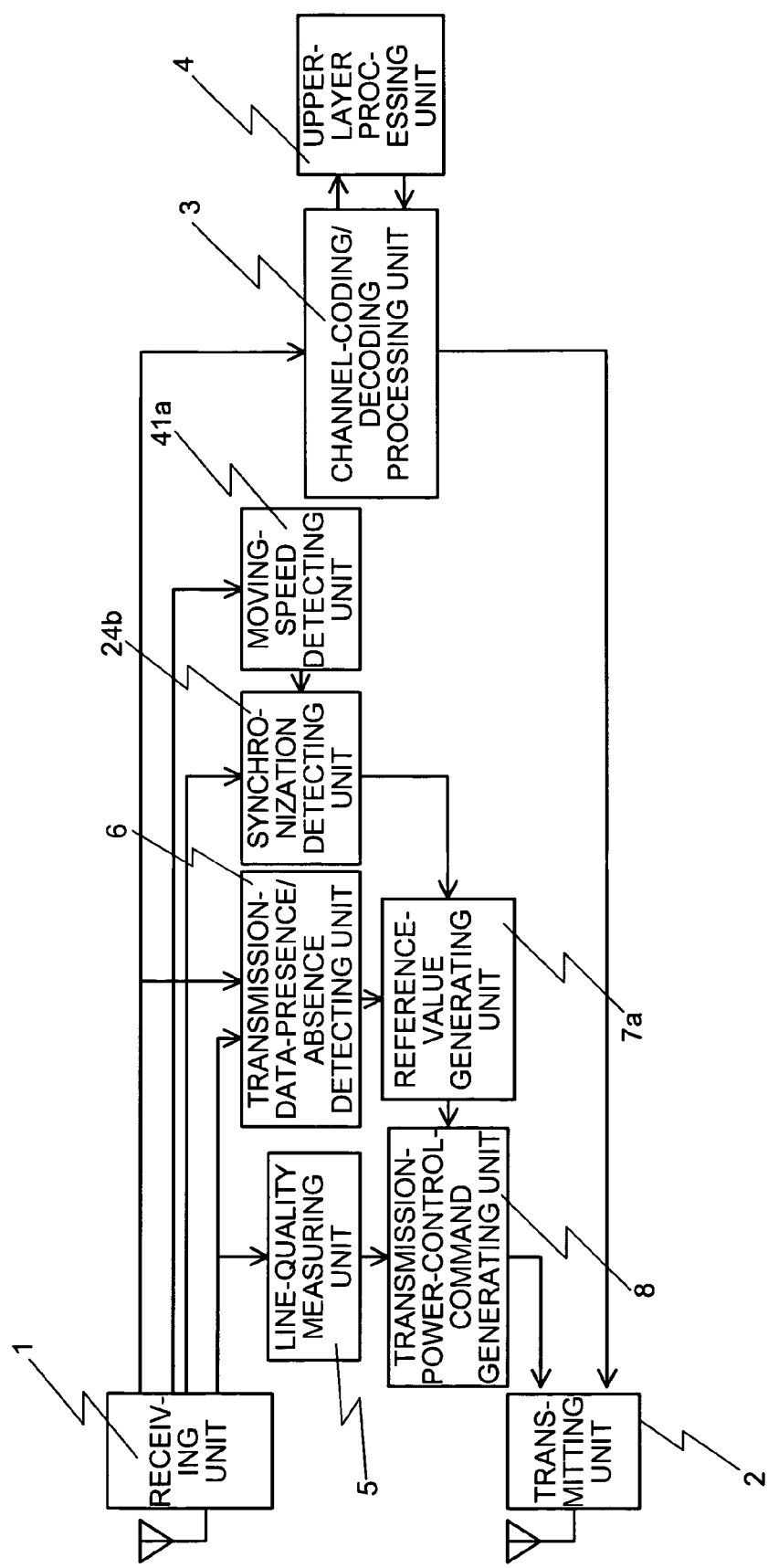
FIG. 24 is a diagram of an example of a structure of the CDMA base station apparatus according to the fifth embodiment of the present invention.
Figure 25:
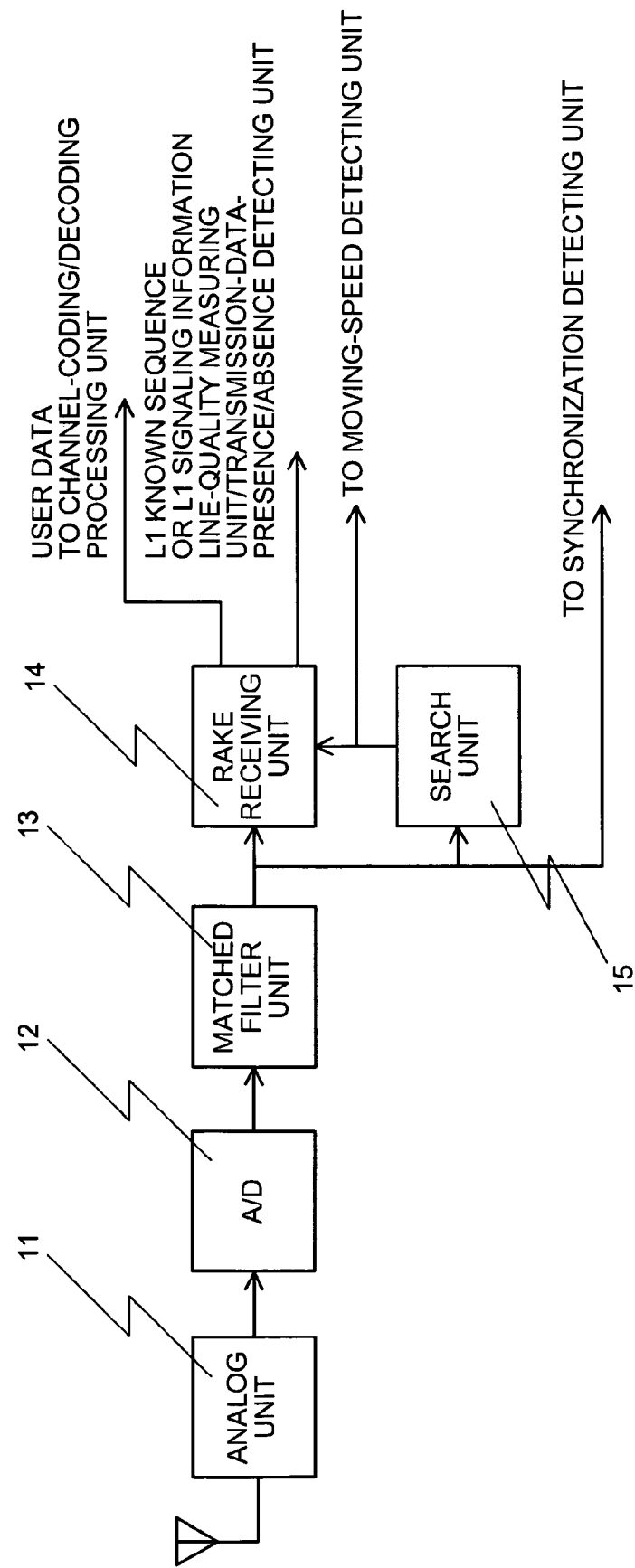
FIG. 25 is a diagram of an example of a structure of a receiving unit.

The moving-speed detecting unit may perform moving speed detection processing in processing that is different from the first example of the moving speed detection processing (a second example). FIG. 24 is a diagram of an example of a structure according to the fifth embodiment of the CDMA base station apparatus according to the present invention. As shown in FIG. 25, a moving-speed detecting unit 41a performs the moving speed detection processing based on an output of the search unit 15 in the receiving unit 1 ("an output of the search unit 15 in the receiving unit 1=path position information"). FIG. 25 is a diagram of an example of a structure of the receiving unit 1.

Besides, the moving-speed detecting unit may calculate moving speed using the Global Positioning System (GPS). For example, the mobile apparatus is mounted with the GPS, and transmits positional information to the base station as a message. The base station or a host apparatus calculates moving speed of the mobile apparatus from changing speed of a position and outputs the moving speed to the synchronization detecting unit 24. The mobile apparatus may calculate moving speed and transmit a result of the calculation to the base station with a message.

Operations of the synchronization detecting unit 24b are explained in detail. Based on the moving speed information inputted, for example, the synchronization detecting unit 24b sets a forgetting factor of the synchronization detecting unit 24b large (easy to forget) when the moving speed is higher than speed defined in advance and sets the forgetting factor small (less easy to forget) when the moving speed is lower than the defined speed. This makes it possible to accurately detect paths even if transmission power of the mobile apparatus is reduced, realize synchronization detection optimized for moving speed, and generate an optimum transmission-power control command. In performing synchronization detection using a moving average, for example, the synchronization detecting unit 24b sets a denominator for calculating a moving average small (easy to forget) when moving speed is higher than speed defined in advance and sets the denominator large (less easy to forget) when the moving speed is lower than the defined speed. This makes it possible to obtain the same effect as the effect in adjusting the forgetting factor. FIG. 17 is used in the fourth embodiment as an example at the time when the forgetting factor is too small. However, from a different point of view, it is also possible to consider that path detection is wrong because moving speed is too high with respect to a specific forgetting factor (0.125).

Sixth Embodiment

Figure 26:
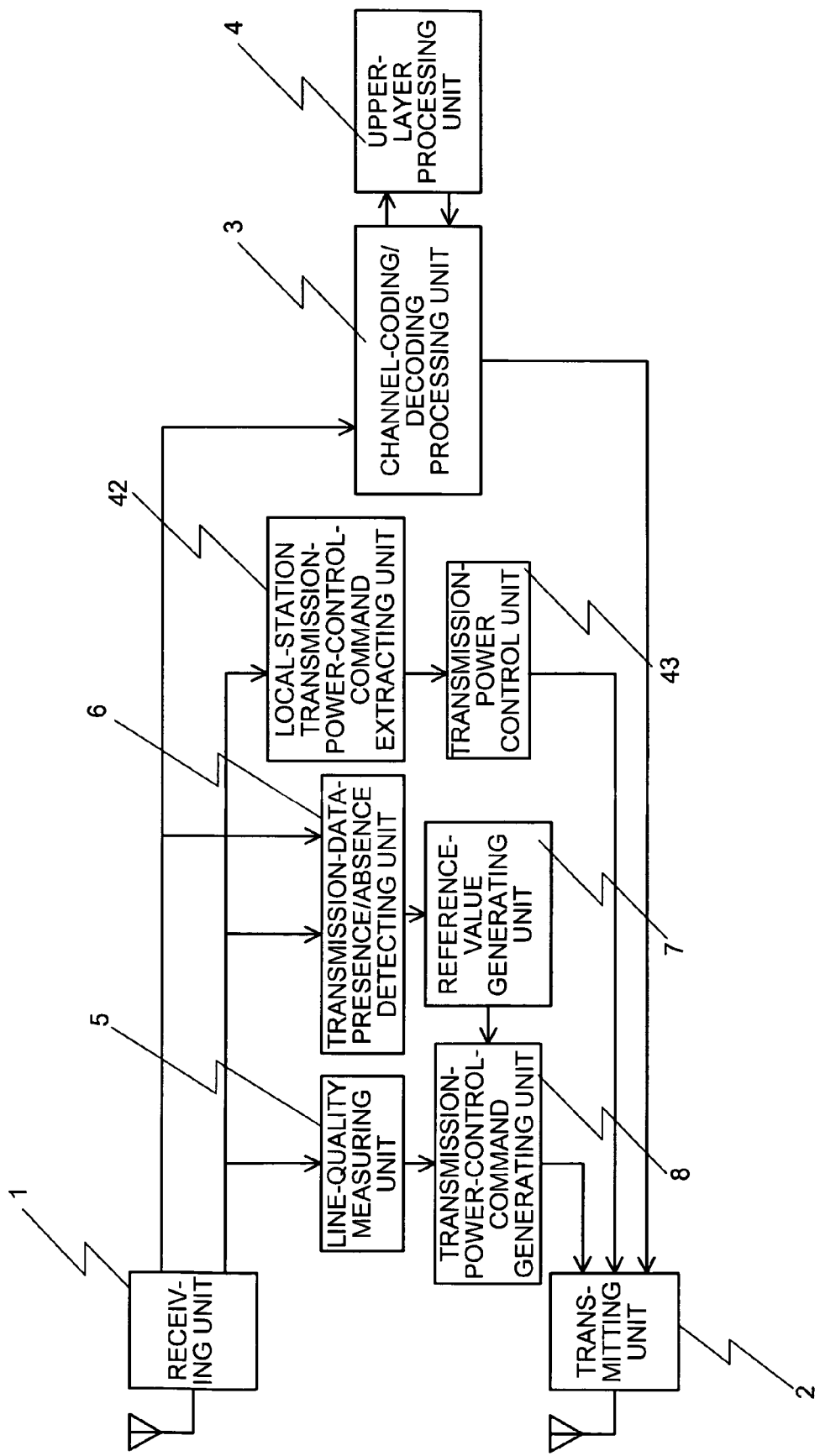
FIG. 26 is a diagram of an example of a structure of a CDMA base station apparatus according to a sixth embodiment of the present invention.

FIG. 26 is a diagram of an example of a structure of a CDMA base station apparatus according a sixth embodiment of the present invention. The CDMA base station apparatus includes a local-station transmission-power-control-command extracting unit 42 and a transmission-power control unit 43 in addition to the components according to the first embodiment. The local-station transmission-power-control-command extracting unit 42 extracts a transmission-power control command of the local station from signaling information of the layer 1. The transmission-power control unit 43 determines transmission power from the command extracted. Components identical with those in FIG. 1 according to the first embodiment are denoted by the identical reference numerals and signs and explanations of the components are omitted. Processing that is different from the processing according to the first embodiment is explained.

According to the present embodiment, when mobile-apparatus transmission data is absent, processing of the transmission-power control unit 43 for determining transmission power based on a command extracted by the local station transmission-power-control-command extracting unit 42 is explained in detail.

When mobile-apparatus transmission data is absent, since transmission power from the opposed station is small, the transmission-power control unit 43 performs transmission power control once with n (an integer equal to or larger than 2) times of transmission-power control commands to improve likelihood.

Specifically, the transmission-power control unit 43 calculates an average of transmission-power control commands of the local station for n times extracted from signaling information of the layer 1. When a result of the averaging is equal to or larger than a threshold defined in advance, the transmission-power control unit 43 increases the transmission power of the opposed station by a predetermined transmission power value. When the result is equal to or lower than the threshold, the transmission-power control unit 43 decreases the transmission power of the opposed station by the predetermined transmission power value. The transmission-power control unit 43 may calculate an average of transmission-power control commands for n times with an SIR, an SNR, an SINR, or reception field intensity of the transmission-power control command extracted as reliability information and perform threshold judgment. In particular, when the opposed station is limited to an indoor operation, low-speed movement, and the like, since rapid transmission power control is unnecessary, it is effective to set n large.

The transmission-power control unit 43 may determine n according to the outer-loop adjustment amount #1. For example, the transmission-power control unit 43 sets n to 2 in the case of "the outer-loop adjustment amount #1=−3 dB" and sets n to 3 in the case of "the outer-loop adjustment amount #1=−5 dB".

Figure 27:
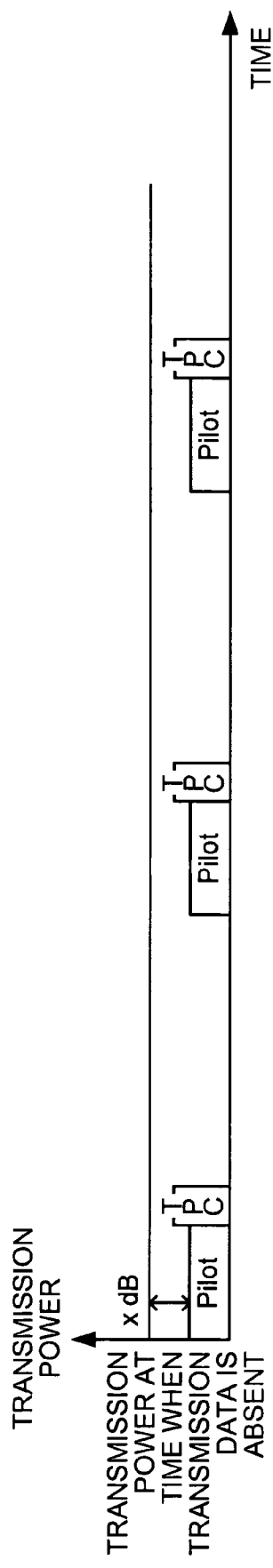
FIG. 27 is a diagram of transmission power of an opposed station at the time when transmission data is absent.

The transmission-power control unit 43 may increase and decrease n according to a QoS. For example, in the case of "an allowable delay time=small" or "an allowable number of transmission data from the local station to the opposed station=small", a reception quality of a transmission-power control command is deteriorated unless an average of transmission-power control command for n times is calculated according to the outer-loop adjustment amount #1. However, when transmission data is absent, it is possible to set n small without reducing transmission power only in the part of the transmission-power control command from the opposed station. FIG. 27 is a diagram of transmission power of the opposed station at the time when transmission data is absent. It is desirable that the transmission-power control command transmitted by the opposed station transmits the same message continuously for at least n times.

Consequently, in the base station, it is possible to realize transmission power control even if the layer 1 transmission format from the opposed station is identical with that in the past. Thus, for example, it is possible to perform demodulation processing even if change timing of pilot reception and TCP reception is unknown.

Seventh Embodiment

Figure 28:
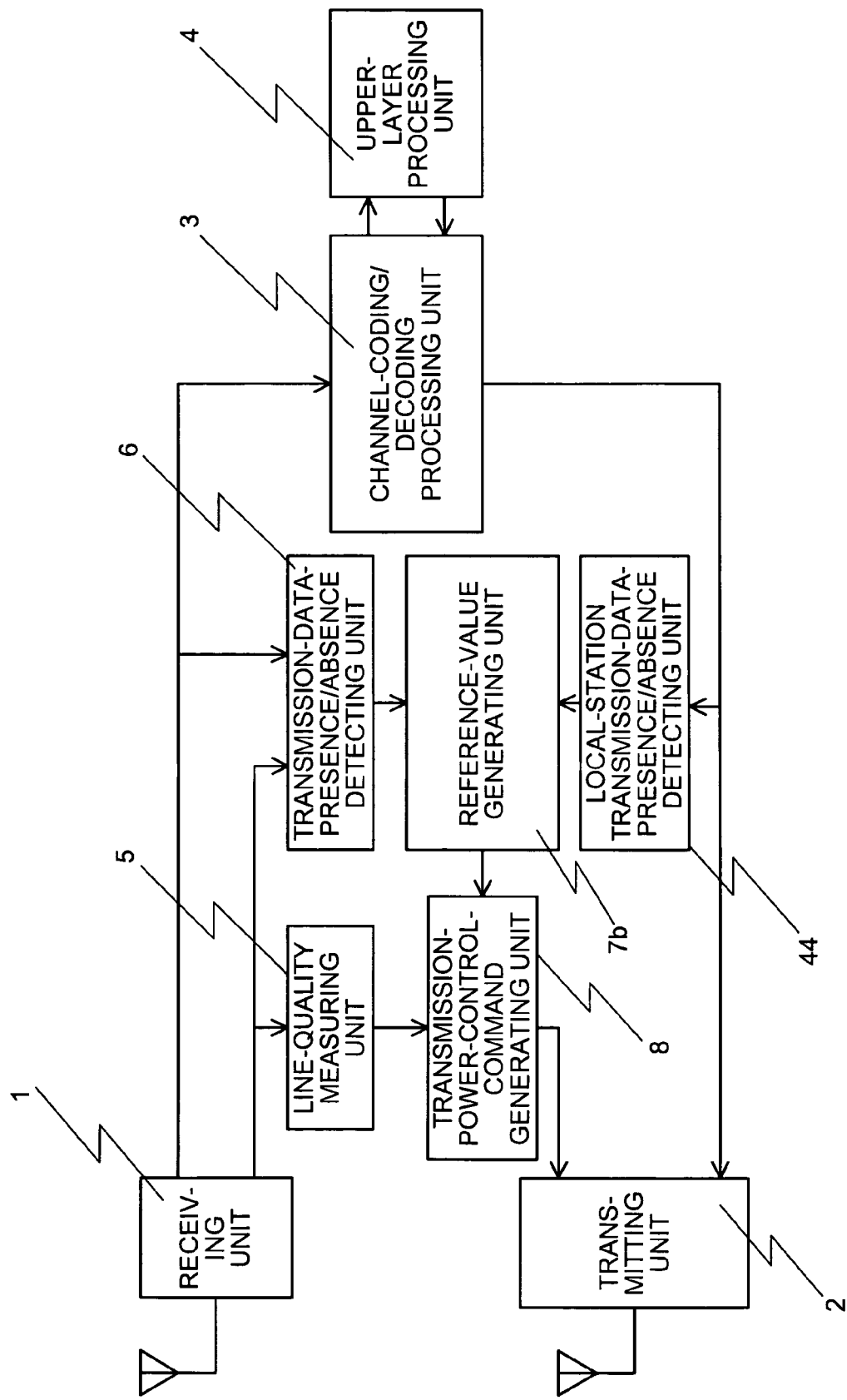
FIG. 28 is a diagram of an example of a structure of a CDMA base station apparatus according to a seventh embodiment of the present invention.

FIG. 28 is a diagram of an example of a structure of a CDMA base station apparatus according to a seventh embodiment of the present invention. The CDMA base station apparatus includes a local-station transmission-data-presence/absence detecting unit 44 in addition to the components according to the first embodiment. A reference-value generating unit 7b generates a reference value for transmission-power control command generation based on an output of the transmission-data-presence/absence detecting unit 6 and an output of the local-station transmission-data-presence/absence detecting unit 44. Components identical with those in FIG. 1 according to the first embodiment are denoted by the identical reference numerals and sings and explanations of the components are omitted. Processing that is different from the processing according to the first embodiment is explained.

The reference-value generating unit 7b according to the present embodiment validates the outer-loop adjustment amount #1 when there is no transmission data from the opposed station and there is no transmission data from the local station to the opposed station (not depending on presence or absence of communication from the local station to stations other than the opposed station). In other words, when transmission data from the opposed station is absent and transmission data from the local station is absent, the reference-value generating unit 7b decreases the reference value by a value equivalent to the outer-loop adjustment amount #1. Thereafter, when presence of transmission data of the local station is detected, the reference-value generating unit 7b increases the reference value by a value equivalent to the outer-loop adjustment amount #1.

Operations of the local-station transmission-data-presence/absence detecting unit 44 are explained. In a response time until transmission power of the opposed station is actually reduced by lowering a target reception quality by a degree equivalent to the outer-loop adjustment amount #1, a delay time until it is detected that transmission data is resumed, and a response time until transmission power of the opposed station is actually increased by raising a target reception quality by a degree equivalent to the outer-loop adjustment amount #1, when presence or absence of transmission data of the local station is judged in a short time, it is likely that this leads to misjudgment and decreases throughput.

Thus, according to the present embodiment, when time in which absence of transmission data continues (no-transmission continuous time) reaches a specific time (a no-transmission judgment threshold), the local-station transmission-data-presence/absence detecting unit 44 judges that transmission data of the local station is absent. When even one transmission data is generated in the specific time, the local-station transmission-data-presence/absence detecting unit 44 judges that there is transmission data of the local station. This makes it possible to prevent misjudgment.

The no-transmission judgment threshold depends on content of user data transmitted and received. For example, the local-station transmission-data-presence/absence detecting unit 44 determines a no-transmission judgment threshold according to any one of an allowable delay time and an allowable error rate equivalent to a QoS of local station transmission data or both. When transmission data is data obtained by multiplexing a plurality of QoSs in a radio section, for example, the local-station transmission-data-presence/absence detecting unit 44 sets a maximum value of no-transmission judgment thresholds corresponding to any one of allowable delay times and allowable error rates equivalent to the QoSs or both as a no-transmission judgment threshold of the multiplexed data.

When transmission data is data obtained by multiplexing a plurality of QoSs and the transmission data is generated in a state of absence of local station transmission data, the local-station transmission-data-presence/absence detecting unit 44 sets a maximum value of no-transmission thresholds of any one of allowable delay times and allowable error rates equivalent to the QoSs or both of respective transmission data transmitted in a period until the next state of absence of transmission data as a no-transmission judgment threshold of the next time. This makes it possible to prevent misjudgment even at the time when transmission data is generated next time.

Moreover, the local-station transmission-data-presence/absence detecting unit 44 is also capable of performing processing described below. For example, when packet data (data for which a no-transmission judgment threshold required for each data is large) and a channel for radio control (data for which a no-transmission judgment threshold required for each data is small) are subjected to radio multiplication, packets that become burst-like traffic such as Internet access often have intervals by a unit of second once the packets are not transmitted. When the Internet access ends and absence of local-station transmission data exceeds the no-transmission judgment threshold, the local-station transmission-data-presence/absence detecting unit 44 outputs a judgment signal of absence of transmission data to the reference-value generating unit 7. However, when a larger value of the no-transmission judgment threshold calculated for each data is set as a no-transmission judgment threshold of a multi-channel, opportunities for outputting the judgment signal of absence of transmission data to the reference-value generating unit 7 is reduced and a reduction of transmission power is not facilitated.

Thus, when transmission data is generated in the local station, the local-station the local-station transmission-data-presence/absence detecting unit 44 identifies whether the transmission data is a channel for radio control or packet data. For example, when the transmission data is a channel for radio control, the local-station the local-station transmission-data-presence/absence detecting unit 44 further decreases the present no-transmission judgment threshold after data transmission. This makes it possible to further reduce transmission power of the mobile apparatus because opportunities for judgment of no transmission increase.

Eighth Embodiment

Figure 29:
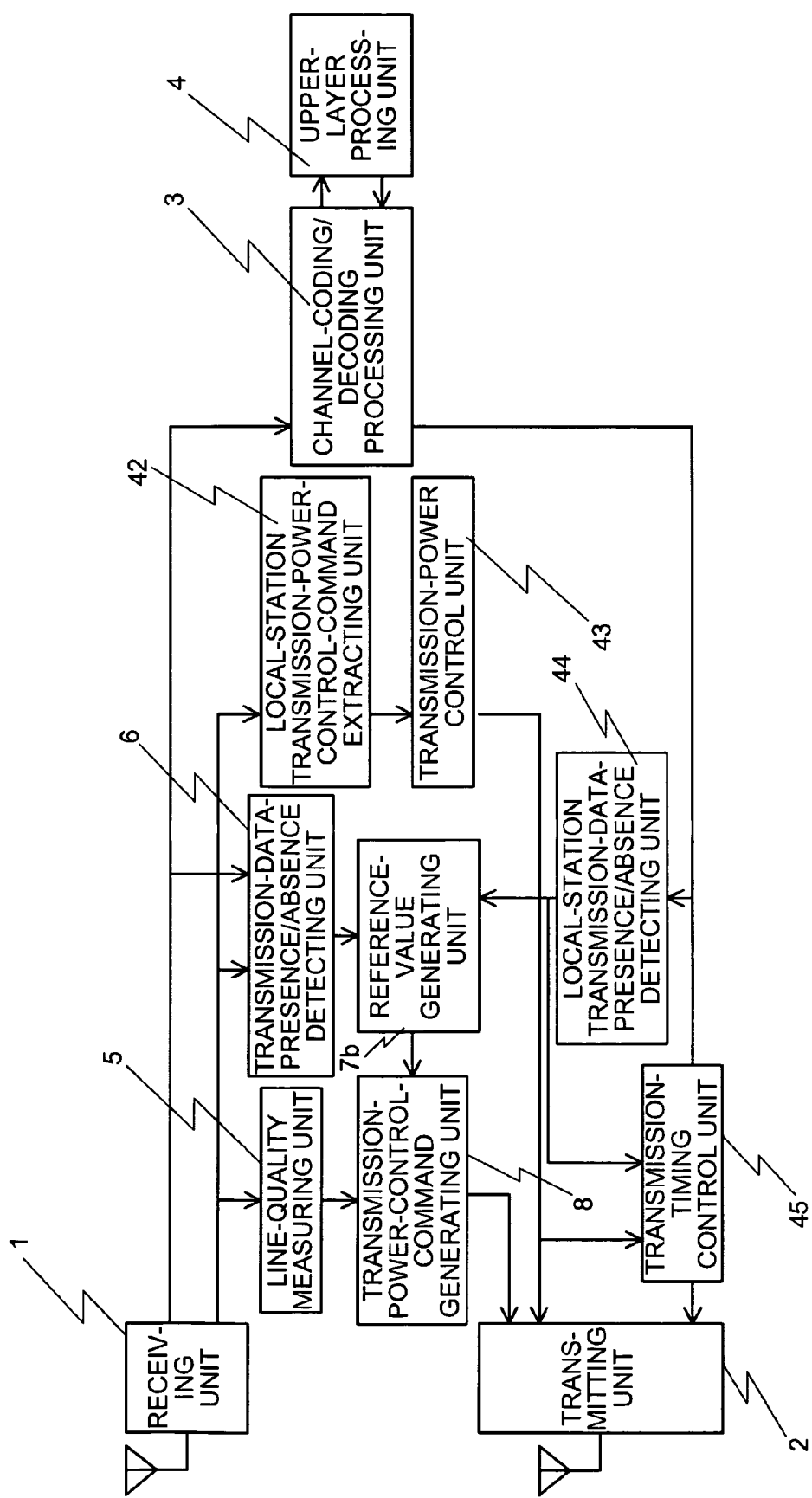
FIG. 29 is a diagram of an example of a structure of a CDMA base station apparatus according to an eighth embodiment of the present invention.

FIG. 29 is a diagram of an example of a structure of a CDMA base station apparatus according to an eighth embodiment of the present invention. For example, the CDMA base station apparatus includes both the local-station transmission-power-control-command extracting unit 42 and the transmission-power control unit 43 according to the sixth embodiment and the local-station transmission-data-presence/absence detecting unit 44 according to the seventh embodiment. The CDMA base station apparatus further includes a transmission-timing control unit 45 that controls transmission timing of local station transmission data based on an output of the transmission-power control unit 43 and an output of the local-station transmission-data-presence/absence detecting unit 44. Components identical with those according to the sixth and the seventh embodiments are denoted by the identical reference numerals and signs and explanations of the components are omitted. Processing that is different from the processing according to the sixth and the seventh embodiments is explained.

For example, in a state of absence of mobile-apparatus transmission data, when transmission power from the opposed station is reduced by the processing of the transmission-power-control-command generating unit 8, if transmission power is too low, it is likely that the base station cannot correctly receive a transmission-power control command from the opposed station and transmission power control from the local station to the opposed station becomes unstable. In such a case, for example, when a detection result of the local-station transmission-data-presence/absence detecting unit 44 changes from "transmission data is absent"

to "transmission data is present" and local-station transmission data is transmitted immediately, it is likely that a data head cannot be received in the opposed station because downlink transmission power is too low or interference with other apparatuses increases because transmission power is excessive.

Figure 30:
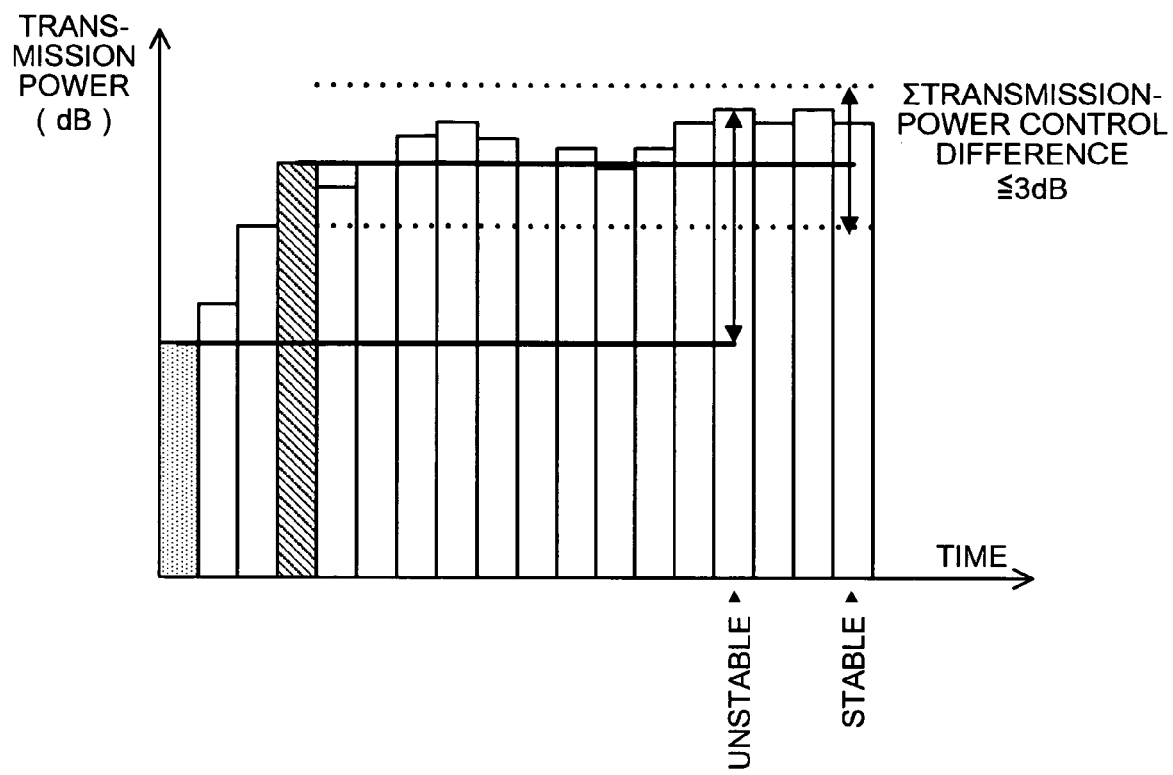
FIG. 30 is a graph of processing until an output of a transmission-power-control-command generating unit stabilizes.

Thus, according to the present embodiment, for example, when resumption of transmission data is notified from the local-station transmission-data-presence/absence detecting unit 44, the transmission-timing control unit 45 controls transmission timing to transmit data after an output in the transmission-power-control-command generating unit 8 stabilizes. "Stabilize" in this context means that, for example, an accumulation of differences of transmission power control performed fifteen times is within ±3 decibels. FIG. 30 is a diagram of processing until an output of the transmission-power-control-command generating unit 8 stabilizes.

This makes it possible to transmit data to the opposed station while reducing a delay at the time of resumption of transmission and with optimum transmission power.

Figure 31:
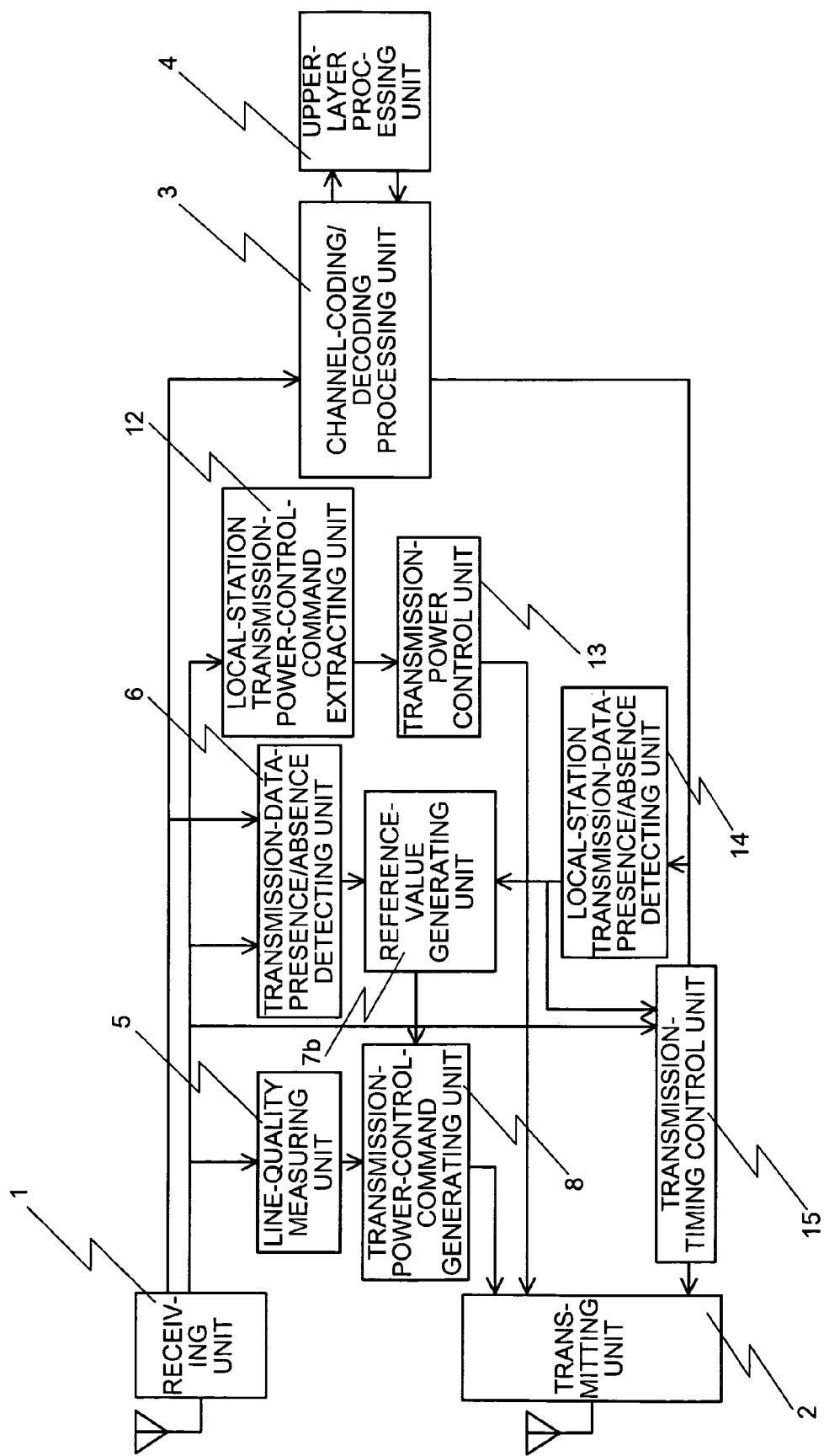
FIG. 31 is a diagram of an example of a structure of a CDMA base station apparatus according to an eighth embodiment of the present invention.

FIG. 31 is a diagram of another example of the structure of the CDMA base station apparatus according to the eighth embodiment of the present invention. In FIG. 29, the CDMA base station judges whether transmission power of the local station is stable. However, the present invention is not limited to this. For example, when transmission power control is performed at high speed as in the WCDMA-FDD of the 3GPP, as shown in FIG. 31, the CDMA base station may judge whether transmission power of the local station is stable using a line quality of a line from the opposed station. This makes it possible to obtain the same effect as the effect described above. This is because, if a line quality of a line from the opposed station is sufficient, it is possible to correctly receive a transmission-power control command from the opposed station as well.

In the case of the structure in FIG. 31, the transmission-timing control unit 45 measures a line quality (an SIR, an SNR, an SINR, or reception field intensity) using a known sequence of the layer 1 or signaling information of the layer 1. Specifically, the transmission-timing control unit 45 measures dispersion of a line quality (a square of a distance from an average of a population) and finds that the dispersion is within a threshold.

Ninth Embodiment

Figure 32:
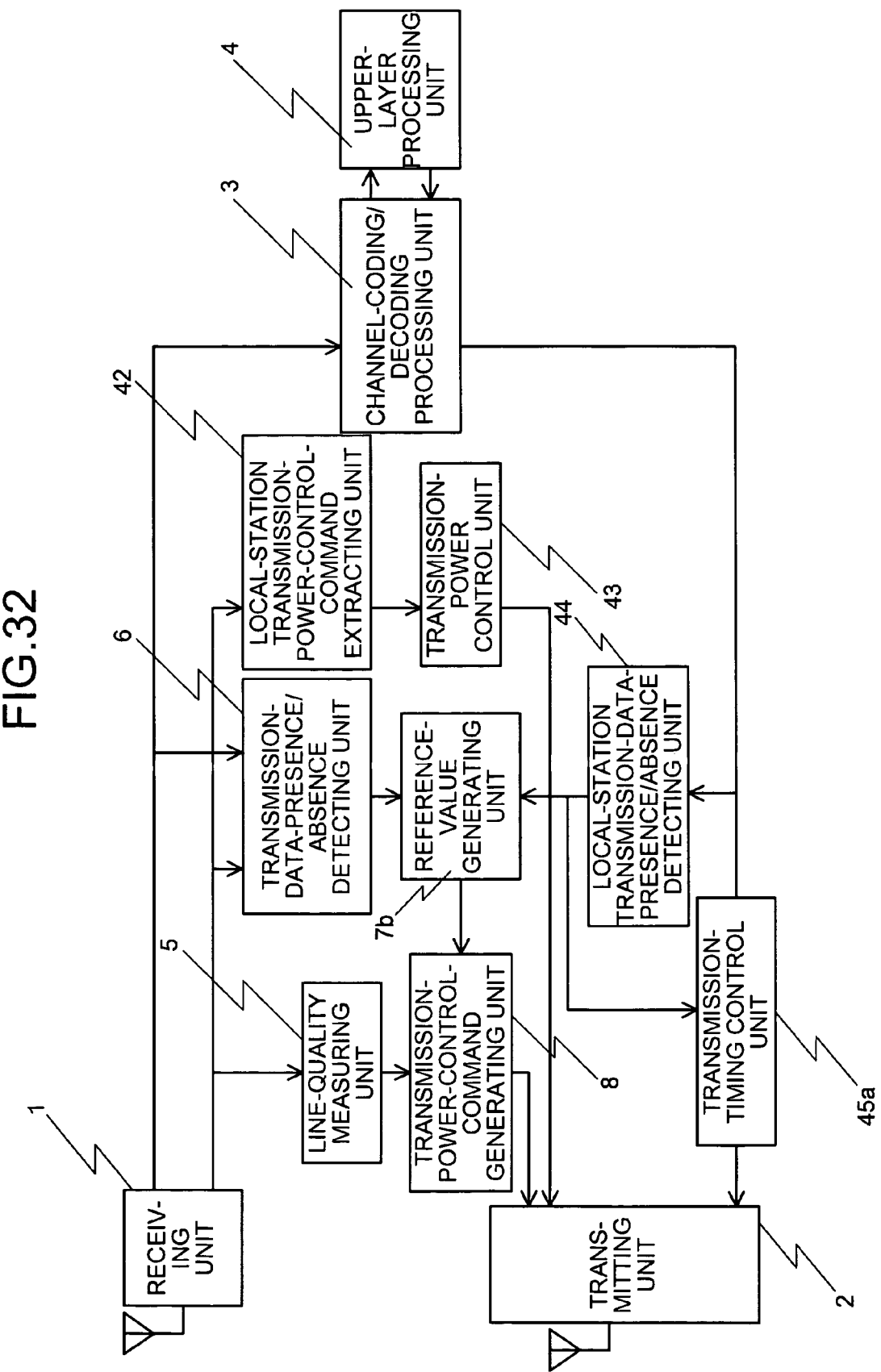
FIG. 32 is a diagram of an example of a structure of a CDMA base station apparatus according to a ninth embodiment of the present invention.

FIG. 32 is a diagram of an example of a structure of a CDMA base station apparatus according to a ninth embodiment of the present invention. For example, the CDMA base station apparatus includes both the local-station transmission-power-control-command extracting unit 42 and the transmission-power control unit 43 according to the sixth embodiment and the local-station transmission-data-presence/absence detecting unit 44 according to the seventh embodiment. Moreover, a transmission-timing control unit 45a controls transmission timing of local station transmission data based on only an output of the local-station transmission-data-presence/absence detecting unit 44. Components identical with those according to the eighth embodiment are denoted by the identical reference numerals and signs and explanations of the components are omitted. Processing that is different from the processing according to the eighth embodiment is explained.

Thus, according to the present embodiment, when resumption of transmission data is notified from the local-station transmission-data-presence/absence detecting unit 44, the transmission-timing control unit 45a transmits data with a delay of a fixed time defined in advance and added to the data. This fixed time is equivalent to time for waiting for local station transmission power to stabilize in the eighth embodiment. For example, to simplify a system, simulation is performed in advance to set the time to a fixed value with a margin. This makes it possible to obtain the same effect as the effect according to the eighth embodiment. The delay of the fixed time may be added at times other when the time of resumption of transmission data.

According to the present embodiment, the fixed time may be controlled according to a magnitude of the outer-loop adjustment amount #1. For example, when the outer-loop adjustment amount #1 is large, since a long time is required until local station transmission power stabilizes, the fixed time is also set large.

The transmission-timing control unit 45a may start data transmission before lower station transmission power stabilizes according to, for example, an allowable delay time of user data being transmitted regardless of the fixed time defined in advance or the time corresponding to the magnitude of the outer-loop adjustment amount #1. In a method of controlling the fixed time defined in advance or the time corresponding to the magnitude of the outer-loop adjustment amount #1, for example, transmission may be more carefully started after local-station transmission power stabilizes according to an allowable error rate of user data being transmitted.

Tenth Embodiment

Figure 33:
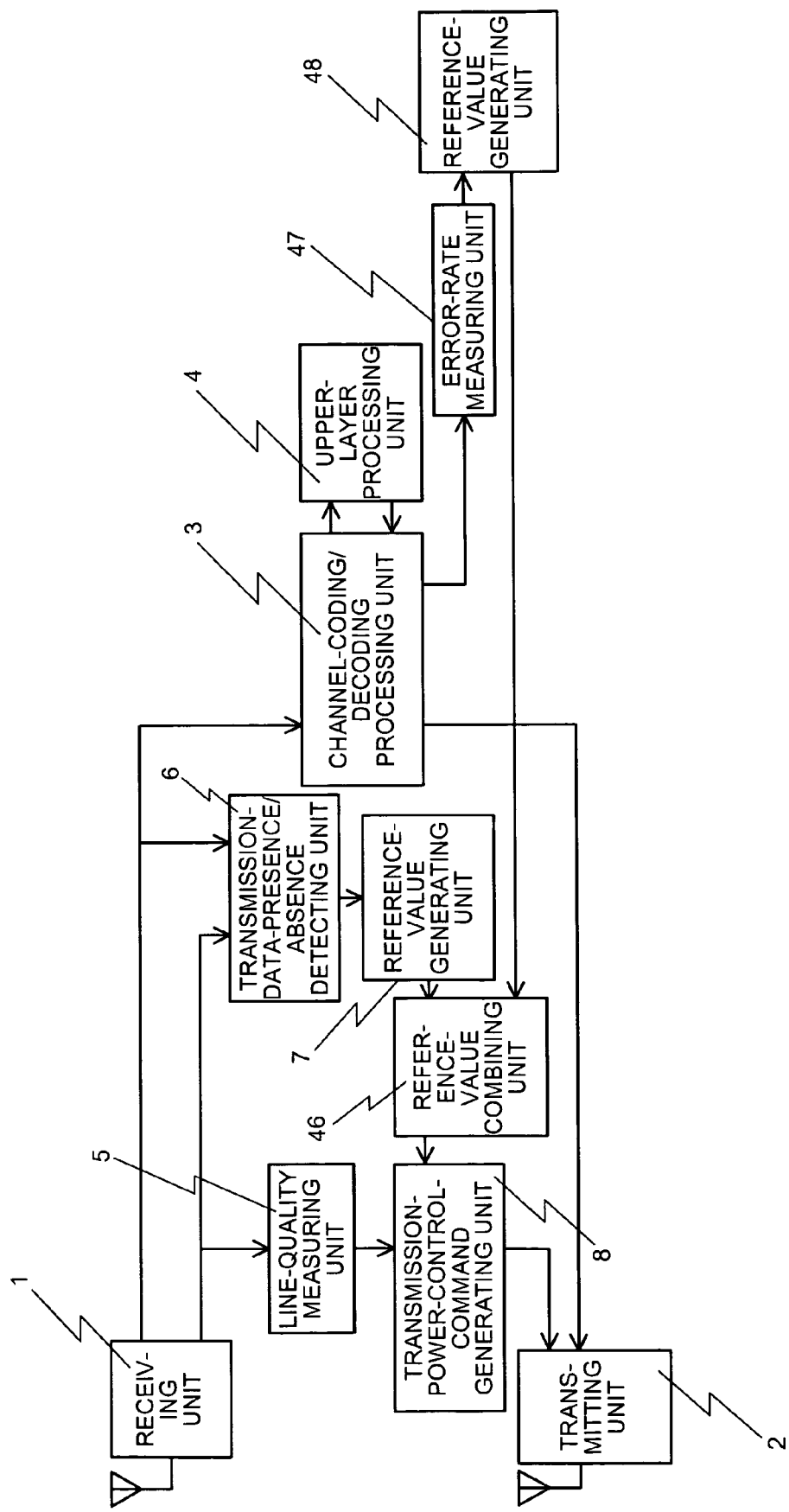
FIG. 33 is a diagram of an example of a structure of a CDMA base station apparatus according to a tenth embodiment of the present invention.

FIG. 33 is a diagram of an example of a structure of a CDMA base station apparatus according to a tenth embodiment of the present invention. The CDMA base station apparatus includes an error-rate measuring unit 47, a reference-value generating unit 48, and a reference-value combining unit 46 in addition to the components according to the first embodiment. The transmission-power-control-command generating unit 8 generates a transmission-power control command using a reference value outputted by the reference value combining unit 46. Components identical with those according to the first embodiment are denoted by the identical reference numerals and signs and explanations of the components are omitted. Processing that is different from the processing according to the first embodiment is explained.

The error-rate measuring unit 47 counts, for example, a result of Cyclic Redundancy Check code (CRC) check by the channel-coding/decoding processing unit 3 and measures an error rate called a Block Error Rate (BLER) or a Frame Error Rate (FER). As an example, it is possible to calculate the BLER as indicated by Equation (7).

$$\text{BLER} = \text{Number of CRCNGs/Number of blocks received} \qquad (7)$$

The error-rate measuring unit 47 may measure an error rate according to processing described below different from the above. For example, the error-rate measuring unit 47 re-encodes data after error correction decoding according to processing identical with error correction coding processing in the opposed station, compares a result of the re-encoding with a code before error correction, and counts the number of bits subjected to the error correction. In the WCDMA-FDD of the 3GPP, the error rate is defined as a representation called a Transport Channel BER (TrCH-BER) (see Equation (8)).

$$\text{Re-encoded BER} = \text{Number of bits subjected to error correction/Number of bits before error correction} \qquad (8)$$

The reference-value generating unit 48 performs so-called conventional outer loop. In other words, the reference-value generating unit 48 compares an error rate targeted by user data and an output of the error-rate measuring unit 47. When the allowable error rate is smaller, the reference-value generating unit 48 decreases a reference value for transmission-power control command generation. When the allowable error rate is larger, the reference-value generating unit 48 increases the reference value to increase transmission power of the opposed station. An adjustment amount of a reference value by the processing is called an outer-loop adjustment amount #2.

As described in TS25.101 and 104 of the WCDMA-FDD of the 3GPP, even if SIRs take the same value, user data do not have an identical BLER depending on a radio propagation environment. For example, as described in B.2 of TS25.104, in a radio test model called a case 1, delay path spread is set as 0 ns delay: 0 dB and 976 ns delay: −10 dB. In that case, user data of 12.2 kbps has Eb/N0=11.9 dB (BLER<$10^{-2}$) as a standard. On the other hand, in a radio test model called a case 2, delay path spread is set as 0 ns delay: 0 dB, 976 ns delay: 0 dB, and 20000 ns delay: 0 dB. In that case, user data of 12.2 kbps has Eb/N0=9.0 dB (BLER<$10^{-2}$) as a standard. Therefore, since the outer loop uses an error rate of the user data to secure a fixed quality regardless of a difference of these propagation environments, in general, control is performed at a period longer than a period of quality measurement by the line-quality measuring unit 5.

The reference-value combining unit 46 generates an actual reference value for generating a transmission-power control command based on an output of the reference-value generating unit 7 and an output of the reference-value generating unit 48. A simplest example of the reference-value combining unit 46 is a method of simply adding up adjustment amounts as indicated by Equation (9).

Radio line quality<Reference initial value for transmission-power control command generation+ Outer-loop adjustment amount #1+Outer-loop adjustment amount #2 (9)

The outer-loop adjustment amount #1 is effective only when the transmission-data-presence/absence detecting unit 6 judges that mobile-apparatus transmission data is absent (the outer-loop adjustment amount #2 does not depend on presence or absence of opposed station transmission data).

The transmission-power-control-command generating unit 8 compares a reference value received from the reference-value combining unit 46 and a line quality notified from the line-quality measuring unit 5. When the former is larger, the transmission-power-control-command generating unit 8 generates a transmission-power control command for reducing transmission power of the opposed station. When the former is smaller, the transmission-power-control-command generating unit 8 generates a transmission-power control command for increasing transmission power of the opposed station. The transmitting unit 2 transmits the transmission-power control command to the opposed station together with transmission data.

As described above, according to the present embodiment, the base station apparatus includes a function of measuring an error rate of user data and a function of generating a reference value for generating a transmission-power control command based on the error rate in addition to the functions according to the first embodiment. The base station apparatus combines a reference value generated in the processing according to the first embodiment (when mobile-apparatus transmission data is absent) and a reference value generated in the processing according to the present embodiment. Consequently, the same effect as the effect according to the first embodiment is obtained. It is possible to perform more stable transmission power control.

According to the present embodiment, for convenience of explanation, the characteristic processing is applied to the structure according to the first embodiment. However, the present invention is not limited to this. The characteristic processing may be applied to any one of the second to the ninth embodiments.

Eleventh Embodiment

Figure 34:
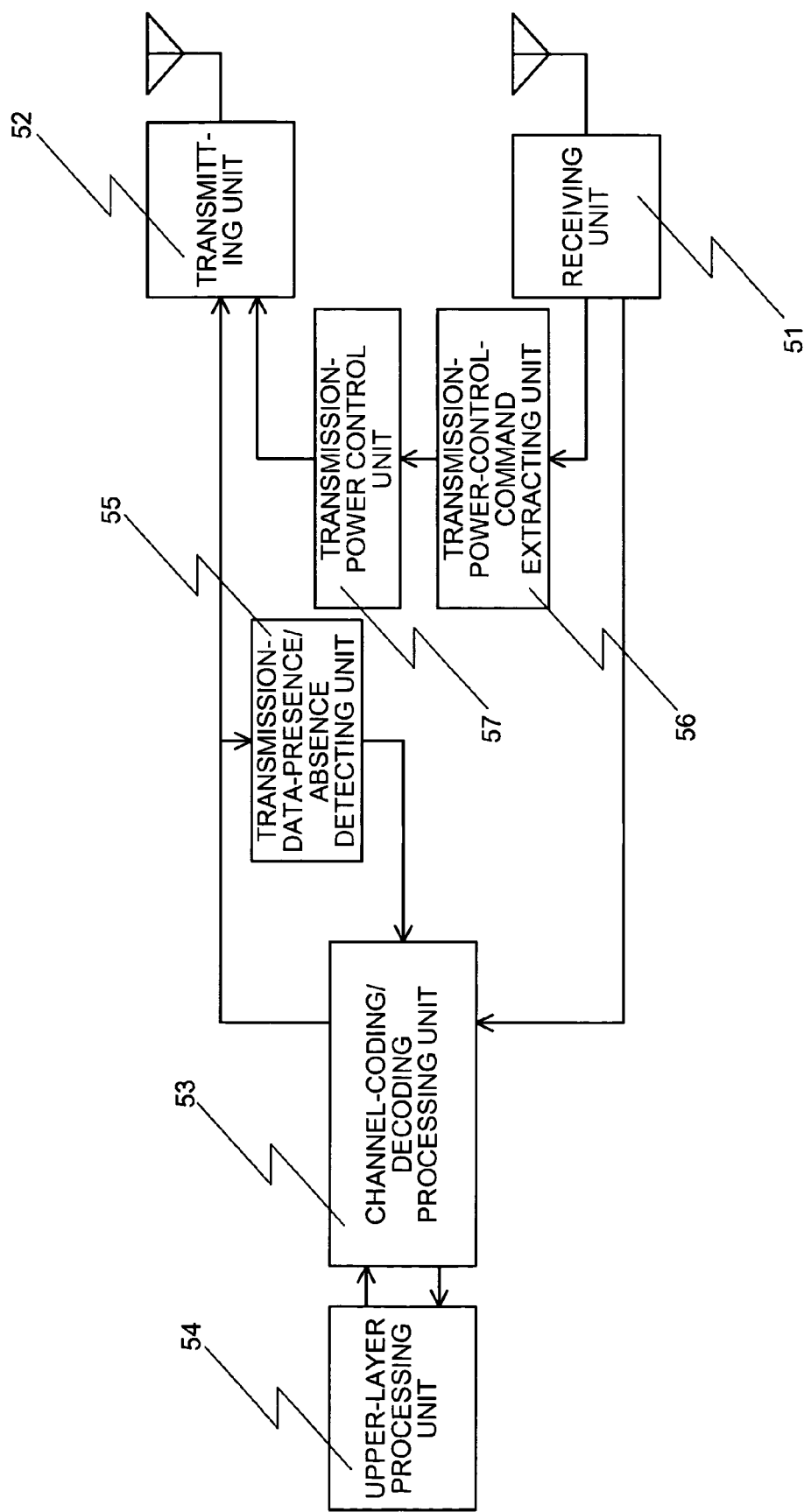
FIG. 34 is a diagram of an example of a structure of a CDMA base station apparatus according to an eleventh embodiment of the present invention.

FIG. 34 is a diagram of an example of a structure of a CDMA mobile apparatus according to an eleventh embodiment of the present invention. The CDMA mobile apparatus is an apparatus opposed to the CDMA base station apparatus according to any one of the first to the tenth embodiments. The CDMA mobile apparatus includes, for example, a receiving unit 51, a transmitting unit 52, a channel-coding/decoding processing unit 53, an upper-layer processing unit 54, a transmission-data-presence/absence detecting unit 55, a transmission-power-control-command extracting unit 56, and a transmission-power control unit 57.

In this CDMA mobile apparatus, the channel-coding/decoding processing unit 53 applies channel coding such as error correction coding to data outputted from the upper-layer processing unit 54. The transmitting unit 52 transmits a signal after spread. The receiving unit 51 receives a signal transmitted from the opposed station and outputs a signal after despread. The channel-coding/decoding processing unit 53 performs channel coding such as error correction decoding and transfers data after decoding to the upper-layer processing unit 54.

The CDMA mobile apparatus includes the transmission-power-control-command extracting unit 56. The transmission-power-control-command extracting unit 56 extracts a transmission-power control command from layer 1 signaling information. The transmission-power control unit 57 controls transmission power in the transmitting unit 52 based on the transmission-power control command extracted.

In the CDMA mobile apparatus, the transmission-data-presence/absence detecting unit 55 inputs presence or absence of transmission data of the local apparatus to the channel-coding/decoding processing unit 53. For example, when a result of the detection by the transmission-data-presence/absence detecting unit 55 changes from "transmission data is absent" to "transmission data is present", the channel-coding/decoding processing unit 53 transmits data, a CRC check result of which is NG (CRCNG). In other words, the channel-coding/decoding processing unit 53 does not transmit significant data in a range in which a QoS is satisfied and until time sufficient for the base station to judge that mobile-apparatus transmission data is present elapses. This makes it possible to substantially reduce a probability of the base station failing to receive data from the mobile apparatus.

In FIG. 34, the transmission-data-presence/absence detecting unit 55 performs presence/absence judgment using an output of the channel-coding/decoding processing unit 53. However, the present invention is not limited to this. It may be judged, immediately after data is generated from an upper layer or immediately after data from a host apparatus arrives, that transmission data of the local station is present. In this case, it is possible to reduce a delay at the time of resumption of transmission.

When a change from "transmission data is absent" to "transmission data is present" is detected, the channel-coding/decoding processing unit 53 may transmit data that has header invalidity in the layer 2 or data that cannot be assembled (dummy data) instead of the data of CRCNG. This is particularly effective when it is likely that wrong control of the outer loop occurs in the base station when the data of CRCNG is transmitted.

Twelfth Embodiment

Figure 35:
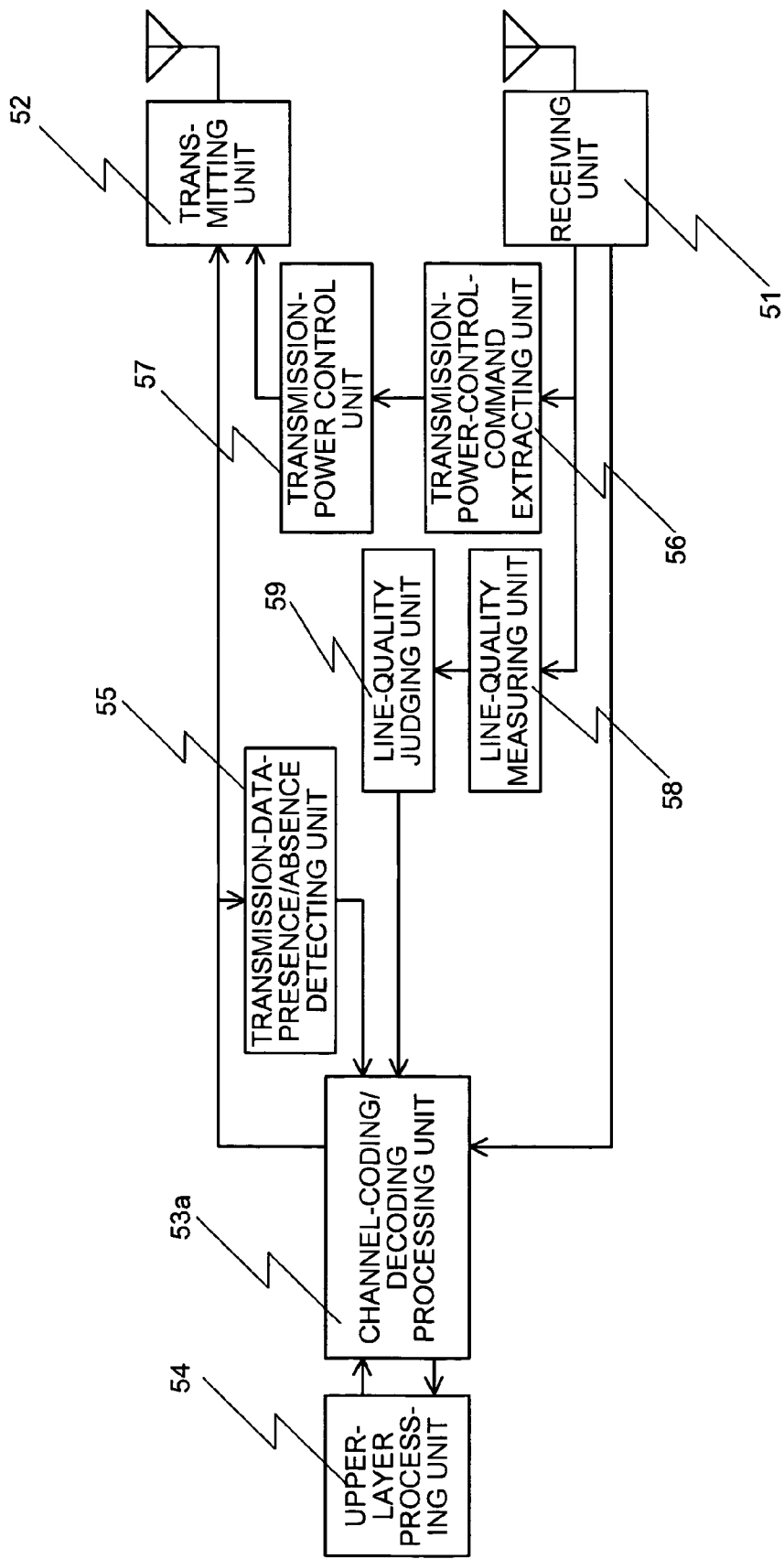
FIG. 35 is a diagram of an example of a structure of a CDMA base station apparatus according to a twelfth embodiment of the present invention.

FIG. 35 is a diagram of an example of a structure of a CDMA mobile apparatus according to a twelfth embodiment of the present invention. The CDMA mobile apparatus includes, in addition to the components according to the eleventh embodiment, a line-quality measuring unit 58 that measures a reception line quality between the mobile apparatus and the base station and a line-quality judging unit 59 that judges a level of the line quality measured. A channel-coding/decoding processing unit 53a performs processing taking into account the level of the line quality. Components identical with those in FIG. 34 according to the eleventh embodiment are denoted by the identical reference numerals and signs and explanations of the components are omitted. Processing that is different from the processing according to the eleventh embodiment is explained.

In a communication system in which it is known that a reception line quality is, for example, an SIR, an SINR, or a single user, the line-quality measuring unit 58 measures reception field intensity or an SNR.

The line-quality judging unit 59 compares an integral value of a result of the measurement of the line quality or an average of results of measurement performed a plurality of number of times and a threshold defined in advance and outputs an indication whether the integral value or the average is equal to or lower than the threshold. The line-quality judging unit 59 outputs an indication whether a result of the measurement of the line quality is equal to or lower than the threshold defined in advance continuously for a plurality of number of times.

Figure 36:
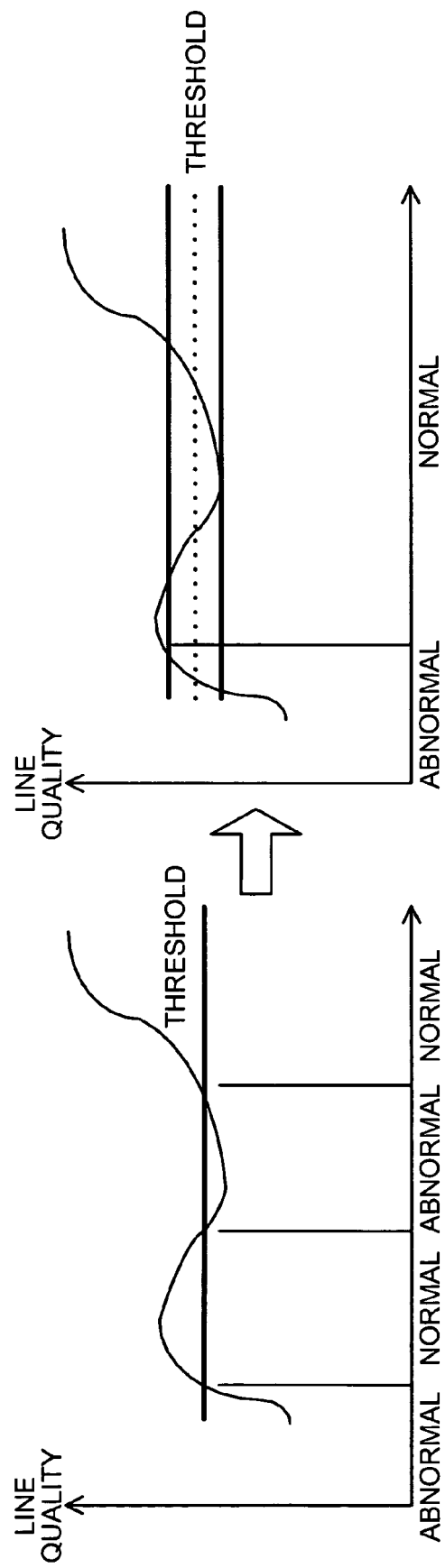
FIG. 36 is a graph of judgment processing of a line-quality judging unit to which hysteresis is given.

The line-quality judging unit 59 is also capable of giving hysteresis to the judgment result. If hysteresis is given to the judgment result, it is possible to reduce unnecessary processing when a line quality of transmission data of the base station continues to change in a short time according to a propagation environment. FIG. 36 is a diagram of judgment processing of the line-quality judging unit 59 to which hysteresis is given. It is possible to. reduce the number of times of switching between abnormal and normal by providing hysteresis.

The judgment processing having hysteresis is processing for realizing a fail-safe function at the time when the outer-loop adjustment amount #1 is valid in the base station (uplink transmission power is reduced) and at the time when power of transmission data from the base station (downlink transmission power) is insufficient. Therefore, a threshold is determined in advance by simulation or the like assuming the case described above. For example, even at a level at which layer 1 signaling information or a layer 1 known sequence cannot be received, when a channel notified from the base station or a beacon channel called a Common Pilot Channel (CPICH) in the WCDMA-FDD of the 3GPP is seen, it is possible to consider that a line quality is equal to or higher than the threshold. In general, the CPICH is transmitted with sufficient transmission power that can be monitored from the mobile apparatus in an area of the base station. Thus, the fail-safe function does not overwork to make it impossible to reduce transmission power of the mobile apparatus.

When transmission data is absent in the mobile apparatus and when a result of judgment on a line quality is equal to or lower than the threshold, the channel-coding/decoding processing unit 53a transmits data of CRCNG. In other words, according to the present embodiment, as in the eleventh embodiment, the channel-coding/decoding processing unit 53a does not transmit significant data in a range in which a QoS is satisfied and until time and sufficient for the base station to judge that mobile-apparatus transmission data is present elapses. This makes it possible to substantially reduce a probability of the base station failing to receive data from the mobile apparatus.

In FIG. 35, the transmission-data-presence/absence detecting unit 55 performs presence/absence judgment using an output of the channel-coding/decoding processing unit 53a. However, the present invention is not limited to this. It may be judged, immediately after data is generated from an upper layer or immediately after data from a host apparatus arrives, that transmission data of the local station is present. In this case, it is possible to reduce a delay at the time of resumption of transmission. When a change from "transmission data is absent" to "transmission data is present" is detected, the channel-coding/decoding processing unit 53a may transmit-data that has header invalidity in the layer 2 or data that cannot be assembled (dummy data) instead of the data of CRCNG. This is particularly effective when it is likely that wrong control of the outer loop occurs in the base station when the data of CRCNG is transmitted.

Thirteenth Embodiment

Figure 37:
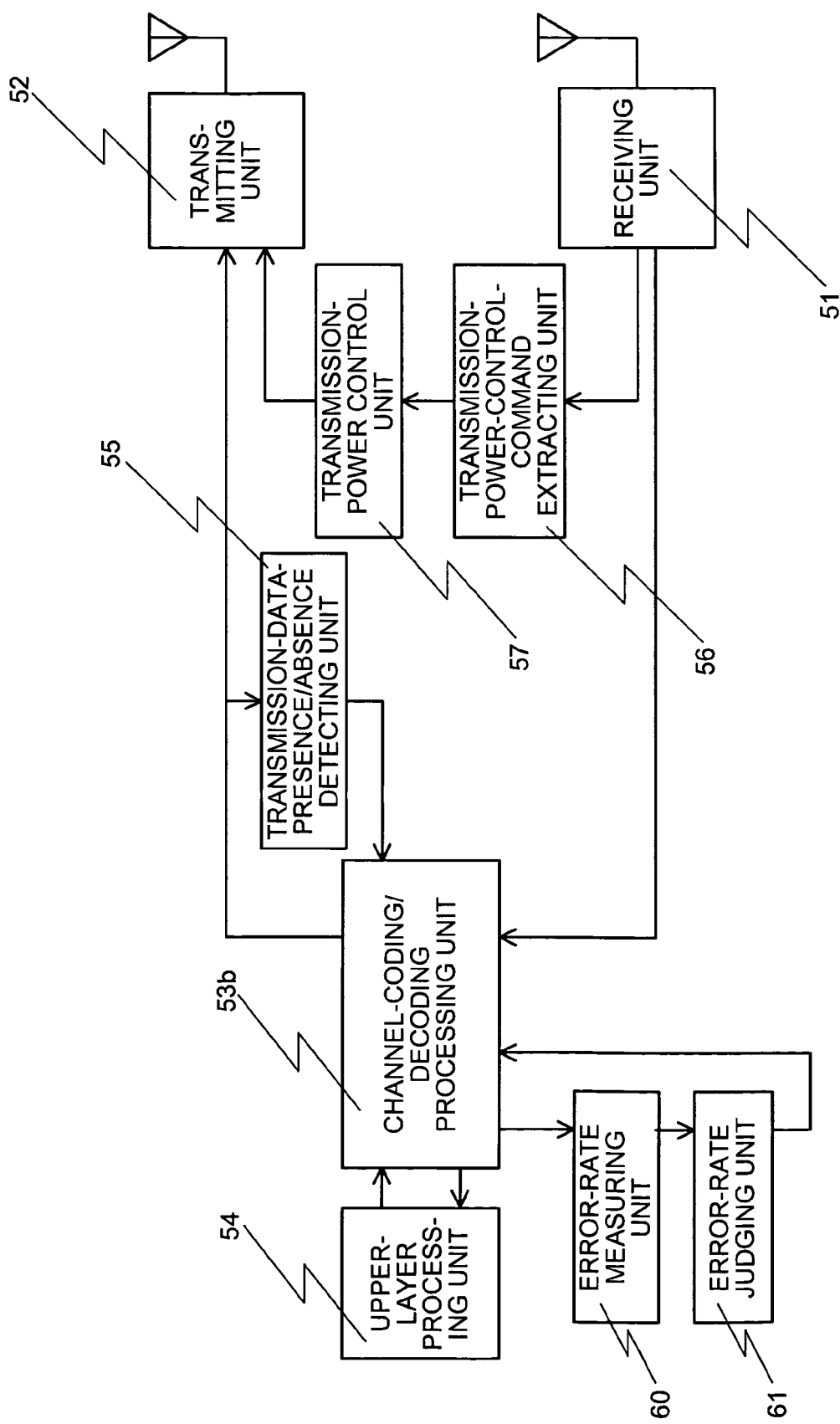
FIG. 37 is a diagram of an example of a structure of a CDMA base station apparatus according to a thirteenth embodiment of the present invention.

FIG. 37 is a diagram of an example of a structure of a CDMA mobile apparatus according to a thirteenth embodiment of the present invention. The CDMA mobile apparatus further includes, in addition to the components according to the eleventh embodiment, an error-rate measuring unit 60 that measures an error rate of user data using an output of a channel-coding/decoding processing unit 53b and an error-rate judging unit 61 that compares the error rate measured with a predetermined threshold to judge normality or abnormality. The channel-coding/decoding processing unit 53b performs processing based on a result of the judgment of the error-rate judging unit 61. Components identical with those in FIG. 34 according to the eleventh embodiment are denoted by the identical reference numerals and signs and explanations of the components are omitted. Processing that is different from that in the eleventh embodiment is explained.

The channel-coding/decoding processing unit 53b performs, in general, CRC check. In this case, the error-rate measuring unit 60 totals a plurality of CRC check judgment results and outputs a result of the totaling to the error-rate judging unit 61. When CRCNG occurs exceeding a threshold defined in advance, the error-rate judging unit 61 reports "error rate abnormality" to the channel-coding/decoding processing unit 53b. For example, when CRCNG occurs in at least one result, the error-rate judging unit 61 may judge that "error rate abnormality" has occurred. In response to this report, the channel-coding/decoding processing unit 53b generates transmission data of CRCNG, transmission data that has header invalidity in the layer 2, or data that cannot be assembled.

When the channel-coding/decoding processing unit 53b performs error correction decoding, the error-rate measuring unit 60 may re-encode data after error correction decoding according to processing identical with the error correction coding processing in the opposed station, compare a result of the re-encoding with a code before error correction, and count the number of bits subjected to the error correction. The error-rate judging unit 61 may judge whether "error rate abnormality" has occurred based on threshold judgment on a count value and report to the channel-coding/decoding processing unit 53b that "error rate abnormality" has occurred.

Hysteresis may be given to the threshold used according to the present embodiment as shown in, for example, FIG. 36 in the twelfth embodiment.

The additional functions according to the present embodiment are effective as a fail-safe function at the time when the outer-loop adjustment amount #1 is valid in the base station (downlink transmission power is reduced) and when power of transmission data from the base station (downlink transmission power) is insufficient.

Fourteenth Embodiment

Figure 38:
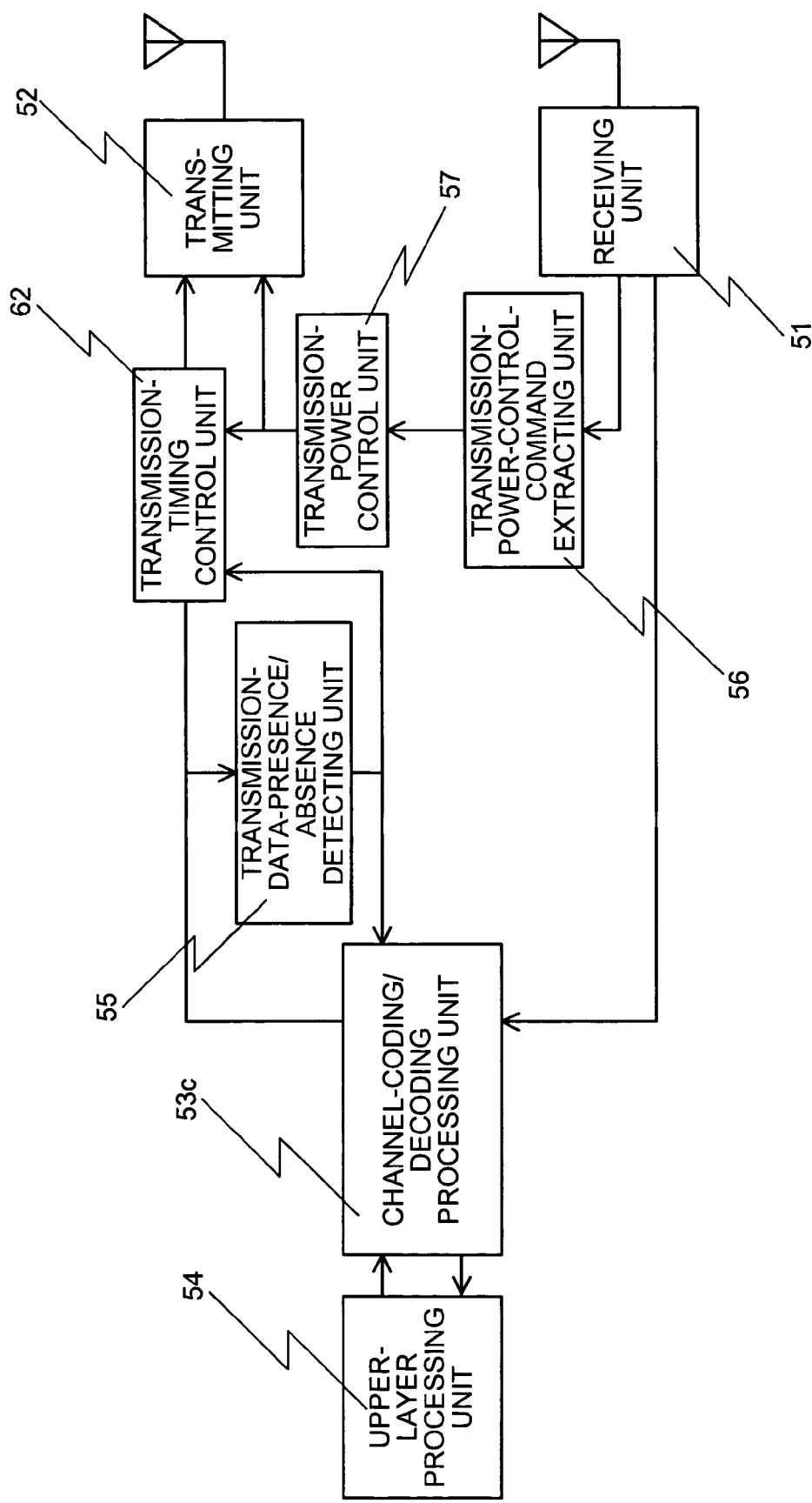
FIG. 38 is a diagram of an example of a structure of a CDMA base station apparatus according to a fourteenth embodiment of the present invention.

FIG. 38 is a diagram of an example of a structure of a CDMA mobile apparatus according to a fourteenth embodiment of the present invention. The CDMS mobile apparatus further includes, in addition to the components according to the eleventh embodiment, a transmission-timing control unit 62 that controls transmission timing based on an output of the transmission-data-presence/absence detecting unit 55 and a transmission power control value of the mobile apparatus. The transmitting unit 52 performs processing based on the transmission timing. Components identical with those in FIG. 34 according to the eleventh embodiment are denoted by the identical reference numerals and signs and explanations of the components are omitted. Processing that is different from the processing according to the eleventh embodiment is explained.

For example, when a detection result of the transmission-data-presence/absence detecting unit 55 changes from "transmission data is absent" to "transmission data is present", a channel-coding/decoding processing unit 53c generates, transmission data of CRCNG, transmission data that has header invalidity in the layer 2, or data that cannot be assembled.

When a detection result of the transmission-data-presence/absence detecting unit 55 changes from "transmission data is absent" to "transmission data is present", the transmission-timing control unit 62 estimates, in a range in which a QoS is satisfied, time sufficient for the base station to judge that mobile-apparatus transmission data is present. According to the present embodiment, the "time sufficient for the base station to judge that mobile-apparatus transmission data is present" is estimated from a state of stability of transmission power of the local apparatus. "Stability" in this context means that, for example, an accumulation of differences of transmission power values for fifteen times of transmission is within ±3 decibels. To simplify a system, it is also possible to calculate the "time sufficient for the base station to judge that mobile-apparatus transmission data is present" according to simulation in advance and set the time to a specific fixed value.

Therefore, the transmitting unit 52 transmits the transmission data of CRCNG, the transmission data that has header invalidity in the layer 2, or the data that cannot be assembled, which are generated by the channel-coding/decoding processing unit 53c, in a range in which a QoS is satisfied and until the time and sufficient for the base station to judge that mobile-apparatus transmission data is present. Thereafter, the transmitting unit 52 transmits desired transmission data. This makes it possible to substantially reduce a probability of the base station failing to receive data from the mobile apparatus.

Figure 39:
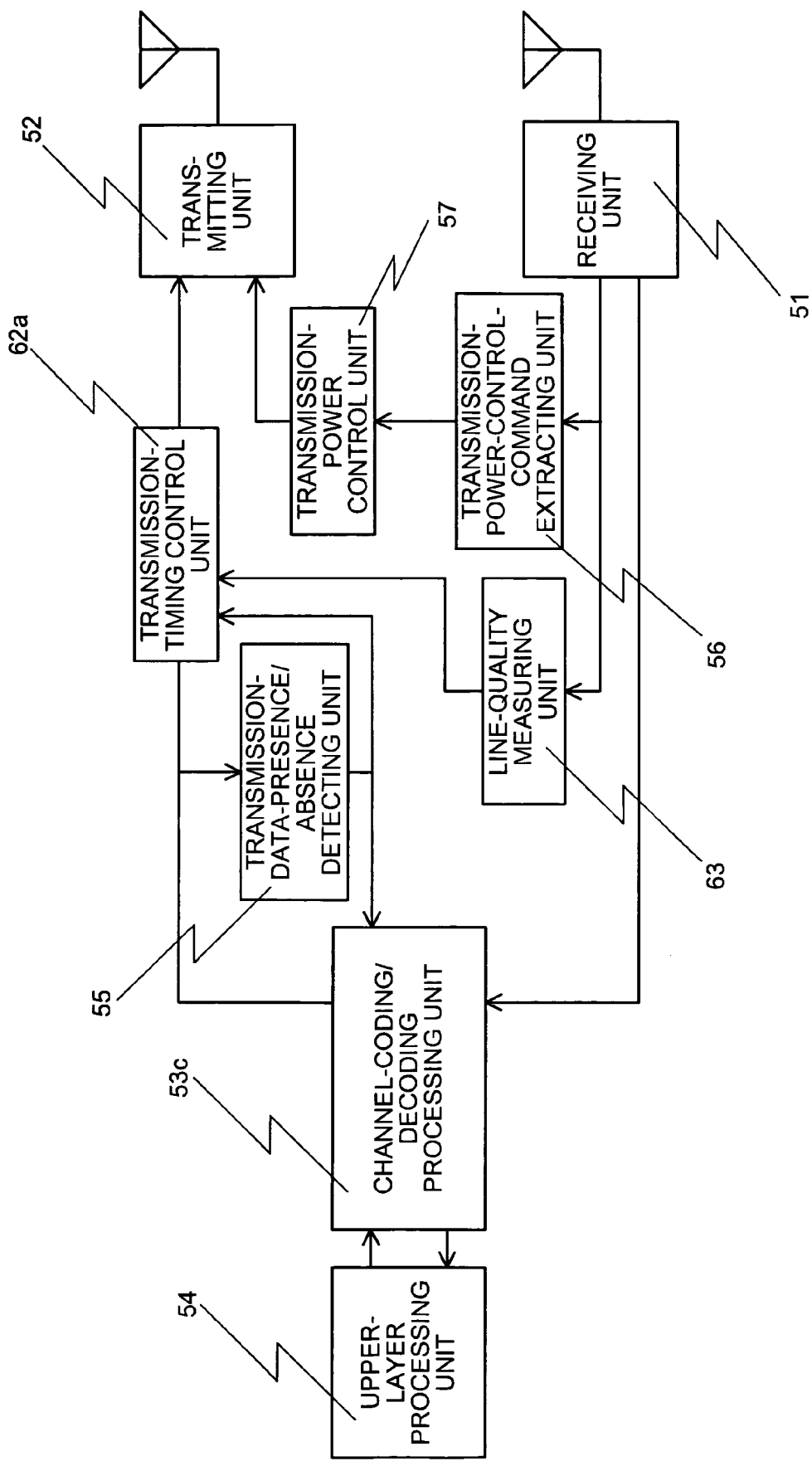
FIG. 39 is a diagram of another example of a structure of a CDMA base station apparatus according to a fourteenth embodiment of the present invention.

FIG. 39 is a diagram of another structure of the CDMA mobile apparatus according to the fourteenth embodiment of the present invention. The CDMA mobile apparatus further includes a line-quality measuring unit 63 that measures a line quality of data transmitted by the base station in addition to the components in FIG. 38. A transmission-timing control unit 62a controls transmission timing based on an output of the transmission-data-presence/absence detecting unit 55 and an output of the line-quality measuring unit 63. Components identical with those in FIG. 38 are denoted by the identical reference numerals and signs and explanations of the components are omitted. Processing that is different from that in FIG. 38 is explained.

The line-quality measuring unit 63 measures a reception quality from known sequence data of the layer 1 or layer 1 signaling information. For example, the line-quality measuring unit 63 calculates an SIR with dispersion from an ideal phase point set as an interference component and with amplitude set as a signal component using a pilot signal that is a known sequence in the DPCCH of the WCDMA-FDD of the 3GPP. In a communication system in which it is known that a single user uses the communication system, it is possible to represent a quality of a reception signal with reception field intensity and an SNR.

The transmission-timing control unit 62a estimates the "time sufficient for the base station to judge that mobile-apparatus transmission data is present" from a state of stability of the line quality and, then, resumes transmission. "Stability" in this context means that, for example, an accumulation of differences of SIR measurement results for fifteen times of transmission is within ±3 decibels. To simplify a system, it is also possible to calculate the "time sufficient for the base station to judge that mobile-apparatus transmission data is present" according to simulation in advance and set the time to a specific fixed value. This makes it possible to substantially reduce a probability of the base station failing to receive data from the mobile apparatus as in the case of FIG. 38.

Besides the above, a method of adjusting the "time sufficient for the base station to judge that mobile-apparatus transmission data is present" according to any one of an allowable delay time and an allowable error rate of data transmitted by the mobile apparatus or both is also effective. For example, when the allowable delay time is short, even if transmission power of the mobile apparatus or a line quality in the mobile apparatus is not completely stable, the transmission-timing control unit 62 or 62a starts transmission to prevent a delay from occurring. When the allowable error rate is low and the allowable delay time is long, the transmission-timing control unit 62 or 62a starts transmission after transmission power of the mobile apparatus or a line quality in the mobile apparatus sufficiently stabilizes. When transmission data is data obtained by multiplexing a plurality of QoSs, a QoS of the transmission data is a QoS of data obtained by multiplexing a QoS of data with a shortest allowable delay time and a QoS of data with a lowest allowable error rate.

Fifteenth Embodiment

Figure 40:
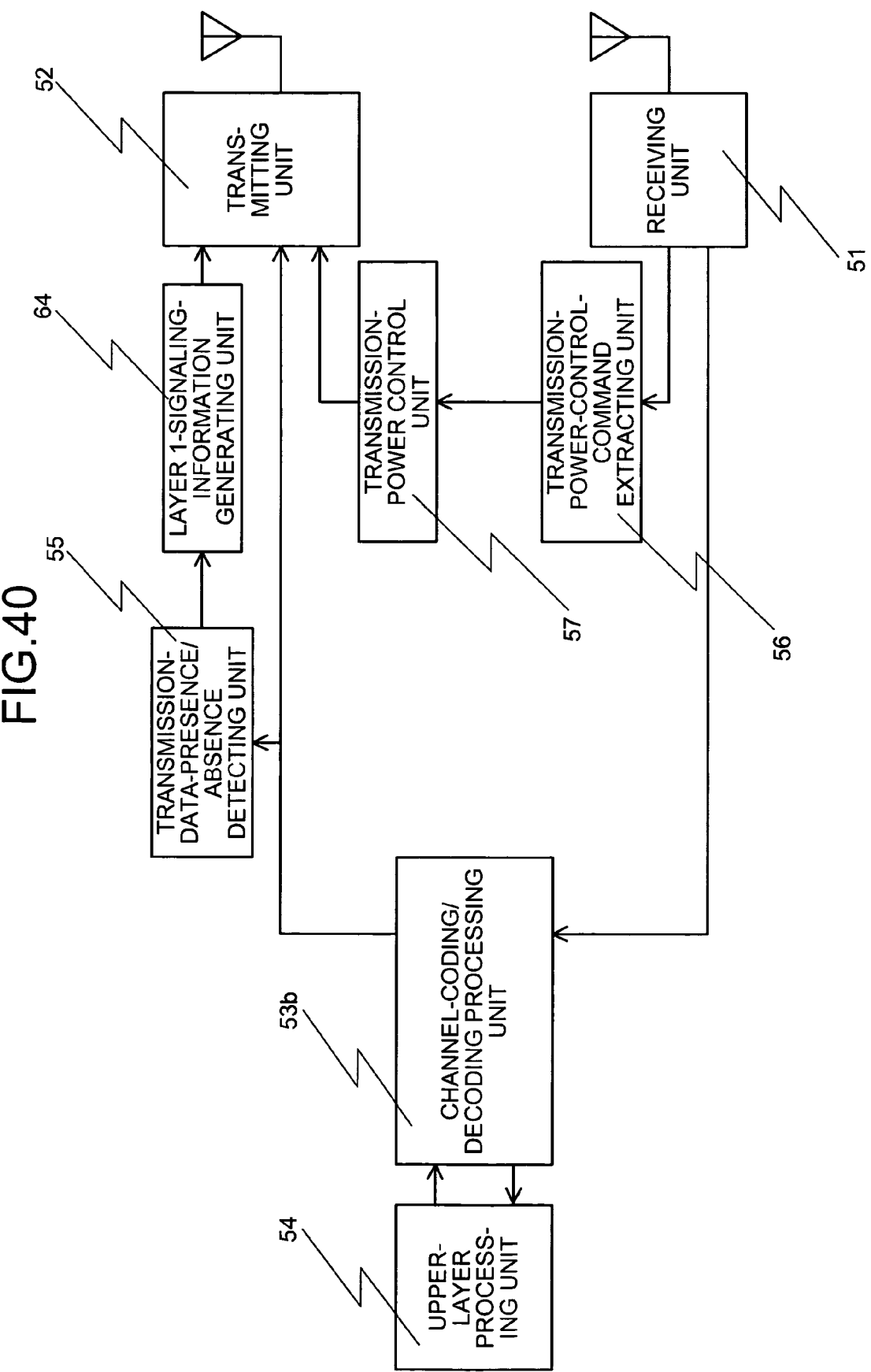
FIG. 40 is a diagram of an example of a structure of a CDMA base station apparatus according to a fifteenth embodiment of the present invention.

FIG. 40 is a diagram of an example of a structure of a CDMA mobile apparatus according to a fifteenth embodiment of the present invention. The CDMA mobile apparatus further includes a layer 1-signaling-information generating unit 64 in addition to the components according to the eleventh embodiment. Components identical with those in FIG. 34 according to the eleventh embodiment are denoted by the identical reference numerals and signs and explanations of the components are omitted. Processing that is different from the processing according to the eleventh embodiment is explained.

For example, when a detection result of the transmission-data-presence/absence detecting unit 55 changes from "transmission data is absent" to "transmission data is present", the layer 1-signaling-information generating unit 64 transmits a "transmission notice". This is equivalent to the E bit in FIG. 6. For example, it is defined that transmission data is present if the E bit is 1 and that transmission data is absent if the E bit is 0. It is preferable to perform error correction coding using a plurality of bits because misdetection is reduced.

In time until transmission data is sent after the "transmission notice" is transmitted, "time sufficient for the base station to judge that mobile-apparatus transmission data is present" is estimated as in the fourteenth embodiment. The transmitting unit 52 resumes transmission after the time elapses. As an example of estimation of the "time sufficient for the base station to judge that mobile-apparatus transmission data is present", for example, the same processing as the processing performed by the transmission-timing control unit 62 or 62a according to the fourteenth embodiment is executed.

When the outer-loop adjustment amount #1 is valid in the base station (uplink transmission power is reduced) and when power of transmission data from the base station (downlink transmission power) is insufficient, the layer 1-signaling-information generating unit 64 transmits a "transmission notice" using layer 1 signaling information even when there is actually no transmission data. Consequently, the outer-loop adjustment amount #1 is invalidated and it is possible to perform communication with usual transmission power (a fail-safe function). As an example of detection of insufficient power of transmission data from the base station (downlink transmission power), for example, the same processing as the processing of the line-quality judging unit 59 according to the twelfth embodiment is executed. As an example of detection of insufficient downlink transmission power, for example, the same processing as the processing of the error-rate measuring unit 60 and the error-rate judging unit 61 according to the thirteenth embodiment may be executed.

In FIG. 40, the transmission-data-presence/absence detecting unit 55 performs presence/absence judgment according to an output of a channel-coding/decoding processing unit 53d. However, the present invention is not limited to this. It may be judged, immediately after data is generated from an upper layer or immediately after data from a host apparatus arrives, that transmission data of the local station is present. In this case, it is possible to reduce a delay at the time of resumption of transmission.

Sixteenth Embodiment

Figure 41:
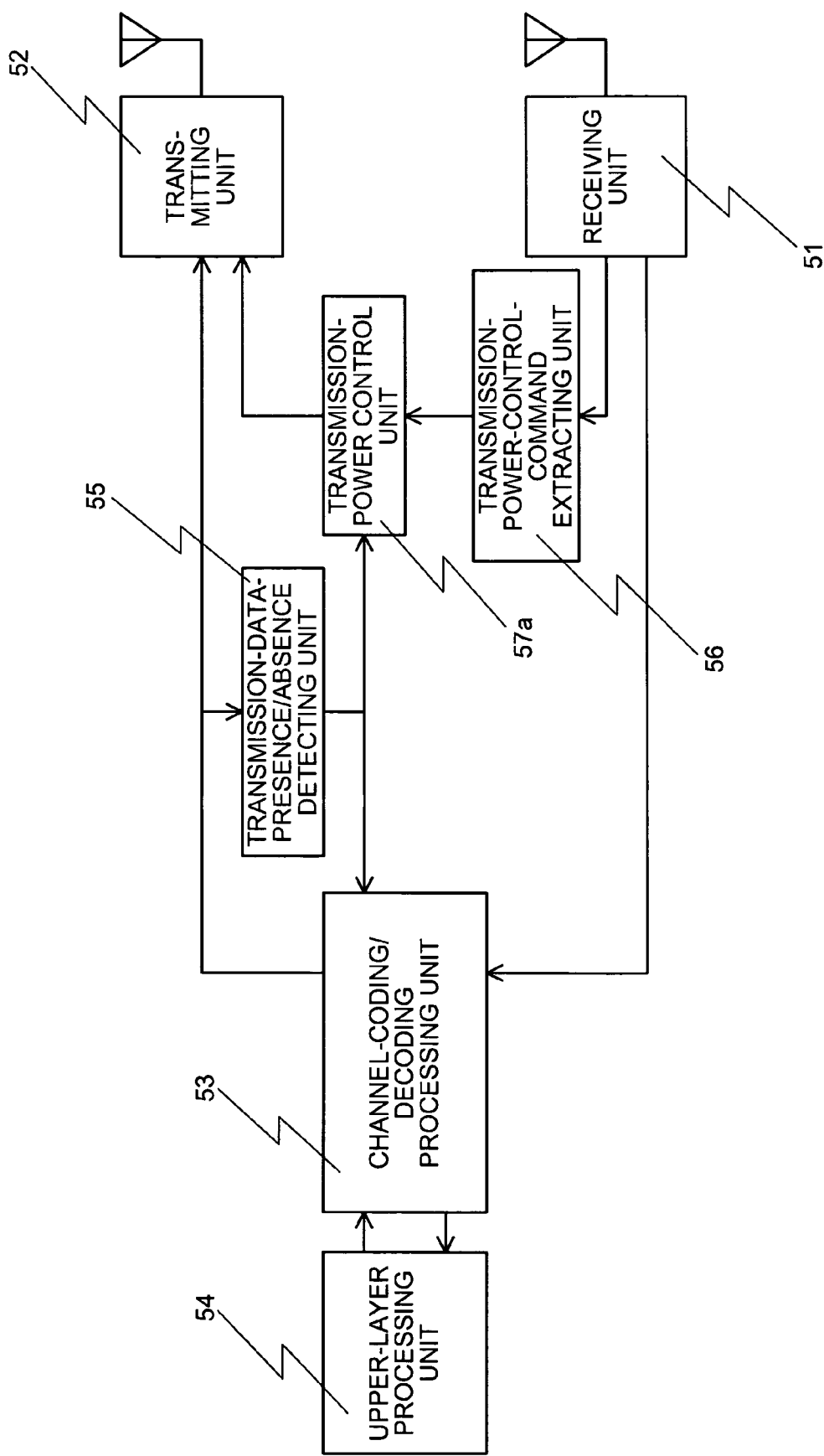
FIG. 41 is a diagram of an example of a structure of a CDMA base station apparatus according to a sixteenth embodiment of the present invention.

FIG. 41 is a diagram of an example of a structure of a CDMA mobile apparatus according to a sixteenth embodiment of the present invention. A transmission-power control unit 57a performs transmission power control based on an output of the transmission-data-presence/absence detecting unit 55 and an output of the transmission-power-control-command extracting unit 56. Components identical with those in FIG. 34 according to the eleventh embodiment are denoted by the identical reference numerals and signs and explanations of the components are omitted. Processing that is different from the processing according to the eleventh embodiment is explained.

For example, when a detection result of the transmission-data-presence/absence detecting unit 55 changes from "transmission data is absent" to "transmission data is present", the transmission-power control unit 57a sets transmission power of the mobile apparatus to a value increased by a specific amount defined in advance. The specific amount equivalent to the increase of the transmission power is identical with a value of the outer-loop adjustment amount #1 set by the base station. Therefore, in this case, it is desirable to set the outer-loop adjustment amount #1 as a fixed value in terms of a system.

According to the present embodiment, as in the eleventh embodiment, the channel-coding/decoding processing unit 53 generates null data (transmission data of CRCNG, transmission data that has header invalidity in the layer 2, or data that cannot be assembled) prior to user data. However, the transmission-power control unit 57a performs control for increasing transmission power of the null data by the specific amount. In time until user data is transmitted after transmission power is increased to transmit a layer 1 known sequence or layer 1 signaling information, as in the fourteenth embodiment, the "time sufficient for the base station to judge that mobile-apparatus transmission data is present" is estimated and, then, transmission is resumed. As an example of estimation of the "time sufficient for the base station to judge that mobile-apparatus transmission data is present", for example, the same processing as the processing of the transmission-timing control unit 62 or 62a according to the fourteenth embodiment is executed.

When a detection result of the transmission-data-presence/absence detecting unit 55 changes from "transmission data is absent" to "transmission data is present", the transmission-power control unit 57a performs, for example, control for increasing transmission power stepwise until the transmission power reaches a specific amount defined in advance as transmission power control different from the above. When the mobile apparatus suddenly increases transmission power, an interference amount becomes too large, which affects communication of other users. Thus, according to the present embodiment, taking into account transmission power control of the other users, for example, transmission power increase control is performed five times continuously to increase transmission power by 1 decibel at a time.

For example, when the outer-loop adjustment amount #1 is effective in the base station (uplink transmission power is reduced) and when power of transmission data from the base station (downlink transmission power) is insufficient, control for increasing transmission power by the specific amount or control for increasing transmission power stepwise until the transmission power reaches a specific amount defined in advance is performed. Consequently, although the outer-loop adjustment amount #1 does not become invalid, transmission power control is restored to a proper level (a fail-safe function). As an example of detection of insufficient power of transmission data from the base station (downlink transmission power), for example, the same processing as the processing of the line-quality judging unit 59 according to the twelfth embodiment is executed. As another example of detection of insufficient downlink transmission power, for example, the same processing as the error-ratio measuring unit 60 and the error-rate judging unit 61 according to the thirteenth embodiment may be executed.

In FIG. 41, the transmission-data-presence/absence detecting unit 55 performs presence/absence judgment according to an output of the channel-coding/decoding processing unit 53. However, the present invention is not limited to this. It may be judged, immediately after data is generated from an upper layer or data from a host apparatus arrives, that transmission data of the local station is present. In this case, it is possible to reduce a delay at the time of resumption of transmission.

Seventeenth Embodiment

Figure 42:
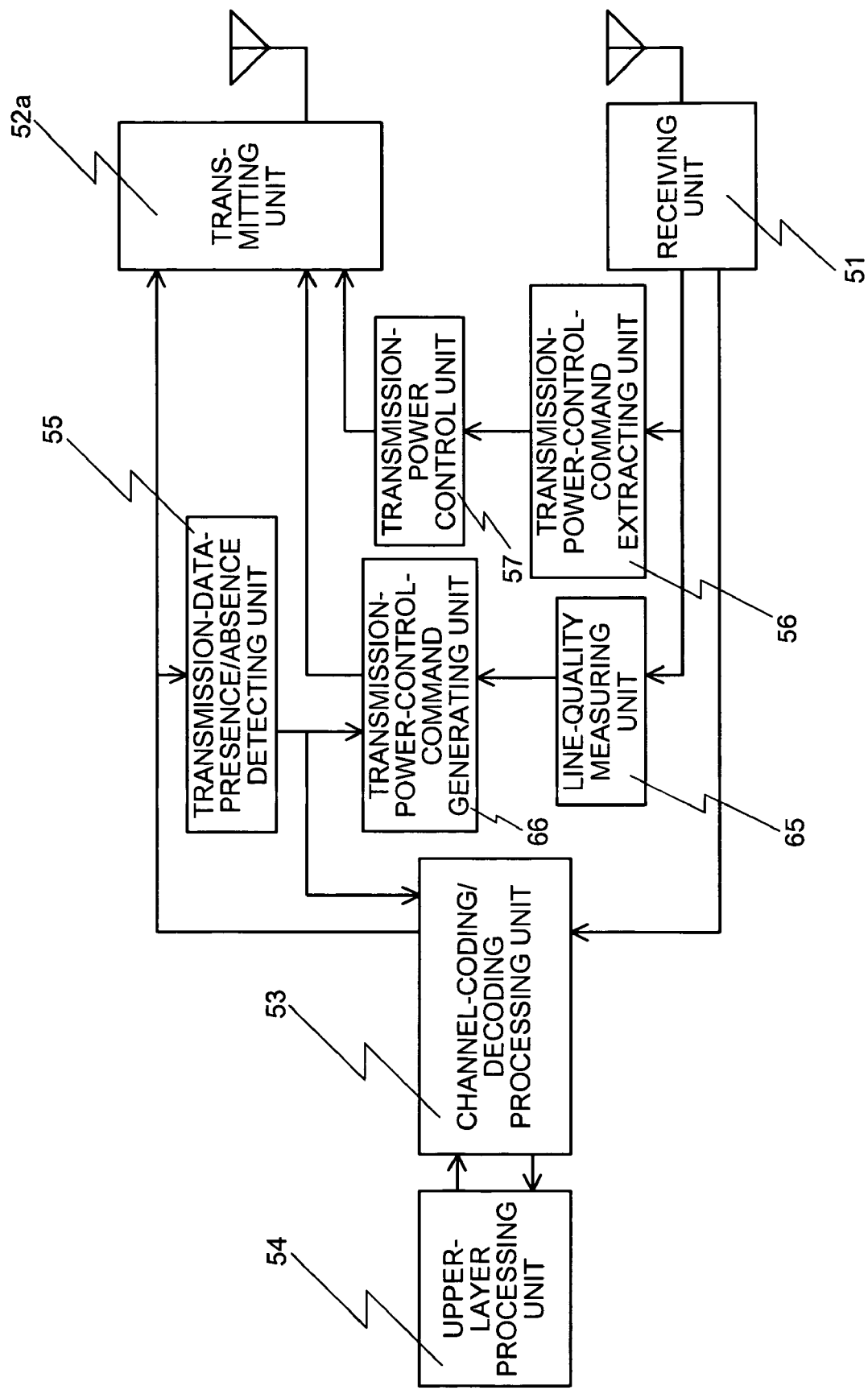
FIG. 42 is a diagram of an example of a structure of a CDMA base station apparatus according to a seventeenth embodiment of the present invention.

FIG. 42 is a diagram of an example of a structure of a CDMA mobile apparatus according to a seventeenth embodiment of the present invention. The CDMA mobile apparatus further includes a line-quality measuring unit 65 and a transmission-power-control-command generating unit 66 in addition to the components according to the eleventh embodiment. Components identical with those in FIG. 34 according to the eleventh embodiment are denoted by the identical reference numerals and signs and explanations of the components are omitted. Processing that is different from the processing according to the eleventh embodiment is explained.

The line-quality measuring unit 65 generates information on whether an SIR, an SINR, an SNR, reception field intensity, or layer 1 signaling information is within a range of available values using a layer 1 known sequence or layer 1 signaling information received.

For example, when a detection result of the transmission-data-presence/absence detecting unit 55 changes from "transmission data is absent" to "transmission data is present", the transmission-power control command generating unit 66 generates, based on an output of the line-quality measuring unit 65, a transmission-power control command to perform transmission power control once using information bits of transmission-power control commands for a plurality of number of times (n). To improve a probability, transmission power control is performed once using transmission-power control commands for n times. When the base station side is performing the same processing, the probability is further improved if an identical command is transmitted n times to be timed to coincide with the base station. In particular, when there is not user data from the base station either, a layer 1 known sequence or layer 1 signaling information continuously transmitted from the base station has low transmission power compared with transmission power at the time when there is user data. Thus, interference with other users is less. Therefore, necessity for performing accurate transmission power control is low.

When transmission power is increased only for a TPC bit without changing a slot format, it is possible to reduce n. Further, n may be determined according to any one of an allowable delay time and an allowable error rate or both. In other words, n is increased or decreased according to a QoS. For example, in the case of "an allowable delay time=small" or in the case of "a target allowable number of transmission data from the local station to the opposed station=small", a reception quality of a transmission-power control command same as a usual level cannot be secured unless an average of transmission-power control commands for n times is calculated using the outer-loop adjustment amount #1. However, it is possible to reduce n by preventing transmission power of only the transmission-power control command from being reduced in transmission power from the base station.

The transmission-data-presence/absence detecting unit 55 according to the eleventh to the seventeenth embodiments detects presence or absence of user data of the mobile apparatus. However, it may be judged that "transmission data is absent" when there is no transmission data from the base station and when there is no user data of the mobile apparatus. The judgment methods according to the first and the second embodiment are used for judging presence or absence of transmission data.

In the eleventh to the seventeenth embodiments, when transmission data is resumed in the mobile apparatus, time from generation of data to be transmitted until the data is actually transmitted is calculated based on stability of a transmission power value in the mobile apparatus and a reception quality of a signal from the base station. However, for example, as in the third embodiment, when the base station transmits an R bit (layer 1 signaling information indicating that the base station recognizes that the mobile apparatus is in a transmission state), a value of the R bit may be used.

INDUSTRIAL APPLICABILITY

As described above, the base station and the mobile apparatus according to the present invention are useful for a radio communication system that adopts CDMA and is, in particular, suitable as radio communication apparatuses that perform optimum transmission power control when there is no data to be transmitted.

The invention claimed is:

1. A base station realizes a transmission power control when there is no mobile-apparatus transmission data, by a radio communication, the base station comprising:
   a measuring unit that measures a line quality based on a known sequence included in a reception signal;
   a first judging unit that judges whether there is the mobile-apparatus transmission data, based on a reception power of the mobile-apparatus transmission data;
   a first generating unit that decreases, when the first judging unit judges that there is no mobile-apparatus transmission data, a reference value for generating a transmission-power control command, by a value equivalent to an amount of an outer-loop adjustment that is variable according to a predetermined condition; and
   a second generating unit that compares generated reference value and measured line quality, when the generated reference value is larger than the measured line quality, generates a transmission-power control command for reducing a transmission power of a mobile apparatus, and when the generated reference value is smaller than the measured line quality, generates a transmission-power control command for increasing the transmission power of the mobile apparatus.

2. The base station according to claim 1, wherein
the measuring unit measures any one of a signal-to-interference ratio, a signal-to-noise ratio, a signal-to-interference plus noise ratio, and a reception field intensity, as the line quality.

3. The base station according to claim 1, wherein
the first judging unit judges whether there is the mobile-apparatus transmission data, based on any one of
   a process of judging whether a ratio of the reception power of the mobile-apparatus transmission data and a reception power of the known sequence exceeds a threshold;
   a process of judging whether an average of the ratio for a predetermined number of times exceeds a threshold;
   a process of judging whether the ratio exceeds the threshold for a predetermined number of times; and
   a process of judging whether the ratio exceeds the threshold in a predetermined proportion or more.

4. The base station according to claim 3, wherein
the threshold is determined in such a manner that the first judging unit can judge whether there is the mobile-apparatus transmission data based on at least one of an allowable delay time or an allowable error rate equivalent to a required Quality-of-Service, and a type of data.

5. The base station according to claim 4, wherein
in a case of multi-channel communication data obtained by multiplexing communications that realize a plurality of Quality-of-Services, either one of a Quality-of-Service of a channel having a shortest allowable delay time and a Quality-of-Service of a channel having a smallest allowable error rate is set as a Quality-of-Service of a multi-channel, and when a packet channel and other channel are multiplexed, a Quality-of-Service of a channel other than the packet channel is set as the Quality-of-Service of the multi-channel.

6. The base-station according to claim 3, wherein
a hysteresis is given to a threshold judgment for judging whether there is the mobile-apparatus transmission data.

7. The base station according to claim 3, wherein
in a threshold judgment for judging whether there is the mobile-apparatus transmission data, when there is a possibility of a misjudgment, the first judging unit judges that there is the mobile-apparatus transmission data.

8. The base station according to claim 1, wherein
when the judgment is changed from there is no mobile-apparatus transmission data to there is the mobile-apparatus transmission data, the first generating unit increases the reference value by the value equivalent to the amount of the outer-loop adjustment.

9. The base station according to claim 1, wherein
the first judging unit includes
a message extracting unit that extracts a message concerning whether there is the mobile-apparatus transmission data, the message being included in the reception signal; and
a transmission-data-status judging unit that judges whether there is the mobile-apparatus transmission data, based on extracted message.

10. The base station according to claim 1, further comprising:
a responding unit that sends a result of the judgment on whether there is the mobile-apparatus transmission data to the mobile apparatus.

11. The base station according to claim 1, further comprising:
a synchronization detecting unit that detects whether a synchronization of a local station is secured, by performing a path detection by a cyclic addition using a known matched-filter output, which is correlation information, in a reception process in a code-division multiple access system, wherein
when it is indicated that the synchronization of the local station is secured and when there is no mobile-apparatus transmission data, the first generating unit decreases the reference value by the value equivalent to the amount of the outer-loop adjustment, and
when it is indicated that the local station is out of synchronization and when there is no mobile-apparatus transmission data, the first generating unit increases the reference value by the value equivalent to the amount of the outer-loop adjustment.

12. The base station according to claim 11, wherein
the first generating unit increases a speed of decreasing the reference value when a forgetting factor at the time of the cyclic addition is large, and decreases the speed of decreasing the reference value when the forgetting factor at the time of the cyclic addition is small.

13. The base station according to claim 11, further comprising:
a moving-speed detecting unit that detects a moving speed of the mobile apparatus, wherein
the synchronization detecting unit sets a forgetting factor at the time of the cyclic addition large when the moving speed is faster than a predetermined speed, and sets the forgetting factor small when the moving speed is slower than the predetermined speed.

14. The base station according to claim 11, further comprising:
a moving-speed detecting unit that detects a moving speed of the mobile apparatus, wherein
upon performing a synchronization detection based on a moving average, the synchronization detecting unit decreases a denominator of an averaging process when the moving speed is faster than a predetermined speed, and increases the denominator of the averaging process when the moving speed is slower than the predetermined speed.

15. The base station according to claim 1, further comprising:
a transmission-power control unit that extracts a transmission-power control command included in a reception signal n times, where n is an integer equal to or larger than 2, and performs a transmission power control once using a result of extractions performed n times, when a result of judgment by the first judging unit indicates that there is no mobile-apparatus transmission data.

16. The base station according to claim 15, wherein
the transmission-power control unit increases or decreases a value of n based on the amount of the outer-loop adjustment.

17. The base station according to claim 15, wherein
the transmission-power control unit increases or decreases a value of n based on at least one of an allowable delay time or an allowable error rate equivalent to a required Quality-of-Service.

18. The base station according to claim 1, further comprising:
a second judging unit that judges whether there is local-station transmission data, wherein
when a result of judgment by the first judging unit indicates that there is no mobile apparatus data and when a result of judgment by the second judging unit indicates that there is no local-station transmission data, the first generating unit decreases the reference value by the value equivalent to the amount of the outer-loop adjustment.

19. The base station according to claim 18, wherein
the second judging unit judges that there is no local-station transmission data when a continuous non-transmission time, in which there is no transmission data, reaches a non-transmission judgment threshold.

20. The base station according to claim 19, wherein
the non-transmission judgment threshold is determined based on at least one of an allowable delay time or an allowable error rate equivalent to a required Quality-of-Service.

21. The base station according to claim 19, wherein
in a case of multi-channel communication data obtained by multiplexing communications that realize a plurality of Quality-of-Services, a maximum value of the non-transmission judgment threshold corresponding to at least one of the allowable delay time and the allowable error rate equivalent to the respective Quality-of-Service is set as the non-transmission judgment threshold for the multi-channel.

22. The base station according to claim 19, wherein
under a condition in which transmission data is generated in multi-channel communication data obtained by multiplexing communications that realize a plurality of Quality-of-Services in a state in which there is no local-station transmission data, a maximum value of the non-transmission judgment threshold corresponding to at least one of the allowable delay time and the allowable error rate equivalent to the Quality-of-Services of respective transmission data transmitted in a period until a next state in which there will be no transmission data is set as the non-transmission judgment threshold for a case in which the condition is satisfied next time.

23. The base station according to claim 19, wherein when transmission data is generated in a local station, the second judging unit identifies whether the non-transmission judgment threshold for the transmission data is small, and when the non-transmission judgment threshold for the transmission data is small, sets a current non-transmission judgment threshold smaller after a data transmission.

24. The base station according to claim 18, further comprising:
a transmission-timing control unit that transmits, when a result of judgment by the second judging unit is changed from there is the local-station transmission data to there is no local-station transmission data, data at a stage when a condition of stability of an output of the second generating unit is satisfied after waiting until the output of the second generating unit is stabilized.

25. The base station according to claim 18, further comprising:
a transmission-timing control unit that transmits, when a result of judgment by the second judging unit is changed from there is the local-station transmission data to there is no local-station transmission data, data after a fixed delay time.

26. The base station according to claim 18, further comprising:
a transmission-timing control unit that transmits, when a result of judgment by the second judging unit is changed from there is the local-station transmission data to there is no local-station transmission data, data after a delay time corresponding to the amount of the outer-loop adjustment.

27. The base station according to claim 26, wherein the transmission-timing control unit starts data transmission regardless of the delay time, based on an allowable delay time of transmission data, before local-station transmission power is stabilized.

28. The base station according to claim 26, wherein even when transmitting the data after the delay time, the transmission-timing control unit starts data transmission regardless of the delay time starts data transmission based on an allowable error rate of transmission data, after waiting for further stabilization of local-station transmission power.

29. The base station according to claim 1, wherein the first generating unit is set as a first reference-value generating unit that generates a first reference value using a first amount of the outer-loop adjustment,
the base station further comprises:
an error-rate measuring unit that measures an error rate at a time of decoding the mobile-apparatus transmission data;
a second reference-value generating unit that compares an allowable error rate of the mobile-apparatus transmission data and an measured error rate, when the allowable error rate is smaller than the measured error rate, decreases a second reference value for generating the transmission-power control command, by a second amount of the outer-loop adjustment, and when the allowable error rate is larger than the measured error rate, increases the second reference value by the second amount of the outer-loop adjustment; and
a reference-value combining unit that generates an actual reference value for generating the transmission-power control command based on the first reference value and the second reference value, and
the second generating unit generates the transmission-power control command based on generated actual reference value.

30. A mobile apparatus for a base station that performs a transmission power control for reducing a transmission power of the mobile apparatus when it is judged that there is no mobile-apparatus transmission data, the mobile apparatus comprising:
a transmission-power control unit that extracts a transmission-power control command from a reception signal transmitted from the base station, and controls a transmission power based on the transmission-power control command;
a judging unit that judges whether there is transmission data of a local mobile apparatus; and
a data transmitting unit that transmits, when a result of judgment by the judging unit is changed from there is no transmission data to there is the transmission data, which means that the transmission data is resumed, the transmission data after transmitting predetermined null data in a period in which a Quality-of-Service is satisfied and until a time that is sufficient for the base station to judge that there is the mobile-apparatus transmission data elapses.

31. The mobile apparatus according to claim 30, wherein the null data is any one of data with which a result of a cyclic redundancy check is no-good, data with which a header is turned out to be invalid in a layer 2, and data that cannot be assembled.

32. The mobile apparatus according to claim 30, further comprising:
a line-quality judging unit that measures a line quality based on a known sequence included in the reception signal, and judges a level of the line quality, wherein
when the data transmission is resumed and the line quality does not satisfy a predetermined standard, the data transmitting unit transmits the transmission data after transmitting the predetermined null data in the period in which the Quality-of-Service is satisfied and until the time that is sufficient for the base station to judge that there is the mobile-apparatus transmission data elapses.

33. The mobile apparatus according to claim 32, wherein the line-quality judging unit measures any one of a signal-to-interference ratio, a signal-to-noise ratio, a signal-to-interference plus noise ratio, and a reception field intensity, as the line quality.

34. The mobile apparatus according to claim 33, wherein when a required line quality is not satisfied continuously for a predetermined number of times, the line-quality judging unit judges that the line quality is abnormal.

35. The mobile apparatus according to claim 32, wherein hysteresis is given to a judgment of the level of the line quality.

36. The mobile apparatus according to claim 30, further comprising:
an error-rate judging unit that measures an error rate at a time of decoding base-station transmission data, and judges a level of the error rate, wherein when the data transmission is resumed and the error rate does not satisfy a predetermined standard, the data transmitting unit transmits the transmission data after transmitting the predetermined null data in the period in which the Quality-of-Service is satisfied and the time that is sufficient for the base station to judge that there is the mobile-apparatus transmission data elapses.

37. The mobile apparatus according to claim 36, wherein hysteresis is given to a judgment of the level of the error rate.

38. The mobile apparatus according to claim 30, wherein the data transmitting unit estimates the time that is sufficient for the base station to judge that there is the mobile-apparatus transmission data from a state of stability of the transmission power of the local mobile apparatus.

39. The mobile apparatus according to claim 30, further comprising:
a measuring unit that measures a line quality based on a known sequence included in the reception signal, wherein
the data transmitting unit estimates the time that is sufficient for the base station to judge that there is the mobile-apparatus transmission data from a state of stability of the line quality.

40. The mobile apparatus according to claim 39, wherein the measuring unit measures any one of a signal-to-interference ratio, a signal-to-noise ratio, a signal-to-interference plus noise ratio, and a reception field intensity, as the line quality.

41. The mobile apparatus according to claim 30, wherein the data transmitting unit adjusts the time that is sufficient for the base station to judge that there is the mobile-apparatus transmission data based on either one of an allowable delay time and an allowable error rate equivalent to a Quality-of-Service.

42. The mobile apparatus according to claim 30, further comprising:
a transmission notifying unit that transmits transmission notice information to the base station when a result of judgment by the judging unit is changed from there is no transmission data to there is the transmission data.

43. The mobile apparatus according to claim 42, wherein when an uplink transmission power is reduced according to a transmission-power reduction control by the base station and when a downlink transmission power from the base station is insufficient, the transmission notifying unit transmits the transmission notice information regardless of whether there is the transmission data.

44. The mobile apparatus according to claim 43, wherein the transmission notifying unit recognizes that the downlink transmission power from the base station is insufficient based on a result of measurement of the line quality or an error rate at a time of decoding base-station transmission data.

45. The mobile apparatus according to claim 30, wherein when a result of judgment by the judging unit is changed from there is no transmission data to there is the transmission data, the transmission-power control unit performs a control of increasing the transmission power of the local mobile apparatus by a specific amount defined in advance.

46. The mobile apparatus according to claim 45, wherein when an uplink transmission power is reduced according to a transmission-power reduction control by the base station and when a downlink transmission power from the base station is insufficient, the transmission-power control unit performs the control of increasing the transmission power by the specific amount.

47. The mobile apparatus according to claim 46, wherein the transmission-power control unit recognizes that the downlink transmission power from the base station is insufficient based on a result of measurement of the line quality or an error rate at a time of decoding base-station transmission data.

48. The mobile apparatus according to claim 30, wherein when a result of judgment by the judging unit is changed from there is no transmission data to there is the transmission data, the transmission-power control unit performs a control of increasing the transmission power of the local mobile apparatus in a stepwise manner until the transmission power reaches a specific amount defined in advance.

49. The mobile apparatus according to claim 48, wherein when an uplink transmission power is reduced according to the transmission-power reduction control by the base station and when a downlink transmission power from the base station is insufficient, the transmission-power control unit performs the control of increasing the transmission power of the local mobile apparatus in a stepwise manner until the transmission power reaches the specific amount.

50. The mobile apparatus according to claim 49, wherein the transmission-power control unit recognizes that the downlink transmission power from the base station is insufficient based on a result of measurement of the line quality or an error rate at a time of decoding base-station transmission data.

51. The mobile apparatus according to claim 30, further comprising:
a measuring unit that measures a line quality based on a known sequence included in the reception signal; and
a generating unit that generates the transmission-power control command, when a result of judgment by the judging unit is changed from there is no transmission data to there is the transmission data, to perform the transmission power control once with n times of information bit of the transmission-power control command at a time of null data transmission based on the line quality, where n is an integer equal to or larger than 2.

52. The mobile apparatus according to claim 51, wherein the measuring unit measures any one of a signal-to-interference ratio, a signal-to-noise ratio, a signal-to-interference plus noise ratio, and a reception field intensity, as the line quality.

53. The mobile apparatus according to claim 51, wherein n is determined based on at least one of an allowable delay time or an allowable error rate equivalent to a required Quality-of-Service.

* * * * *